(12) United States Patent
Yamada et al.

(10) Patent No.: US 10,576,739 B2
(45) Date of Patent: Mar. 3, 2020

(54) HEAD UNIT CONTROL CIRCUIT

(71) Applicant: Seiko Epson Corporation, Tokyo (JP)

(72) Inventors: Tomonori Yamada, Shiojiri (JP);
Hironori Endo, Okaya (JP); Toru Matsuyama, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 16/065,894

(22) PCT Filed: Dec. 22, 2016

(86) PCT No.: PCT/JP2016/088461
§ 371 (c)(1),
(2) Date: Jun. 25, 2018

(87) PCT Pub. No.: WO2017/111065
PCT Pub. Date: Jun. 29, 2017

(65) Prior Publication Data
US 2019/0009527 A1 Jan. 10, 2019

(30) Foreign Application Priority Data

Dec. 25, 2015 (JP) .................. 2015-252876

(51) Int. Cl.
*B41J 2/045* (2006.01)
*B41J 2/14* (2006.01)
(52) U.S. Cl.
CPC ....... *B41J 2/04541* (2013.01); *B41J 2/04581* (2013.01); *B41J 2/14* (2013.01); *B41J 2002/14491* (2013.01)

(58) Field of Classification Search
CPC ...... B41J 2/04541; B41J 2/01; B41J 2/04581; B41J 2/04588; B41J 2/04591; B41J 2/14;
(Continued)

(56) References Cited

U.S. PATENT DOCUMENTS 8,833,883 B2 * 9/2014 Oomura ............... B41J 2/04541
347/5
8,944,550 B2 2/2015 Kasai et al.
(Continued)

FOREIGN PATENT DOCUMENTS

EP 2 853 394 A2 4/2015
JP 2006-341391 A 12/2006
(Continued)

*Primary Examiner* — Thinh H Nguyen
(74) *Attorney, Agent, or Firm* — Harness, Dickey & Pierce, P.L.C.

(57) ABSTRACT

A head unit control circuit controls a head unit. The head unit includes an ejector, a determination circuit, and an ejection limit circuit. The ejector includes a displaceable piezoelectric element for controlling the liquid ejection. The piezoelectric element is displaced by changing a drive signal potential. The determination circuit determines whether the piezoelectric element has a predetermined electrical storage capability. The ejection limit circuit stops the drive signal to limit the ejection of the liquid based on the determination. The head unit control circuit includes: a first terminal that outputs an instruction signal instructing the head unit to execute the determination; a second terminal that outputs the drive signal; and a third terminal that is between the first terminal and the second terminal. The third terminal has a smaller potential change width than the second terminal when the ejecting section ejects the liquid.

18 Claims, 31 Drawing Sheets

(58) Field of Classification Search
CPC .. B41J 29/00; B41J 29/38; B41J 2002/14491; H01R 12/79

See application file for complete search history.

(56) References Cited

U.S. PATENT DOCUMENTS

| | | | | |
|---|---|---|---|---|
| 2009/0002457 A1* | 1/2009 | Sakurai | ............... | B41J 2/04541 347/57 |
| 2014/0354720 A1 | 12/2014 | Kasai et al. | | |
| 2015/0054876 A1 | 2/2015 | Nakazawa et al. | | |

FOREIGN PATENT DOCUMENTS

| | | |
|---|---|---|
| JP | 2010-228360 A | 10/2010 |
| JP | 2011-251419 A | 12/2011 |
| JP | 2012-196820 A | 10/2012 |
| JP | 2014-233894 A | 12/2014 |

* cited by examiner

| TERMINAL NAME (CN1) | SIGNAL NAME |
|---|---|
| ZN1-1 | GND |
| ZN1-2 | Tsig |
| ZN1-3 | GND |
| ZN1-4 | VBS-2 |
| ZN1-5 | Com-2 |
| ZN1-6 | VBS-1 |
| ZN1-7 | Com-1 |
| ZN1-8 | VDD |
| ZN1-9 | CH |
| ZN1-10 | GND |
| ZN1-11 | CL |
| ZN1-12 | GND |
| ZN1-13 | SI1-1 |
| ZN1-14 | GND |

| TERMINAL NAME (CN2) | SIGNAL NAME |
|---|---|
| ZN2-14 | GND |
| ZN2-13 | GND |
| ZN2-12 | GND |
| ZN2-11 | Com-2 |
| ZN2-10 | VBS-2 |
| ZN2-9 | Com-1 |
| ZN2-8 | VBS-1 |
| ZN2-7 | VHV |
| ZN2-6 | LAT |
| ZN2-5 | SI2-2 |
| ZN2-4 | GND |
| ZN2-3 | SI1-2 |
| ZN2-2 | GND |
| ZN2-1 | SI2-1 |

| TERMINAL NAME (CN3) | SIGNAL NAME |
|---|---|
| ZN3-1 | SI1-3 |
| ZN3-2 | GND |
| ZN3-3 | SI2-3 |
| ZN3-4 | GND |
| ZN3-5 | HT |
| ZN3-6 | NCH |
| ZN3-7 | VDD |
| ZN3-8 | VBS-4 |
| ZN3-9 | Com-4 |
| ZN3-10 | VBS-3 |
| ZN3-11 | Com-3 |
| ZN3-12 | GND |
| ZN3-13 | GND |
| ZN3-14 | GND |

| TERMINAL NAME (CN4) | SIGNAL NAME |
|---|---|
| ZN4-14 | GND |
| ZN4-13 | SI2-4 |
| ZN4-12 | GND |
| ZN4-11 | SI1-4 |
| ZN4-10 | GND |
| ZN4-9 | XH |
| ZN4-8 | GND |
| ZN4-7 | Com-4 |
| ZN4-6 | VBS-4 |
| ZN4-5 | Com-3 |
| ZN4-4 | VBS-3 |
| ZN4-3 | GND |
| ZN4-2 | NSA |
| ZN4-1 | GND |

Fig. 8

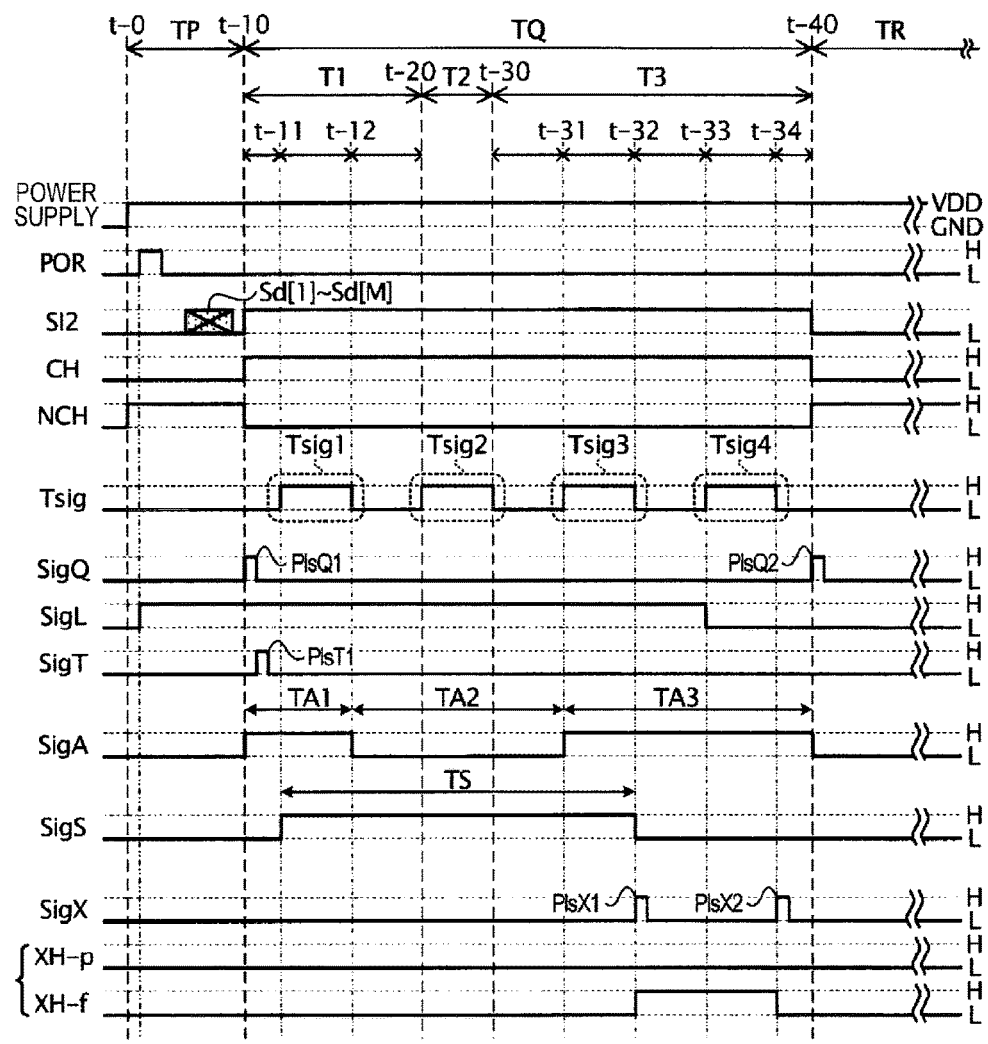

Fig. 14A

| Md | Sd[m] | DESIGNATION BY Sd[m] | SLa[m] | | |
|---|---|---|---|---|---|
| | | | TA1 | TA2 | TA3 |
| 1 (DIAGNOSIS PROCESS) | (1,1) | DIAGNOSIS TARGET | H | L | H |
| | (0,0) | EXCLUDED FROM DIAGNOSIS TARGET | H | H | H |

Fig. 14B

| Md | Sd[m] | DESIGNATION BY Sd[m] | SLa[m] | |
|---|---|---|---|---|
| | | | Tu1 | Tu2 |
| 2 (PRINTING PROCESS) | (1,1) | LARGE DOT | H | H |
| | (1,0) | MEDIUM DOT | H | L |
| | (0,1) | SMALL DOT | L | H |
| | (0,0) | NON-RECORDING | L | L |

Fig. 14C

| Md | Sd[m] | DESIGNATION BY Sd[m] | SLs[m] | |
|---|---|---|---|---|
| | | | TS | OTHER THAN TS |
| 1 (DIAGNOSIS PROCESS) | (1,1) | DIAGNOSIS TARGET | H | L |
| | (0,0) | EXCLUDED FROM DIAGNOSIS TARGET | L | L |

Fig. 19A

| Md | Sd[m] | SP | DESIGNATION BY Sd[m] | SLa[m] | | | | |
|---|---|---|---|---|---|---|---|---|
| | | | | Tu1 | Tu2 | TSS1 | TSS2 | TSS3 |
| 2 (NORMAL) | (1,1) | 0 (PRINT) | LARGE DOT | H | H | – | – | – |
| | (1,0) | | MEDIUM DOT | H | L | – | – | – |
| | (0,1) | | SMALL DOT | L | H | – | – | – |
| | (0,0) | | NON-RECORDING | L | L | – | – | – |
| | (1,1) | 1 (CHECK) | CHECK TARGET | – | – | H | L | H |
| | (0,0) | | EXCLUDED FROM CHECK TARGET | – | – | L | L | L |

Fig. 19B

| Md | Sd[m] | SP | DESIGNATION BY Sd[m] | SLs[m] | | | | |
|---|---|---|---|---|---|---|---|---|
| | | | | Tu1 | Tu2 | TSS1 | TSS2 | TSS3 |
| 2 (NORMAL) | – | 0 | – | L | L | – | – | – |
| | (1,1) | 1 (CHECK) | CHECK TARGET | – | – | L | H | L |
| | (0,0) | | EXCLUDED FROM CHECK TARGET | – | – | L | L | L |

Fig. 21

| Info-S | Info-T (NTc COMPARISON) | Stt |
|---|---|---|
| 1 | NTc < Tth1 | 2: ABNORMAL EJECTION (AIR BUBBLES) |
| | Tth1 ≦ NTc ≦ Tth2 | 1: NORMAL |
| | Tth2 < NTc ≦ Tth3 | 3: ABNORMAL EJECTION (FOREIGN MATTER) |
| | Tth3 < NTc | 4: ABNORMAL EJECTION (INCREASE IN VISCOSITY) |
| 0 | N/A | 5: ABNORMAL EJECTION |

HEAD UNIT CONTROL CIRCUIT

This application is a National Phase of PCT/JP2016/088461 filed Dec. 22, 2016 and claims priority to Japanese Patent Application No. 2015-252876 filed Dec. 25, 2015 which is expressly incorporated by reference herein in its entirety.

TECHNICAL FIELD

The present invention relates to a head unit control circuit.

RELATED ART

A liquid ejecting device such as an inkjet printer may perform a printing process that ejects a liquid such as an ink with which a cavity (pressure chamber) of an ejecting section provided to a head unit is filled, through a nozzle of the ejecting section by driving a piezoelectric element provided to the ejecting section using a drive signal to form an image on a recording medium. Such a liquid ejecting device may pose a problem in which an abnormal ejection state (i.e., a state in which the liquid cannot be normally ejected from the ejecting section) occurs due to failure in the ejecting section (e.g., piezoelectric element). When such an abnormal ejection state has occurred, it may be impossible to accurately form a predetermined dot on the recording medium using the liquid ejected from the ejecting section, whereby the quality of the image formed by the printing process may deteriorate.

JP-A-2010-228360 discloses technology that aims to reduce the possibility that the printing process is performed in the abnormal ejection state by detecting the potential of the electrode of the piezoelectric element when the piezoelectric element is charged or discharged, and performing a process (drive determination process) that determines whether or not it is possible to normally drive the piezoelectric element based on the detected information.

According to the technology disclosed in JP-A-2010-228360, the drive determination process is performed by a circuit that is provided outside the head unit. Therefore, when information (e.g., the potential of the piezoelectric element) detected from the piezoelectric element is transmitted to the circuit that performs the drive determination process, noise may be mixed into the detected information, and the accuracy of the drive determination process may deteriorate.

According to the technology disclosed in JP-A-2010-228360, a central processing unit (CPU) that is provided to a substrate that differs from that provided with the circuit that performs the drive determination process, instructs the circuit to perform the drive determination process. Therefore, when noise is mixed into a determination instruction signal, the circuit that performs the drive determination process may malfunction, and an accurate determination result may not be obtained.

The invention was conceived in view of the above situation. An object of the invention is to provide technology that makes it possible to accurately determine whether or not it is possible to drive the piezoelectric element while reducing a situation in which the head unit malfunctions.

SUMMARY

According to one embodiment of the invention, there is provided a head unit control circuit that controls a head unit, and is provided outside the head unit, the head unit including:

an ejecting section that includes a piezoelectric element, and can eject a liquid corresponding to displacement of the piezoelectric element, the piezoelectric element being displaced corresponding to a change in potential of a drive signal when the drive signal has been supplied to the piezoelectric element;

a determination circuit that determines whether or not the piezoelectric element has a predetermined electrical storage capability; and an ejection limit circuit that stops the supply of the drive signal to the piezoelectric element and limits the ejection of the liquid from the ejecting section when a result of the determination is negative, the head unit control circuit including:

a first terminal that outputs an instruction signal that instructs the head unit to execute the determination;

a second terminal that outputs the drive signal; and a third terminal that is provided between the first terminal and the second terminal, the third terminal being smaller in potential change width than the second terminal when the ejecting section ejects the liquid.

According to the above embodiment, since the determination circuit is provided to the head unit, it is possible to reduce the degree by which noise is mixed into the information detected from the piezoelectric element as compared with the case where the determination circuit is provided outside the head unit. This makes it possible to accurately determine whether or not the piezoelectric element has a predetermined electrical storage capability.

According to the above embodiment, the third terminal that is smaller in change in potential than the second terminal is provided between the first terminal that outputs the instruction signal and the second terminal that outputs the drive signal. Therefore, it is possible to reduce the possibility that a change in the potential of the second terminal due to the output of the drive signal is propagated to the first terminal as noise as compared with the case where the third terminal is not provided. Specifically, it is possible to reduce the possibility that noise is superimposed on the instruction signal that is output from the first terminal. This makes it possible to suppress the occurrence of a problem that occurs when noise is superimposed on the instruction signal, and suppress a situation in which the head unit malfunctions due to an inappropriate instruction signal (e.g., a situation in which the determination process cannot be started at the desired determination start timing, and a situation in which the determination process is performed at a timing at which the determination process should not be performed (e.g., during the printing process)). In other words, it is possible to prevent malfunction of the head unit that may occur in connection with the determination process.

According to the above embodiment, the ejection limit circuit provided to the head unit stops the supply of the drive signal to the piezoelectric element. Specifically, the head unit according to the above embodiment performs the determination process and the process that stops driving the piezoelectric element corresponding to the determination result in a self-contained manner. Therefore, it is possible to reliably and promptly stop driving the piezoelectric element as compared with the case where the function that stops driving the piezoelectric element is provided outside the head unit. This makes it possible to prevent deterioration in image quality that may occur when the printing process is performed using a piezoelectric element that has broken down, and prevent a decrease in safety that may occur when a piezoelectric element that has broken down is driven.

In the head unit control circuit, the drive signal may be an analog signal, and the instruction signal may be a digital signal having an amplitude smaller than that of the drive signal.

According to this configuration, since the third terminal is provided between the first terminal that outputs the instruction signal having an amplitude smaller than that of the drive signal, and the second terminal that outputs the drive signal, it is possible to reduce the possibility that a change in the potential of the drive signal is superimposed on the instruction signal as noise, and reduce malfunction of the head unit that may occur in connection with the determination process even when the instruction signal is a signal having a small amplitude.

The head unit control circuit may further include:
a terminal that outputs a first designation signal;
a terminal that outputs a second designation signal; and
a terminal that outputs a third designation signal,
the first designation signal may designate whether or not to cause the ejecting section to eject the liquid when a result of the determination is affirmative and the liquid can be ejected from the ejecting section,
the second designation signal may define a period in which the liquid is ejected from the ejecting section when a result of the determination is affirmative and the liquid can be ejected from the ejecting section,
the third designation signal may be set to a low level so that a switch provided between the second terminal and the piezoelectric element is turned ON when a result of the determination is affirmative and the liquid can be ejected from the ejecting section, and
the determination circuit may execute the determination during a determination period in which the first designation signal is set to a high level, the second designation signal is set to a high level, and the third designation signal is set to the low level.

According to this configuration, the determination process is performed during the determination period that is defined by a combination of the first designation signal, the second designation signal, and the third designation signal. Therefore, it is possible to reduce the occurrence of a problem in which the determination process starts at an undesired timing as compared with the case where the determination period is defined by one signal, for example.

In the head unit control circuit, the head unit may include a plurality of the ejecting sections, and the first designation signal may designate one of the plurality of the ejecting sections as a target for the determination during a period until the determination period starts after power supply to the head unit has started.

According to this configuration, since it is possible to designate the determination target ejecting section, it is possible to perform the determination process so as to meet various determination-related requirements (e.g., determination accuracy and determination time). Therefore, it is possible to reduce the degree of decrease in convenience to the user of the liquid ejecting device due to the determination process, and perform the determination process with appropriate accuracy corresponding to the usage state of the liquid ejecting device and the like.

According to another embodiment of the invention, there is provided a head unit control circuit that controls a head unit, and is provided outside the head unit, the head unit including:

an ejecting section that includes a piezoelectric element, and can eject a liquid corresponding to displacement of the piezoelectric element, the piezoelectric element being displaced corresponding to a change in potential of a drive signal when the drive signal has been supplied to the piezoelectric element; and a diagnosis circuit that diagnoses an electrical storage capability of the piezoelectric element, and stops the supply of the drive signal to the piezoelectric element when a result of the diagnosis is a predetermined result to limit the ejection of the liquid from the ejecting section, the head unit control circuit including:
a first terminal that outputs a diagnosis control signal that controls execution of the diagnosis by the head unit;
a second terminal that outputs the drive signal; and
a third terminal that is provided between the first terminal and the second terminal,
the third terminal being smaller in potential change width than the second terminal when the ejecting section ejects the liquid.

According to the above embodiment, since the diagnosis circuit is provided to the head unit, it is possible to reduce the degree by which noise is mixed into the information detected from the piezoelectric element as compared with the case where the diagnosis circuit is provided outside the head unit. This makes it possible to accurately diagnose the electrical storage capability of the piezoelectric element.

According to the above embodiment, the third terminal that is smaller in change in potential than the second terminal is provided between the first terminal that outputs the diagnosis control signal and the second terminal that outputs the drive signal. Therefore, it is possible to reduce the possibility that a change in the potential of the second terminal due to the output of the drive signal is propagated to the first terminal as noise as compared with the case where the third terminal is not provided. Specifically, it is possible to reduce the possibility that noise is superimposed on the diagnosis control signal that is output from the first terminal. This makes it possible to suppress the occurrence of a problem that occurs when noise is superimposed on the diagnosis control signal, and suppress a situation in which the head unit malfunctions due to an inappropriate diagnosis control signal (e.g., a situation in which the head unit malfunctions during the diagnosis process, and a situation in which the diagnosis process is performed at a timing at which the diagnosis process should not be performed (e.g., during the printing process)). In other words, it is possible to prevent malfunction of the head unit that may occur in connection with the diagnosis process.

According to the above embodiment, the diagnosis circuit stops the supply of the drive signal to the piezoelectric element. Specifically, the head unit according to the above embodiment can perform the process that diagnoses the electrical storage capability of the piezoelectric element, and the process that stops driving the piezoelectric element corresponding to the diagnosis result, in a self-contained manner. Therefore, it is possible to reliably and promptly stop driving the piezoelectric element as compared with the case where the function that stops driving the piezoelectric element is provided outside the head unit. This makes it possible to prevent deterioration in image quality that may occur when the printing process is performed using a piezoelectric element that has broken down, and prevent a decrease in safety that may occur when a piezoelectric element that has broken down is driven.

In the head unit control circuit, the drive signal may be an analog signal, and the diagnosis control signal may be a digital signal having an amplitude smaller than that of the drive signal.

According to this configuration, since the third terminal is provided between the first terminal that outputs the diagnosis control signal having an amplitude smaller than that of the drive signal, and the second terminal that outputs the drive signal, it is possible to reduce the possibility that a change in the potential of the drive signal is superimposed on the diagnosis control signal as noise, and reduce malfunction of the head unit that may occur in connection with the diagnosis process even when the diagnosis control signal is a signal having a small amplitude.

The head unit control circuit may further include:

a terminal that outputs a first designation signal;

a terminal that outputs a second designation signal; and a terminal that outputs a third designation signal, the first designation signal may designate whether or not to cause the ejecting section to eject the liquid when the result of the diagnosis differs from the predetermined result, and the liquid can be ejected from the ejecting section, the second designation signal may define a period in which the liquid is ejected from the ejecting section when the result of the diagnosis differs from the predetermined result, and the liquid can be ejected from the ejecting section, the third designation signal may be set to a low level so that a switch provided between the second terminal and the piezoelectric element is turned ON when the result of the diagnosis differs from the predetermined result, and the liquid can be ejected from the ejecting section, and the diagnosis circuit may execute the diagnosis during a diagnosis period in which the first designation signal is set to a high level, the second designation signal is set to a high level, and the third designation signal is set to the low level, and, the diagnosis circuit may stop the supply of the drive signal to the piezoelectric element and limit the ejection of the liquid from the ejecting section when the result of the diagnosis is the predetermined result and the diagnosis period ends.

According to this configuration, the diagnosis process is performed during the diagnosis period that is defined by a combination of the first designation signal, the second designation signal, and the third designation signal. Therefore, it is possible to reduce the occurrence of a problem in which the diagnosis process starts at an undesired timing as compared with the case where the diagnosis period is defined by one signal, for example.

In the head unit control circuit, the head unit may include a plurality of the ejecting sections, and the first designation signal may designate one of the plurality of ejecting sections for which the diagnosis circuit diagnoses the electrical storage capability of the piezoelectric element during a period until the diagnosis period starts after power supply to the head unit has started.

According to this configuration, since it is possible to designate the diagnosis target ejecting section, it is possible to perform the diagnosis process so as to meet various diagnosis-related requirements (e.g., diagnosis accuracy and diagnosis time). Therefore, it is possible to reduce the degree of decrease in convenience to the user of the liquid ejecting device due to the diagnosis process, and perform the diagnosis process with appropriate accuracy corresponding to the usage state of the liquid ejecting device and the like.

In the head unit control circuit, the third terminal may be set to a ground potential.

According to this configuration, since it is possible to reduce the possibility that a change in the potential of the second terminal due to a change in the potential of the drive signal is superimposed on the first terminal as noise, it is possible to reduce the probability that the head unit malfunctions.

The head unit control circuit may further include a fourth terminal that is provided between the second terminal and the third terminal, the fourth terminal may be smaller in potential change width than the second terminal, and the third terminal may be smaller in potential change width than the fourth terminal, when the ejecting section ejects the liquid.

According to this configuration, the third terminal and the fourth terminal are provided between the first terminal and the second terminal. The fourth terminal that is smaller in change in potential than the second terminal is provided on the side of the first terminal with respect to the second terminal, and the third terminal that is smaller in change in potential than the fourth terminal is provided on the side of the first terminal with respect to the fourth terminal. Therefore, even when the potential of the second terminal changes, it is possible to gradually reduce the effect of the change in potential through the fourth terminal and the third terminal. Specifically, it is possible to reduce the possibility that a change in the potential of the second terminal due to a change in the potential of the drive signal is superimposed on the first terminal as noise as compared with the case where the fourth terminal is not provided. This makes it possible to reduce the probability that the head unit malfunctions.

In the head unit control circuit, the piezoelectric element may include a first electrode and a second electrode, the drive signal may be supplied to the first electrode, and the second electrode may be electrically connected to the fourth terminal.

According to this configuration, a path that electrically connects the fourth terminal and the second electrode functions as a return path for the drive signal that is supplied to the piezoelectric element. Therefore, even when the potential of the second terminal changes, it is possible to counterbalance or reduce the change in the potential of the second terminal through a change in the potential of the fourth terminal. Specifically, it is possible to reduce the amount of noise component due to a change in the potential of the second terminal as compared with the case where the fourth terminal is not provided.

In the head unit control circuit, the first terminal may be provided between the third terminal and a fifth terminal, the fifth terminal being set to a potential identical to that of the third terminal.

According to this configuration, the first terminal that outputs the instruction signal is provided between the third terminal and the fifth terminal. The third terminal and the fifth terminal are smaller in change in potential than the second terminal. This makes it possible to reduce noise that is propagated to the first terminal from the outside, and reduce the probability that the head unit malfunctions.

The head unit control circuit may include a terminal arrangement area in which a plurality of terminals including the first terminal, the second terminal, the third terminal, and the fifth the terminal are arranged, and only the fifth terminal among the plurality of terminals may be provided between the first terminal and an end of the terminal arrangement area.

When the terminal arrangement area of the head unit control circuit and the head unit provided to the liquid ejecting device are electrically connected using a connection cable, contact failure may occur between the terminal arrangement area and the connection cable. In particular, it is likely that contact failure occurs between the terminal arrangement area and the connection cable when the relative positional relationship between the head unit and the head unit control circuit changes (e.g., when the liquid ejecting device is a serial printer). When various signals are supplied to the head unit from the head unit control circuit in a state in which contact failure has occurred between the terminal arrangement area and the connection cable, it is likely that noise is superimposed on these signals, and the head unit malfunctions.

According to the above configuration, since the first terminal is provided at a position near the end of the terminal arrangement area, the possibility that the instruction signal (or the diagnosis control signal) is transmitted to the head unit when contact failure has occurred decreases as compared with the case where the first terminal is provided in a center area of the terminal arrangement area that is situated away from the end of the terminal arrangement area. Therefore, it is possible to increase the possibility that the determination process (or the diagnosis process) is stopped in a state in which contact failure has occurred as compared with the case where the first terminal is provided in a center area of the terminal arrangement area that is situated away from the end of the terminal arrangement area. Since the drive signal is supplied to the piezoelectric element on condition that a condition whereby the determination process (or the diagnosis process) is normally performed, and a condition whereby result of the determination is affirmative (or the result of the diagnosis is not a predetermined result), are satisfied, it is possible to reduce the possibility that the printing process is performed in a state in which contact failure has occurred. In other words, it is possible to prevent a situation in which the printing process is performed based on a signal on which noise is superimposed, prevent deterioration in the quality of the image formed by the printing process, and prevent a situation in which the printing process is performed in a state in which a decrease in safety has occurred.

BRIEF DESCRIPTION OF THE DRAWINGS

FIG. 8 illustrates a signal input to or output from a terminal ZN.

FIG. 10C is a timing chart illustrating a start-up process and a diagnosis process.

FIG. 14A illustrates the decoding results of the decoder DCa.

FIG. 14B illustrates the decoding results of the decoder DCa.

FIG. 14C illustrates the decoding results of the decoder DCs.

FIG. 18 is a block diagram illustrating the configuration of the connection state designation circuit 11a.

FIG. 19A illustrates the decoding results of the decoder DCa2.

FIG. 19B illustrates the decoding results of the decoder DCs2.

FIG. 21 illustrates a check result signal Stt.

DETAILED DESCRIPTION

Figure 1:
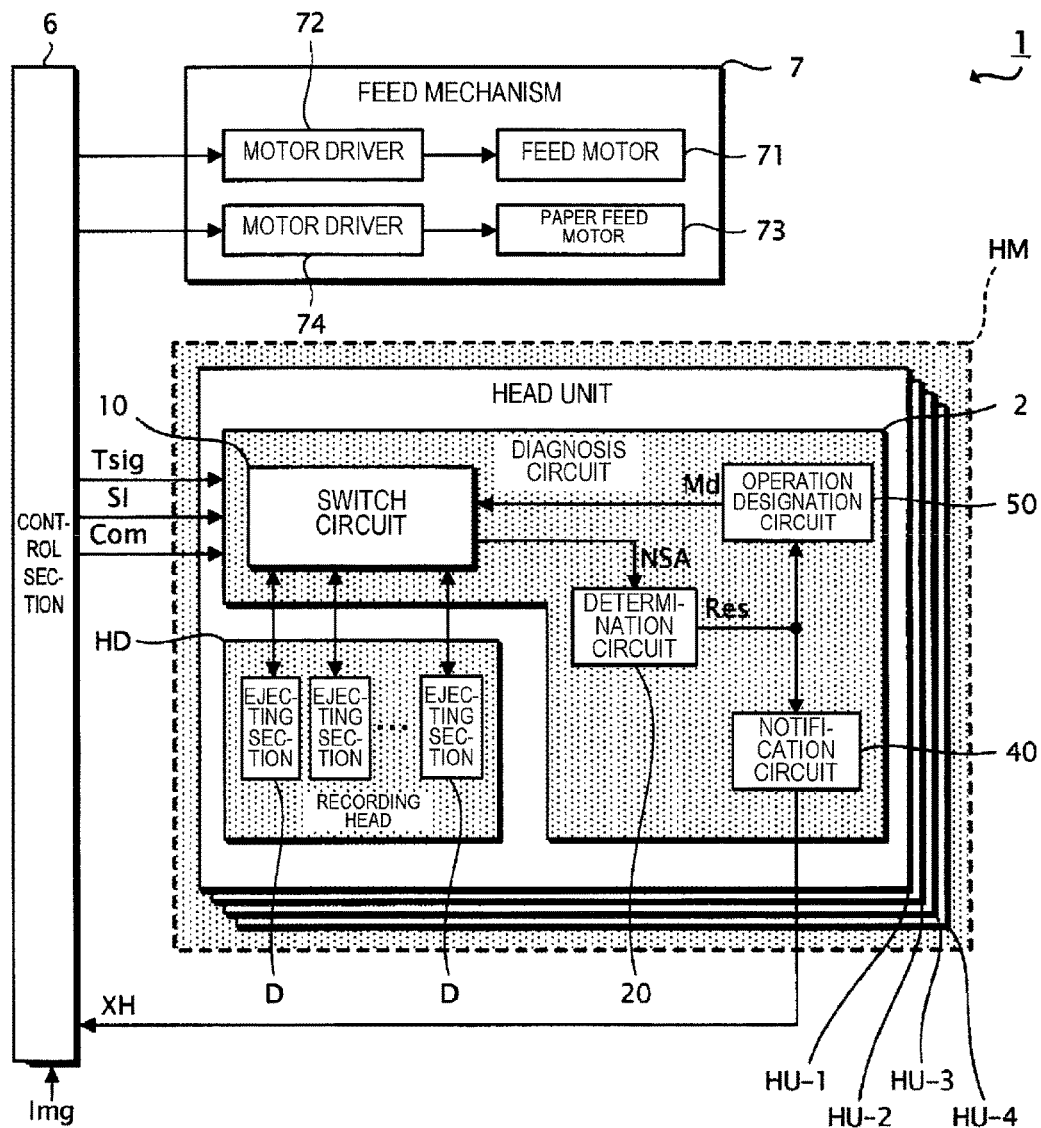
FIG. 1 is a block diagram illustrating the configuration of the inkjet printer 1 according to the first embodiment.

The exemplary embodiments of the invention are described below with reference to the drawings. Note that the dimensional relationship (e.g., scale) between each section (e.g., element) and the like illustrated in the drawings do not necessarily coincide with the actual dimensional relationship. Since the following exemplary embodiments are preferred embodiments of the invention, various technically preferred limitations are described in connection with the exemplary embodiments. Note that the scope of the invention is not limited to the following exemplary embodiments unless there is a description that expressly limits the scope of the invention.

A. First Embodiment

A liquid ejecting device according to a first embodiment of the invention is described below taking an example in which the liquid ejecting device is an inkjet printer that forms an image on a recording paper P (an example of "medium") by ejecting an ink (an example of "liquid") toward the recording paper P.

1. Outline of Inkjet Printer

The configuration of an inkjet printer 1 according to the first embodiment is described below with reference to FIGS. 1 and 2. Note that FIG. 1 is a functional block diagram illustrating an example of the configuration of the inkjet printer 1 according to the first embodiment, and FIG. 2 is a perspective view illustrating an example of a schematic internal structure of the inkjet printer 1.

The inkjet printer 1 receives print data Img that represents an image to be formed by the inkjet printer 1, and information that represents the number of copies of the image to be formed by the inkjet printer 1, from a host computer (not illustrated in the drawings) (e.g., personal computer or digital camera). The inkjet printer 1 performs a printing process that forms the image represented by the print data Img supplied from the host computer on the recording paper P.

Figure 2:
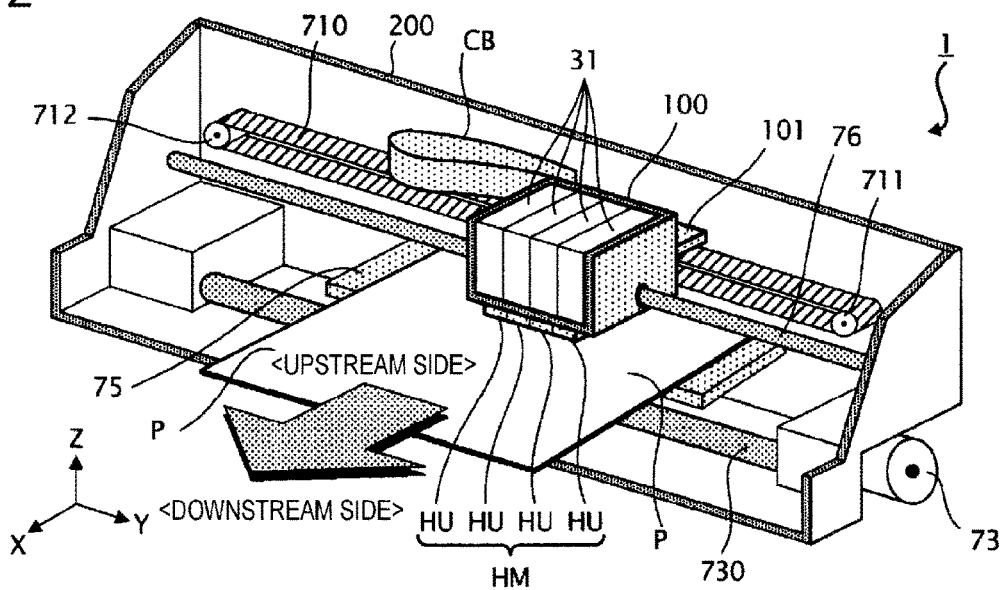
FIG. 2 is a perspective view illustrating a schematic internal structure of the inkjet printer 1.

As illustrated in FIG. 1, the inkjet printer 1 includes a head module HM that includes a plurality of ejecting sections D that eject an ink, a feed mechanism 7 that changes the relative position of the recording paper P with respect to the head module HM, and a control section 6 (an example of "head unit control circuit") that controls the operation of each section of the inkjet printer 1. The head module HM includes four head units HU. Each head unit HU includes the recording head HD that includes M ejecting sections D.

Note that the first embodiment illustrates an example in which the inkjet printer 1 is a serial printer. Specifically, the inkjet printer 1 implements the printing process by ejecting an ink from the ejecting section D while feeding the recording paper P in the sub-scan direction, and moving the head module HM in the main scan direction. The main scan direction corresponds to the +Y-direction and the −Y-direction illustrated in FIG. 2, and the sub-scan direction corresponds to the +X-direction illustrated in FIG. 2. Note that the +Y-direction and the −Y-direction may be hereinafter collectively referred to as "Y-axis direction", and the +X-direction and the −X-direction may be hereinafter collectively referred to as "X-axis direction".

As illustrated in FIG. 2, the inkjet printer 1 according to the first embodiment includes a housing 200, and a carriage 100 that can reciprocate in the Y-axis direction within the housing 200, and carries the head module HM.

The feed mechanism 7 reciprocates the carriage 100 in the Y-axis direction, and feeds the recording paper P in the +X-direction when the inkjet printer 1 performs the printing process to change the relative position of the recording paper P with respect to the head module HM so that an ink can be placed over the entire recording paper P.

As illustrated in FIG. 1, the feed mechanism 7 includes a feed motor 71 that serves as a drive source for reciprocating the carriage 100 in the Y-axis direction, a motor driver 72 that drives the feed motor 71, a paper feed motor 73 that serves as a drive source for feeding the recording paper P in the +X-direction, and a motor driver 74 that drives the paper feed motor 73. As illustrated in FIG. 2, the feed mechanism 7 includes a carriage guide shaft 76 that extends in the Y-axis direction, and a timing belt 710 that is supported by a pulley 711 that is rotated by the feed motor 71 and a pulley 712 that is rotatable, and extends in the Y-axis direction. The carriage 100 is supported by the carriage guide shaft 76 so as to be able to reciprocate in the Y-axis direction, and is secured on a predetermined part of the timing belt 710 through a securing tool 101. Therefore, the feed mechanism 7 can move the carriage 100 and the head module HM provided to the carriage 100 in the Y-axis direction along the carriage guide shaft 76 by rotating the pulley 711 using the feed motor 71.

As illustrated in FIG. 2, the feed mechanism 7 includes a platen 75 that is provided under the carriage 100 (i.e., in the −Z-direction with respect to the carriage 100), a paper feed roller (not illustrated in FIG. 2) that rotates when the paper feed motor 73 is driven, and feeds the recording paper P one by one onto the platen 75, and a paper delivery roller 730 that rotates when the paper feed motor 73 is driven, and feeds the recording paper P placed on the platen 75 to the paper outlet. Therefore, the feed mechanism 7 can feed the recording paper P on the platen 75 from the upstream side (the +X-direction) toward the downstream side (the −X-direction), as illustrated in FIG.

In the first embodiment, four ink cartridges 31 are placed in the carriage 100 of the inkjet printer 1, as illustrated in FIG. 2. More specifically, the ink cartridges 31 that correspond to four colors (CMYK) (i.e., cyan, magenta, yellow, and black) on a one-to-one basis are placed in the carriage 100.

Note that the configuration is not limited to the example illustrated in FIG. 2. The ink cartridges 31 may be provided outside the carriage 100.

The control section 6 includes a storage section 60 that stores a control program that controls the inkjet printer 1, and various types of information such as the print data Img supplied from the host computer, a central processing unit (CPU), and various circuits CC (see FIG. 6 described later). The control section 6 may include a programmable logic device such as a field-programmable gate array (FPGA) instead of a CPU.

The control section 6 is provided outside the carriage 100 (not illustrated in FIG. 2). As illustrated in FIG. 2, the control section 6 and the head module HM are electrically connected through a cable CB (an example of "connection cable"). In the first embodiment, the control section 6 and the head module HM are electrically connected through four cables CB1 to CB4 (not illustrated in FIG. 2) (see FIG. 6). In the first embodiment, a flexible flat cable is used as each cable CB.

The control section 6 controls the operation of each section of the inkjet printer 1 by causing the CPU to operate according to the control program stored in the storage section 60. For example, the control section 6 controls the operation of the head module HM and the feed mechanism 7 so as to implement the printing process that forms an image that corresponds to the print data Img on the recording paper P.

An outline of the operation of the control section 6 during the printing process is described below.

The CPU included in the control section 6 stores the print data Img supplied from the host computer in the storage section 60.

The control section 6 then generates various signals such as a print signal SI and a drive signal Com that control the operation of each head unit HU based on various types of data such as print data Img stored in the storage section 60. The drive signal Com is an analog signal that drives each ejecting section D. Therefore, the circuits CC included in the control section 6 according to the first embodiment include a DA conversion circuit, and the DA conversion circuit converts a digital drive signal generated by the CPU included in the control section 6 into the analog drive signal Com. The print signal SI is a digital signal that designates the drive mode of each ejecting section D during the printing process. More specifically, the print signal SI designates the drive mode of each ejecting section D by designating whether or not to supply the drive signal Com to each ejecting section D. For example, the drive mode of each ejecting section D is designated by designating whether or not to cause each ejecting section D to eject an ink when each ejecting section D is driven, or designating the amount of ink to be ejected from each ejecting section D when each ejecting section D is driven. Note that the print signal SI may be used to achieve a function that differs from the function that designates the drive mode of each ejecting section D during the printing process (as described in detail later).

The control section 6 generates a signal that controls the operation of the feed mechanism 7 based on the print signal SI and various types of data stored in the storage section 60, and controls the feed mechanism 7 so as to change the relative position of the recording paper P with respect to the head module HM.

The control section 6 controls the operation of the head module HM and the feed mechanism 7 as described above using the print signal SI and the like. The control section 6 thus controls each section of the inkjet printer 1 so as to implement the printing process that forms an image that corresponds to the print data Img on the recording paper P by regulating the presence or absence of ink ejection from the ejecting section D, the amount of ink to be ejected from the ejecting section D, the ink ejection timing, and the like.

The inkjet printer 1 according to the first embodiment performs a diagnosis process in addition to the printing process. The term "diagnosis process" used herein refers to a process that diagnoses the ink ejection capability of the ejecting section D. The control section 6 controls the operation of each section of the inkjet printer 1 so that the diagnosis process is performed at a timing before the printing process is performed after power has been supplied to the inkjet printer 1.

The diagnosis process includes an ejection capability determination process that determines whether or not the ejecting section D has a predetermined ejection capability (hereinafter referred to as "determination process"), a determination preparation process that prepares for the determination process, and a determination result handling process (e.g., a process that notifies the control section 6 of the determination result of the determination process) that is an ex-post process with respect to the determination process (as described in detail later).

The control section 6 designates the diagnosis target ejecting section D with respect to the ink ejection capability using the print signal SI. Specifically, the print signal SI designates the diagnosis target ejecting section D during the diagnosis process.

A process performed during a period until the diagnosis process is performed after power has been supplied to the inkjet printer 1 is referred to as "start-up process" (as described in detail later). Specifically, the inkjet printer 1 according to the first embodiment performs the start-up process after power has been supplied to the inkjet printer 1, performs the diagnosis process after completion of the start-up process, and performs the printing process after completion of the diagnosis process in response to a request from the user of the inkjet printer 1.

Again referring to FIG. 1, each head unit HU includes a recording head HD that includes M ejecting sections D (M is a natural number that satisfies 2≤M in the first embodiment). Note that the M ejecting sections D included in each head unit HU may be referred to as a first-stage ejecting section D, a second-stage ejecting section D, . . . , and an Mth-stage ejecting section D for convenience of explanation. The mth-stage ejecting section D (where the variable m is a natural number that satisfies 1≤m≤M) may be referred to as "ejecting section D[m]". The elements of the inkjet printer 1, the signals, and the like that correspond to the stage number m of the ejecting section D[m] may be indicated using the suffix "[m]" for convenience of explanation.

In the first embodiment, four head units HU and four ink cartridges 31 are provided on a one-to-one basis. Each ejecting section D receives an ink from the ink cartridge 31 that corresponds to the head unit HU to which each ejecting section D belongs. Each ejecting section D is filled with the ink supplied from the ink cartridge 31, and ejects the ink from a nozzle N. Specifically, the 4M ejecting sections D included in the head module HM can eject inks that respectively correspond to four colors (CMYK). Therefore, the inkjet printer 1 can print a full-color image using inks that respectively correspond to four colors (CMYK).

Note that the four head units HU may be referred to as head units HU-1 to HU-4 (see FIG. 1) when it is necessary to distinguish the four head units HU. In the first embodiment, the head unit HU-1 corresponds to the ink cartridge 31 that is filled with a black ink, the head unit HU-2 corresponds to the ink cartridge 31 that is filled with a cyan ink, the head unit HU-3 corresponds to the ink cartridge 31 that is filled with a magenta ink, and the head unit HU-4 corresponds to the ink cartridge 31 that is filled with a yellow ink, for example. An arbitrary head unit among the head units HU-1 to HU-4 may be referred to as "head unit HU-q" (where q is a natural number that satisfies 1≤q≤4).

As illustrated in FIG. 1, each head unit HU includes the recording head HD that includes M ejecting sections D, a switch circuit 10 that switches whether or not to supply the drive signal Com output from the control section 6 to each ejecting section D, a determination circuit 20 that performs the determination process that determines whether or not the ejecting section D has a predetermined ejection capability based on a detection signal NSA detected from the ejecting section D, and outputs a determination result signal Res that represents the determination result of the determination process, a notification circuit 40 that outputs a notification signal Xh that notifies the control section 6 of the determination result of the determination circuit 20 when result of the determination by the determination circuit 20 is negative, and an operation designation circuit 50 that outputs an operation mode designation signal Md that designates the operation mode of the switch circuit 10 corresponding to the determination result of the determination circuit 20.

The diagnosis process described above is performed by the switch circuit 10, the determination circuit 20, the notification circuit 40, and the operation designation circuit 50. The switch circuit 10, the determination circuit 20, the notification circuit 40, and the operation designation circuit

50 that are elements for performing the diagnosis process may be hereinafter referred to as "diagnosis circuit 2".

Note that the head unit HU may not include the notification circuit 40. Specifically, the diagnosis circuit 2 may not include the notification circuit 40. In other words, it suffices that the diagnosis circuit 2 include at least the switch circuit 10, the determination circuit 20, and the operation designation circuit 50.

The switch circuit 10 switches whether or not to supply the drive signal Com output from the control section 6 to each ejecting section D based on various signals such as the print signal SI and a diagnosis control signal Tsig. Note that the diagnosis control signal Tsig is a digital signal that is generated by the control section 6, and controls the execution of the diagnosis process (as described in detail later).

The switch circuit 10 switches whether or not to supply the detection signal NSA detected from the ejecting section D to the determination circuit 20 based on various signals such as the print signal SI and the diagnosis control signal Tsig. Note that the detection signal NSA is a signal that represents the potential of an electrode of a piezoelectric element PZ included in the ejecting section D (see FIG. 3) (as described in detail later).

2. Outline of Recording Head and Ejecting Section

The recording head HD and the ejecting section D provided to the recording head HD are described below with reference to FIGS. 3 and 4.

Figure 3:
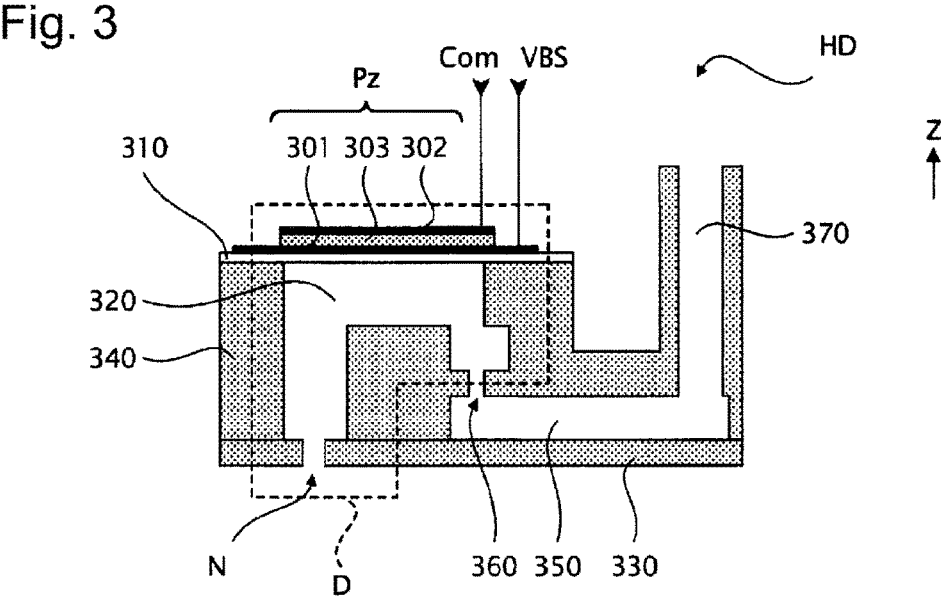
FIG. 3 is a schematic cross-sectional view illustrating the recording head HD.

FIG. 3 illustrates an example of a schematic partial cross-sectional view of the recording head HD. Note that FIG. 3 illustrates one ejecting section D among the M ejecting sections D included in each recording head HD, a reservoir 350 that communicates with the ejecting section D through an ink inlet 360, and an ink inlet 370 through which an ink is supplied from the ink cartridge 31 to the reservoir 350.

As illustrated in FIG. 3, the ejecting section D includes the piezoelectric element PZ, a cavity 320 (an example of "pressure chamber") that is filled with an ink, the nozzle N that communicates with the cavity 320, and a diaphragm 310. The ejecting section D is configured so that the ink contained in the cavity 320 is ejected through the nozzle N when the drive signal Com has been supplied to the piezoelectric element PZ and the piezoelectric element PZ has been driven by the drive signal Com. The cavity 320 is a space defined by a cavity plate 340, a nozzle plate 330 in which the nozzle N is formed, and the diaphragm 310. The cavity 320 communicates with the reservoir 350 through the ink inlet 360. The reservoir 350 communicates with the ink cartridge 31 through the ink inlet 370.

In the first embodiment, a unimorph (monomorph)-type piezoelectric element as illustrated in FIG. 3 is used as the piezoelectric element PZ, for example. Note that the piezoelectric element PZ is not limited to a unimorph-type piezoelectric element. A bimorph-type piezoelectric element, a stacked-type piezoelectric element, or the like may also be used as the piezoelectric element PZ.

The piezoelectric element PZ includes an upper electrode 302 (an example of "first electrode"), a lower electrode 301 (an example of "second electrode"), and a piezoelectric material 303 that is provided between the lower electrode 301 and the upper electrode 302. When the lower electrode 301 has been electrically connected to a power supply line LHb (see FIG. 9) that is set to a potential VBS, and the drive signal Com has been supplied to the upper electrode 302 (i.e., when a voltage has been applied between the lower electrode 301 and the upper electrode 302), the piezoelectric element PZ is displaced in the +Z-direction or the −Z-direction corresponding to the applied voltage and vibrates as a result of displacement. Note that the +Z-direction and the −Z-direction may be hereinafter collectively referred to as "Z-axis direction".

The diaphragm 310 is provided to cover the upper opening of the cavity plate 340. The lower electrode 301 is bonded to the diaphragm 310. Therefore, when the piezoelectric element PZ vibrates due to the drive signal Com, the diaphragm 310 also vibrates. The volume of the cavity 320 (i.e., the pressure inside the cavity 320) changes due to the vibration of the diaphragm 310, and the ink with which the cavity 320 is filled is ejected through the nozzle N. When the amount of ink in the cavity 320 has decreased due to ejection, the ink is supplied to the cavity 320 from the reservoir 350. The ink is supplied to the reservoir 350 from the ink cartridge 31 through the ink inlet 370.

Figure 4:
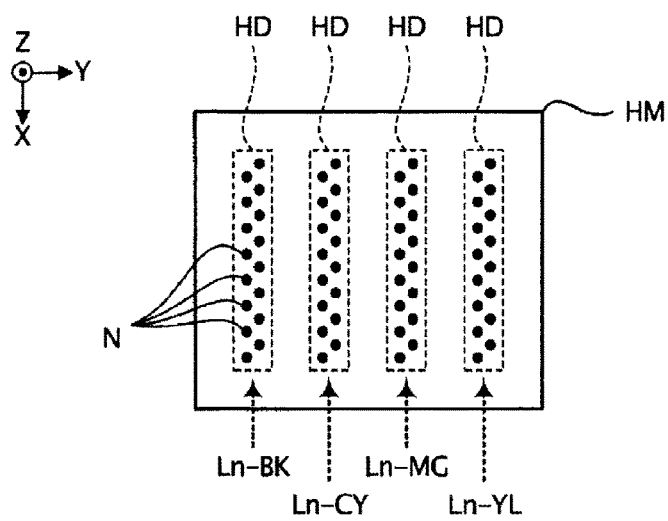
FIG. 4 is a plan view illustrating an example of the arrangement of nozzles N in the head module HM.

FIG. 4 illustrates an example of the arrangement of the four recording heads HD included in the head module HM and the 4M nozzles N provided to the four recording heads HD when the inkjet printer 1 is viewed in planar view in the +Z-direction or the −Z-direction.

As illustrated in FIG. 4, a nozzle row Ln is provided to each recording head HD included in the head module HM. Each nozzle row Ln includes a plurality of nozzles N that are arranged in a predetermined direction so as to form a row. In the first embodiment, each nozzle row Ln includes M nozzles N that are arranged in the X-axis direction so as to form a row, for example. Note that the term "row" used herein includes a case where the elements of the row are arranged along one straight line, and a case where the elements of the row are arranged to have a predetermined width. In the first embodiment, the M nozzles N that belong to each nozzle row Ln are disposed in a staggered arrangement so that the even-numbered nozzles N and the odd-numbered nozzles N in the +X-direction differ in position in the Y-axis direction.

Note that the nozzle row Ln illustrated in FIG. 4 is merely an example. The M nozzles N that belong to each nozzle row Ln may be disposed linearly, and each nozzle row Ln may extend in a direction that differs from the X-axis direction.

As illustrated in FIG. 4, four nozzle rows Ln provided to the head module HM are referred to as a nozzle row Ln-BK, a nozzle row Ln-CY, a nozzle row Ln-MG, and a nozzle row Ln-YL. The nozzle row Ln-BK is the nozzle row Ln in which the nozzles N provided to the ejecting sections D that eject the black ink are arranged, the nozzle row Ln-CY is the nozzle row Ln in which the nozzles N provided to the ejecting sections D that eject the cyan ink are arranged, the nozzle row Ln-MG is the nozzle row Ln in which the nozzles N provided to the ejecting sections D that eject the magenta ink are arranged, and the nozzle row Ln-YL is the nozzle row Ln in which the nozzles N provided to the ejecting sections D that eject the yellow ink are arranged.

Although the first embodiment illustrates an example in which the number of nozzle rows Ln provided to each recording head HD is "1", two or more nozzle rows Ln may be provided to each recording head HD.

The operation that ejects the ink from the ejecting section D is described below with reference to FIG. 5.

Figure 5:
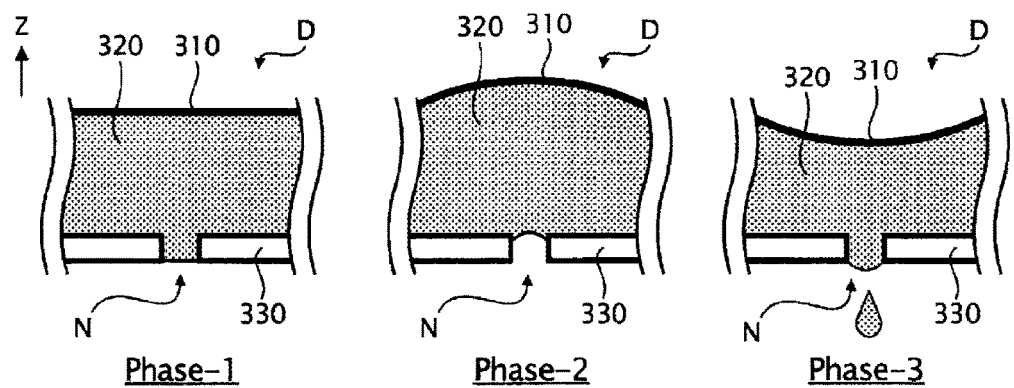
FIG. 5 illustrates a change in the cross-sectional shape of the ejecting section D when a drive signal Com has been supplied.

FIG. 5 illustrates the operation that ejects the ink from the ejecting section D. As illustrated in FIG. 5, the control section 6 changes the potential of the drive signal Com supplied to the piezoelectric element PZ included in the ejecting section D in a Phase-1 state to produce a strain that displaces the piezoelectric element PZ in the +Z-direction, so that the diaphragm 310 included in the ejecting section D is warped in the +Z-direction, for example. The volume of the cavity 320 included in the ejecting section D thus increases as compared with that in the Phase-1 state (see the Phase-2 state illustrated in FIG. 5). The control section 6 changes the potential of the drive signal Com in the Phase-2 state to produce a strain that displaces the piezoelectric element PZ in the −Z-direction, so that the diaphragm 310 included in the ejecting section D is warped in the −Z-direction, for example. The volume of the cavity 320 thus rapidly decreases (see the Phase-3 state illustrated in FIG. 5), and part of the ink with which the cavity 320 is filled is ejected through the nozzle N (that communicates with the cavity 320) as an ink droplet.

3. Connection Between Control Section and Head Unit

The connection between the control section 6 and the head module HM is described below with reference to FIGS. 6 to 8.

Figure 6:
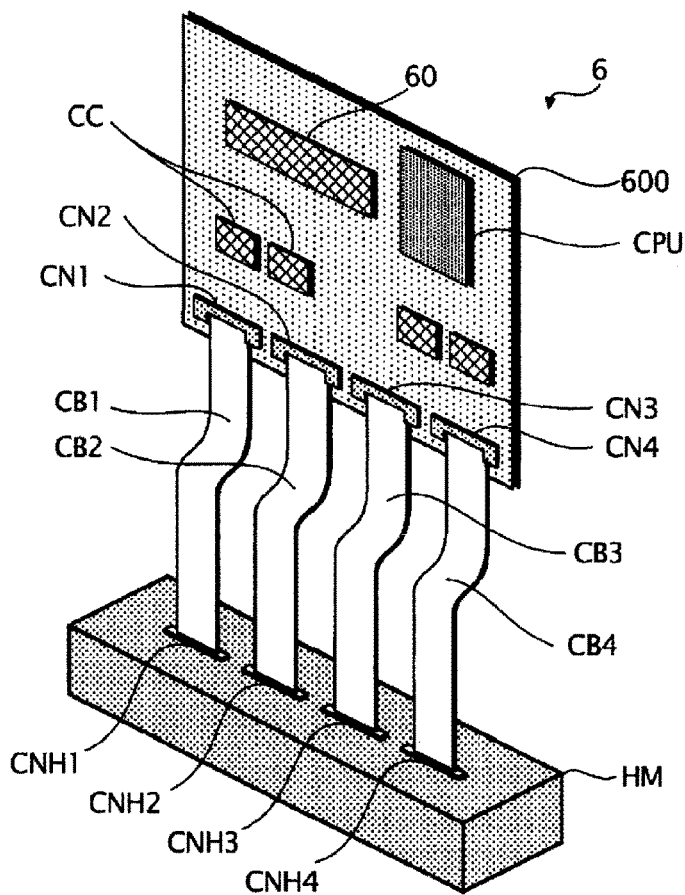
FIG. 6 illustrates the connection between the control section 6 and the head module HM.

FIG. 6 illustrates an example of the connection between the control section 6 and the head module HM.

As illustrated in FIG. 6, the control section 6 includes a substrate 600, and various elements (e.g., CPU, storage section 60, various circuits CC, and four connectors CN (CN1 to CN4)) that are provided to the substrate 600. The control section 6 is provided outside the carriage 100, and is electrically connected to the head module HM provided to the carriage 100 through the four cables CB (CB1 to CB4). More specifically, the connector CNk (where k is a natural number that satisfies 1≤k≤4) of the control section 6 and a connector CNHk of the head module HM are electrically connected through the cable CBk.

Figure 7:
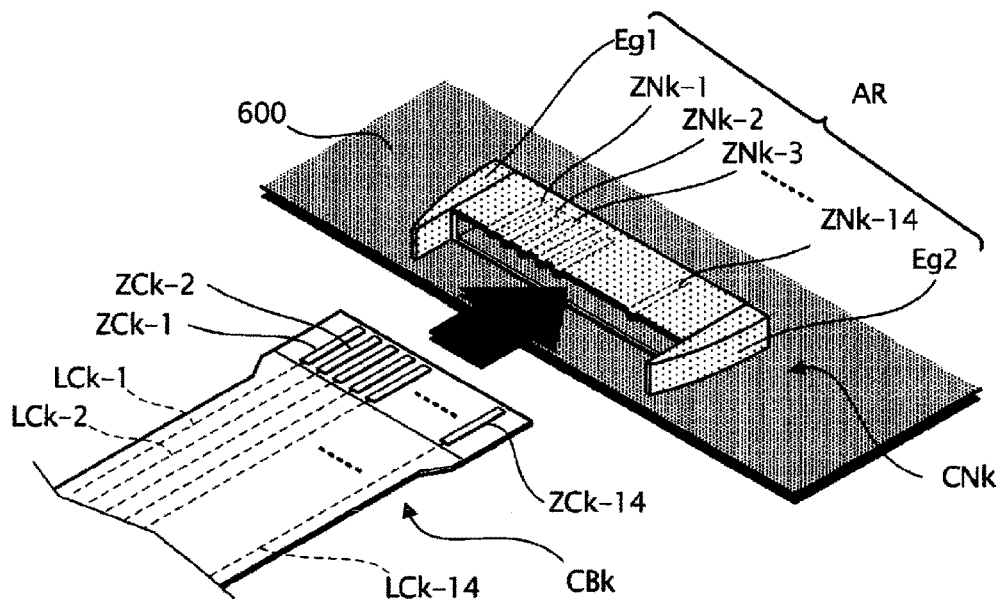
FIG. 7 illustrates a connector CN and a cable CB.

FIG. 7 illustrates the structure of the connector CN, and the structure of the cable CB. Note that FIG. 7 illustrates a connector CNk among the four connectors CN1 to CN4 provided to the inkjet printer 1, and a cable CBk among the four cables CB1 to CB4 provided to the inkjet printer 1 that is connected to the connector CNk.

As illustrated in FIG. 7, the connector CNk includes at least fourteen terminals ZNk-1 to ZNk-14 that are provided in a terminal arrangement area AR, and are arranged between one end Eg1 and the other end Eg2. As illustrated in FIG. 7, the cable CBk includes at least fourteen lines LCk-1 to LCk-14. When the cable CBk is connected to the connector CNk, the fourteen terminals ZNk-1 to ZNk-14 and the fourteen lines LCk-1 to LCk-14 are electrically connected through terminals ZCk-1 to ZCk-14 of the cable CBk, respectively. More specifically, the terminal ZNk-j (where j is a natural number that satisfies 1≤j≤14) of the connector CNk and the line LCk-j of the cable CBk are electrically connected through the terminal ZCk-j of the cable CBk. A signal output from the terminal ZNk-j is transmitted to the head module HM through the line LCk-j.

FIG. 8 illustrates an example of the signals input to and output from the terminal ZNk-j of each of the connectors CN1 to CN4.

As illustrated in FIG. 8, the control section 6 outputs signals (e.g., diagnosis control signal Tsig, drive signal Com, print signal SI, change signal CH, clock signal CL, latch signal LAT, and N-charge signal NCH) to the head module HM through the connectors CN1 to CN4. Note that the change signal CH and the latch signal LAT are digital signals used to designate the period in which an ink is ejected from the ejecting section D. The N-charge signal NCH is a digital signal used to designate to supply the drive signal Com to the M ejecting sections D[1] to D[M] provided to the head unit HU during the maintenance of the inkjet printer 1, for example. Note that the change signal CH, the N-charge signal NCH, and the like may be used to achieve a function that differs from the function described above during the diagnosis process or the start-up process (as described in detail later).

The detection signal NSA, the notification signal Xh, a temperature signal HT, and the like are input to the connectors CN1 to CN4 of the control section 6 from the head unit HU. The temperature signal HT is a signal that is output from a temperature detector (not illustrated in the drawings) provided to the head module HM, and represents the temperature of a predetermined area of the head module HM. As stated above, the notification signal Xh is a signal that represents the determination result of the determination circuit 20 during the diagnosis process, but additionally, the notification signal Xh may represent the detection result of an overheating detection circuit (not illustrated in the drawings) provided to each head unit HU. The overheating detection circuit is a circuit that is provided to each head unit HU in order to detect whether or not the temperature of the head unit HU has exceeded a predetermined temperature.

A plurality of terminals ZN that are set to a predetermined potential (e.g., ground potential GND or power supply potential) are also provided to the connectors CN1 to CN4 of the control section 6.

The relationship between the signals and the like that are input to or output from the connectors CN1 to CN4, and the terminals ZN1-1 to ZN4-14 of the connectors CN1 to CN4, is described in detail below.

As illustrated in FIG. 8, the diagnosis control signal Tsig is output from the terminal ZN1-2, the drive signal Com is output from the terminals ZN1-5, ZN1-7, ZN2-9, ZN2-11, ZN3-9, ZN3-11, ZN4-5, and ZN4-7, the print signal SI is output from the terminals ZN1-13, ZN2-1, ZN2-3, ZN2-5, ZN3-1, ZN3-3, ZN4-11, and ZN4-13, the change signal CH is output from the terminal ZN1-9, the clock signal CL is output from the terminal ZN1-11, a latch signal LAT is output from the terminal ZN2-6, and the N-charge signal NCH is output from the terminal ZN3-6.

In the first embodiment, the control section 6 supplies the drive signal Com on a head unit (HU) basis. In FIG. 8, the drive signal Com that is supplied to the head unit HU-q from the control section 6 is referred to as "drive signal Com-q". Specifically, the control section 6 supplies the drive signals Com-1 to Com-4 to the head module HM. The drive signals Com-1 to Com-4 may be identical to each other as to the waveform, or may differ from each other as to the waveform.

In the first embodiment, the print signal SI includes individual designation signals Sd[1] to Sd[M]. The individual designation signal Sd[m] designates the drive mode of the ejecting section D[m] during the printing process, and designates whether or not to set the ejecting section D[m] to be the diagnosis target with respect to the ink ejection capability during the diagnosis process. The ejecting section D[m] that has been designated as the diagnosis target during the diagnosis process may be hereinafter referred to as "diagnosis target ejecting section D-O[m]". Note that the first embodiment illustrates an example in which the individual designation signal Sd[m] is a 2-bit digital signal.

The control section 6 according to the first embodiment generates a print signal SI1 that includes the individual designation signals Sd[1] to Sd[M1] that correspond to the first-stage to M1th-stage ejecting sections D[1] to D[M1], and a print signal SI2 that includes the individual designation signals Sd[M1+1] to Sd[M] that correspond to the (M1+1)th-stage to Mth-stage ejecting sections D[M1+1] to D[M]. Note that M1 is a natural number that satisfies 1≤M1≤M−1. Note that the control section 6 may generate the print signals SI1 and SI2 as a single print signal SI.

In FIG. 8, the print signal SI1 that is supplied to the head unit HU-q from the control section 6 is referred to as "print signal SI1-$q$", and the print signal SI2 that is supplied to the head unit HU-q from the control section 6 is referred to as "print signal SI2-$q$".

As illustrated in FIG. 8, the temperature signal HT is input to the terminal ZN3-5, the detection signal NSA is input to the terminal ZN4-2, and the notification signal Xh is input to the terminal ZN4-9. The terminals ZN1-4, ZN1-6, ZN2-8, ZN2-10, ZN3-8, ZN3-10, ZN4-4, and ZN4-6 are set to a potential VBS, the terminal ZN2-7 is set to a potential VHV that is a high-potential-side power supply potential of the drive signal Com, the terminals ZN1-8 and ZN3-7 are set to a potential VDD that is a high-potential-side power supply potential for the logic circuit (e.g., switch circuit 10), and the remaining terminals are set to a ground potential GND.

Note that the potential VHV is higher than the potential VDD. Specifically, the digital signals (e.g., diagnosis control signal Tsig) for the logic circuit have an amplitude smaller than that of the analog drive signal Com that is used to drive the ejecting section D.

4. Configuration of Head Unit

The configuration of the head unit HU is described below with reference to FIG. 9. Note that the following description focuses on one head unit HU among the head units HU-1 to HU-4, but is similarly applied to the remaining head units HU.

Figure 9:
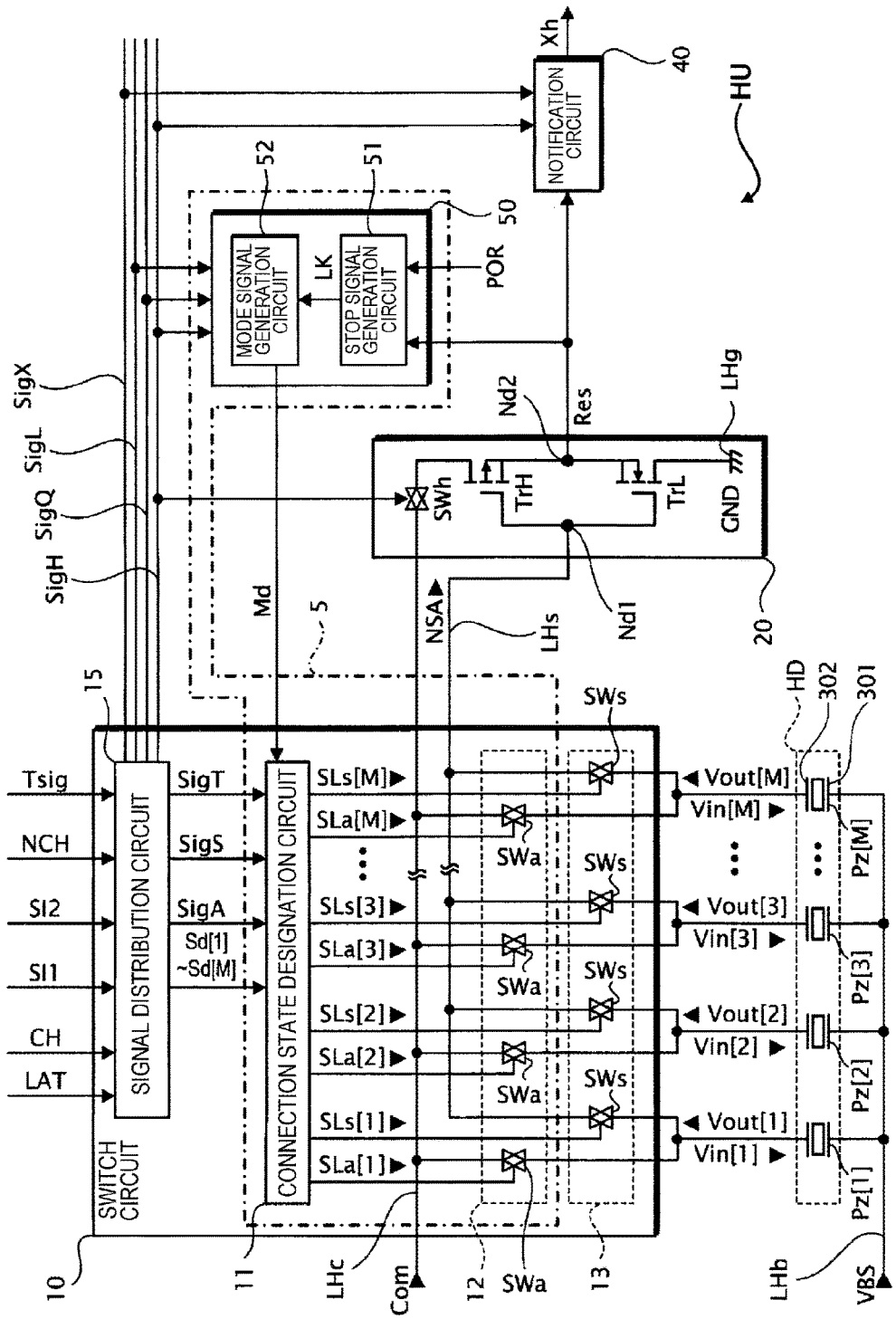
FIG. 9 is a block diagram illustrating the configuration of the head unit HU.

FIG. 9 is a block diagram illustrating an example of the configuration of the head unit HU. As described above, the head unit HU according to the first embodiment includes the recording head HD, the switch circuit 10, the determination circuit 20, the notification circuit 40, and the operation designation circuit 50. The head unit HU includes an internal line LHc (an example of "first line") to which the drive signal Com is supplied from the control section 6 through the connector CNH, an internal line LHs (an example of "second line") through which the detection signal NSA detected from the ejecting section D is supplied to the determination circuit 20, and an internal line LHg that is set to the ground potential GND.

Figure 10A:
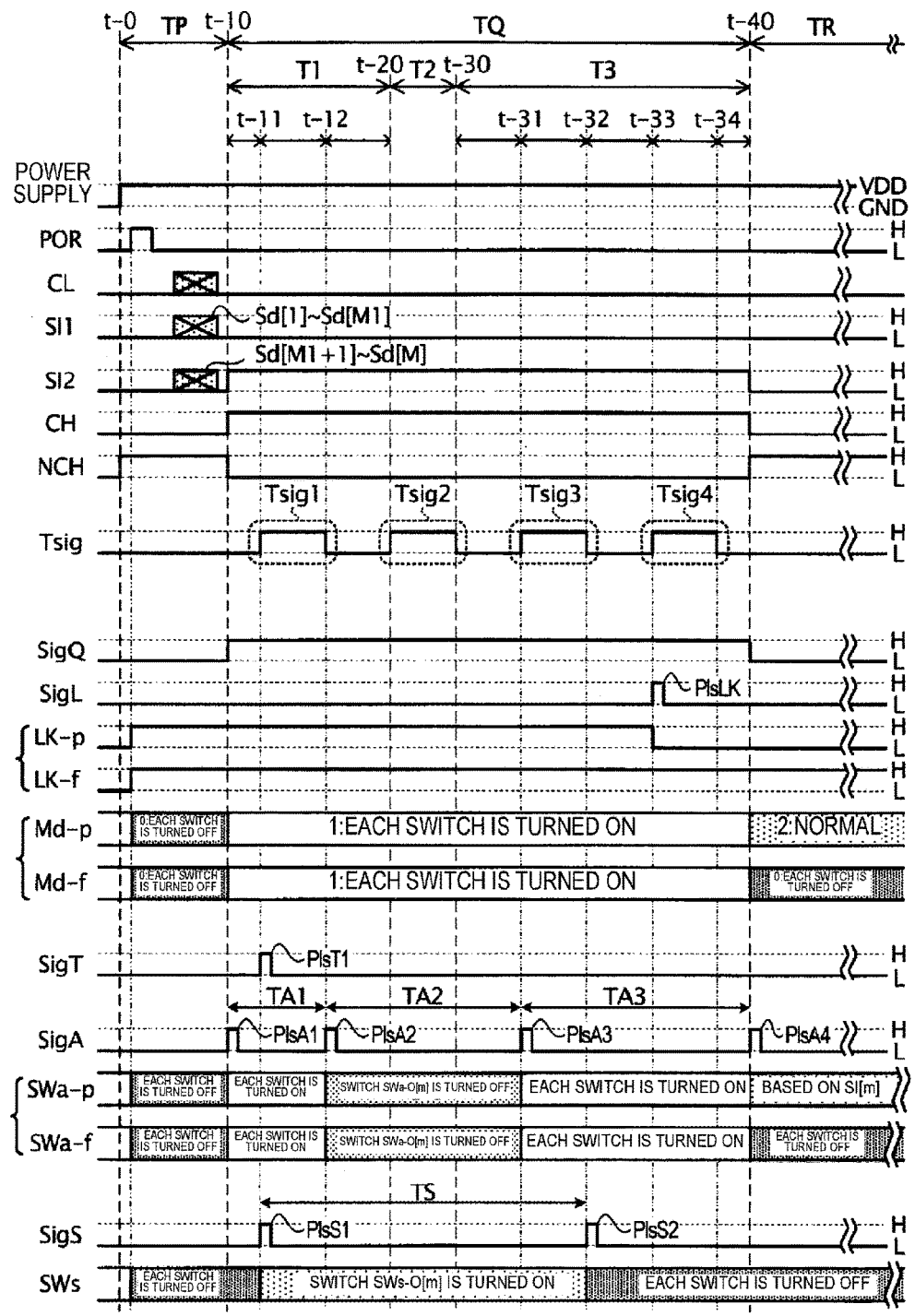
FIG. 10A is a timing chart illustrating a start-up process and a diagnosis process.
Figure 10B:
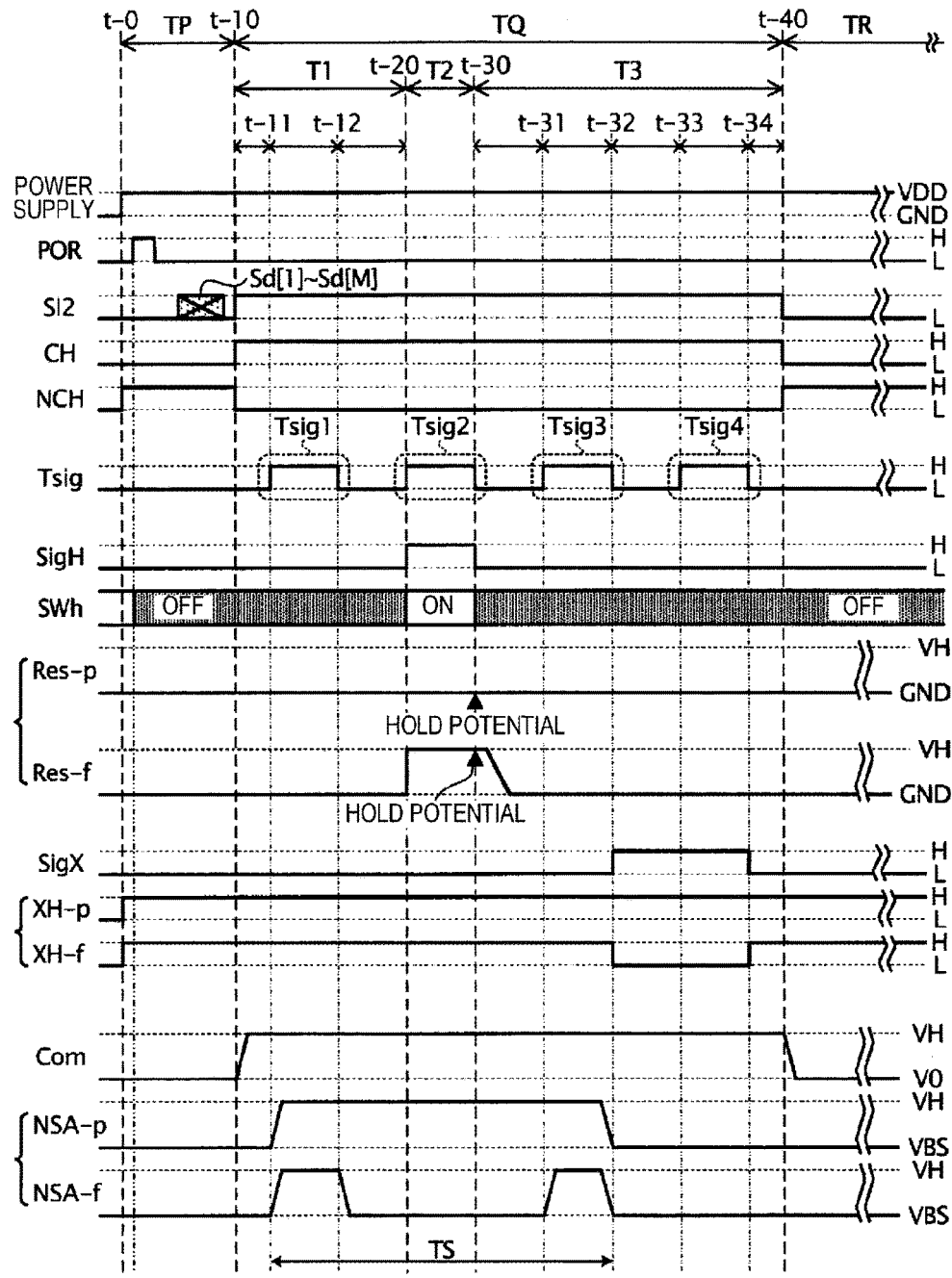
FIG. 10B is a timing chart illustrating a start-up process and a diagnosis process.

In the first embodiment, the drive signal Com is set to the potential VII (an example of "predetermined potential") during the period in which the diagnosis process is performed (see FIG. 10B). In the first embodiment, the potential VII is higher than the ground potential GND and the potential VBS, and is lower than the potential VHV.

As illustrated in FIG. 9, the switch circuit 10 includes a connection state switch circuit 12 that switches the connection state between the internal line LHc and the recording head HD, a connection state switch circuit 13 that switches the connection state between the internal line LHs and the recording head HD, a connection state designation circuit 11 that designates the connection state that is switched by the connection state switch circuit 12 and the connection state that is switched by the connection state switch circuit 13, and a signal distribution circuit 15 that generates the signal that controls each section of the head unit HU based on the signals supplied from the control section 6, and distributes the generated signal.

The connection state switch circuit 12 includes M switches SWa (SWa[1] to SWa[M]) that are provided to correspond to the M ejecting sections D on a one-to-one basis. The mth-stage switch SWa[m] among the M switches SWa that corresponds to the mth-stage ejecting section D[m] connects or disconnects the internal line LHc to or from the upper electrode 302 of the piezoelectric element PZ[m] provided to the ejecting section D[m] corresponding to a connection state designation signal SLa[m] output from the connection state designation circuit 11. In the first embodiment, a transmission gate is used as the switch SWa[m].

The connection state switch circuit 13 includes M switches SWs (SWs[1] to SWs[M]) that are provided to correspond to the M ejecting sections D on a one-to-one basis. The mth-stage switch SWs[m] among the M switches SWs that corresponds to the mth-stage ejecting section D[m] connects or disconnects the internal line LHs to or from the upper electrode 302 of the piezoelectric element PZ[m] provided to the ejecting section D[m] corresponding to a connection state designation signal SLs[m] output from the connection state designation circuit 11. In the first embodiment, a transmission gate is used as the switch SWs[m].

Note that the switch SWa[m] that is provided corresponding to the diagnosis target ejecting section D-O[m] may be referred to as "switch SWa-O[m]" (an example of "first switch"), and the switch SWs[m] that is provided corresponding to the diagnosis target ejecting section D-O[m] may be referred to as "switch SWs-O[m]" (an example of "second switch").

The signal distribution circuit 15 supplies the individual designation signals Sd[1] to Sd[M] included in the print signals SI1 and SI2 to the connection state designation circuit 11 in synchronization with the clock signal CL (not illustrated in FIG. 9).

The signal distribution circuit 15 generates a permission signal SigQ based on the print signal SI, the change signal CH, and the N-charge signal NCH during the diagnosis process. The permission signal SigQ is a signal that permits the diagnosis process that is performed on the head unit HU.

The signal distribution circuit 15 generates a determination signal SigT based on the diagnosis control signal Tsig, generates a designation signal SigA based on the print signal SI, the change signal CH, or the N-charge signal NCH, and the diagnosis control signal Tsig, and generates a designation signal SigS based on the diagnosis control signal Tsig during the diagnosis process. The determination signal SigT is a signal that determines whether or not it is appropriate to ON/OFF-control the switches SWa[1] to SWa[M] and the switches SWs[1] to SWs[M] corresponding to the individual designation signals Sd[1] to Sd[M]. The designation signal SigA is a signal that designates the period in which the connection state designation signal SLa[m] is supplied to the switch SWa[m]. The designation signal SigS is a signal that designates the period in which the connection state designation signal SLs[m] is supplied to the switch SWs[m].

The signal distribution circuit 15 generates a designation signal SigH based on the diagnosis control signal Tsig, generates a designation signal SigL based on the diagnosis control signal Tsig, and generates a designation signal SigX based on the diagnosis control signal Tsig during the diagnosis process. The designation signal SigH is a signal that instructs the determination circuit 20 to perform the determination process. The designation signal SigL is a signal that designates the change timing of the signal level of a stop signal LK (described later). The designation signal SigX is a signal that designates the change timing of the signal level of the notification signal Xh.

The signal distribution circuit 15 generates the determination signal SigT based on the latch signal LAT, and generates the designation signal SigA based on the latch signal LAT and the change signal CH during the printing process.

As illustrated in FIG. 9, the connection state designation circuit 11 outputs connection state designation signals SLa[1] to SLa[M] that designate the connection state of the switches SWa[1] to SWa[M] included in the connection state switch circuit 12, and connection state designation signals SLs[1] to SLs[M] that designate the connection state of the switches SWs[1] to SWs[M] included in the connection state switch circuit 13. The switch SWa[m] is turned ON when the connection state designation signal SLa[m] is set to the high level, and is turned OFF when the connection state designation signal SLa[m] is set to the low level. The switch SWs[m] is turned ON when the connection state designation signal SLs[m] is set to the high level, and is turned OFF when the connection state designation signal SLs[m] is set to the low level. Note that the configuration of the connection state designation circuit 11 is described later.

As described above, the determination circuit 20 performs the determination process that determines whether or not the ejecting section D has a predetermined ejection capability. More specifically, the determination circuit 20 performs the determination process that determines whether or not the potential difference between the potential of the drive signal Com supplied through the internal line LHc and the potential of the detection signal NSA supplied through the internal line LHs is equal to or smaller than a predetermined potential difference, and outputs the determination result signal Res that represents the determination result.

Note that the term "predetermined ejection capability" used herein means that the piezoelectric element PZ provided to the ejecting section D can be displaced corresponding to the drive signal Com, and the ejecting section D can eject an ink in the mode specified by the drive signal Com. The expression "the ejecting section D can eject an ink in the mode specified by the drive signal Com" means that the ejecting section D can eject an ink in the amount specified by the waveform of the drive signal Com at the ejection speed specified by the waveform of the drive signal Com.

In the first embodiment, it is determined that the piezoelectric element PZ can be displaced corresponding to the drive signal Com when the piezoelectric element PZ has an electrical storage capability (an example of "predetermined electrical storage capability") that can maintain the potential of the upper electrode 302 for a predetermined period with predetermined accuracy, and the ejecting section D has a predetermined ejection capability. Specifically, the determination process according to the first embodiment is a process that determines whether or not the piezoelectric element PZ has a predetermined electrical storage capability. In other words, the diagnosis process according to the first embodiment is a process that diagnoses the electrical storage capability of the piezoelectric element PZ.

When it is determined that the piezoelectric element PZ has a predetermined electrical storage capability, and the ejecting section D has a predetermined ejection capability, the ejecting section D can eject an ink in the mode specified by the drive signal Com as long as a special situation (e.g., a situation in which the ink has dried, the nozzle N has clogged) has not occurred.

A state in which the ejecting section D cannot eject an ink in the mode specified by the drive signal Com is referred to as "abnormal ejection state". In the first embodiment, a special situation (e.g., a situation in which the ink has dried, the nozzle N has clogged) is not taken into consideration for convenience of explanation. Therefore, the term "abnormal ejection state" used in connection with the first embodiment refers to a state in which the piezoelectric element PZ does not have a predetermined electrical storage capability, and the ejecting section D does not have a predetermined ejection capability.

The relationship between the ink ejection capability of the ejecting section D and the determination result signal Res is described later.

As illustrated in FIG. 9, the determination circuit 20 includes a node Nd1 that is electrically connected to the internal line LHs, a node Nd2 (an example of "output node") that outputs the determination result signal Res, a P-channel transistor TrH (an example of "first transistor") of which the gate is electrically connected to the node Nd1, an N-channel transistor TrL (an example of "second transistor") of which the gate is electrically connected to the node Nd1, and a switch SWh (an example of "third switch") that connects or disconnects the transistor TrH to or from the internal line LHc.

The switch SWh is turned ON when the designation signal SigH is set to the high level, and is turned OFF when the designation signal SigH is set to the low level. The input terminal of the switch SWh is electrically connected to the internal line LHc. The source of the transistor TrH is electrically connected to the output terminal of the switch SWh, and the drain of the transistor TrH is electrically connected to the node Nd2. The source of the transistor TrL is set to the ground potential GND, and the drain of the transistor TrL is electrically connected to the node Nd2.

In the first embodiment, the determination circuit 20 is configured so that the transistors TrH and TrL are not turned ON at the same time. Specifically, the threshold voltage and the like with respect to the transistors TrH and TrL are determined so that the determination circuit 20 is set to a state in which one of the transistors TrH and TrL is turned ON, or a state in which the transistors TrH and TrL are turned OFF.

Figure 11A:
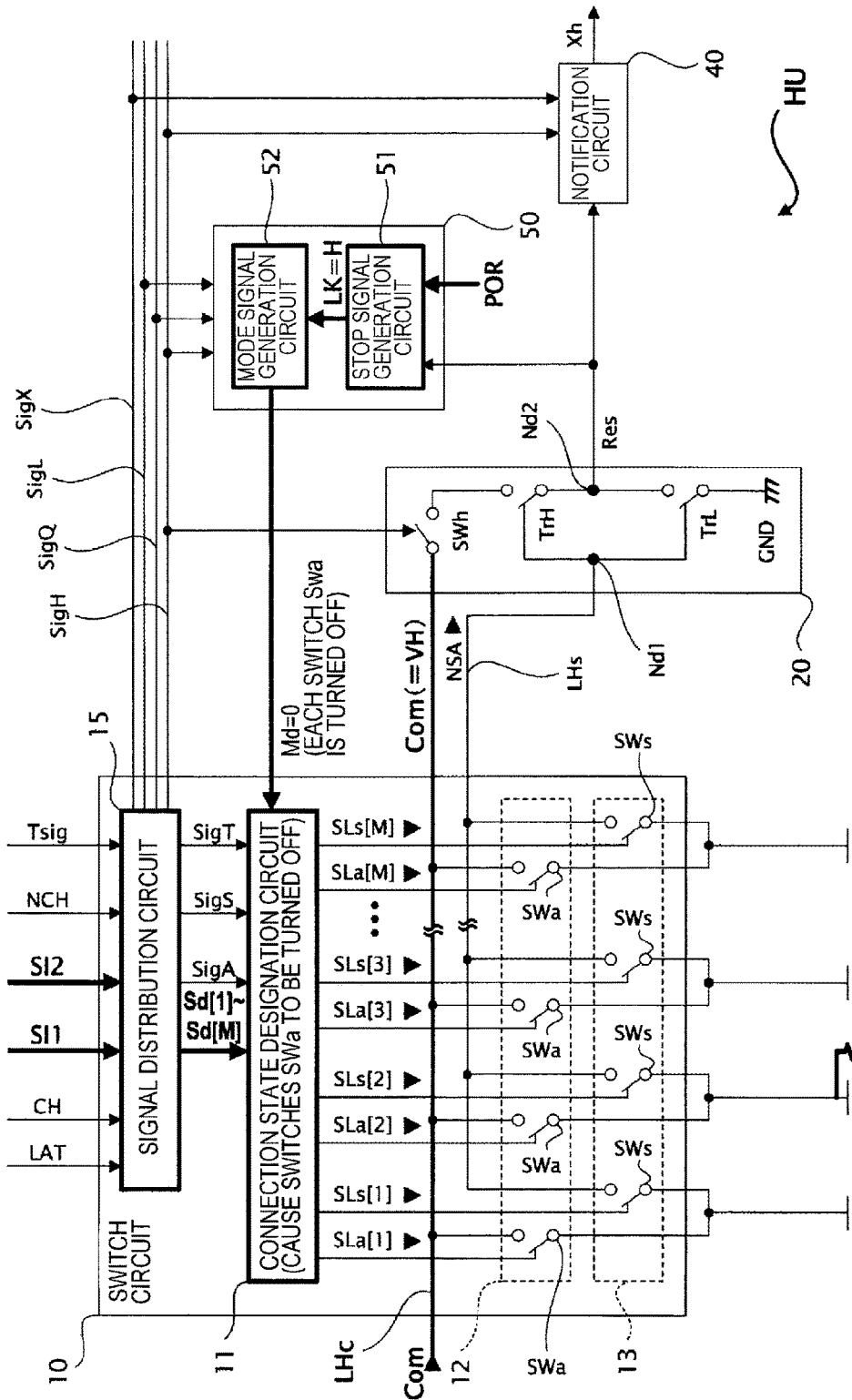
FIG. 11A illustrates a start-up process and a diagnosis process.
Figure 11B:
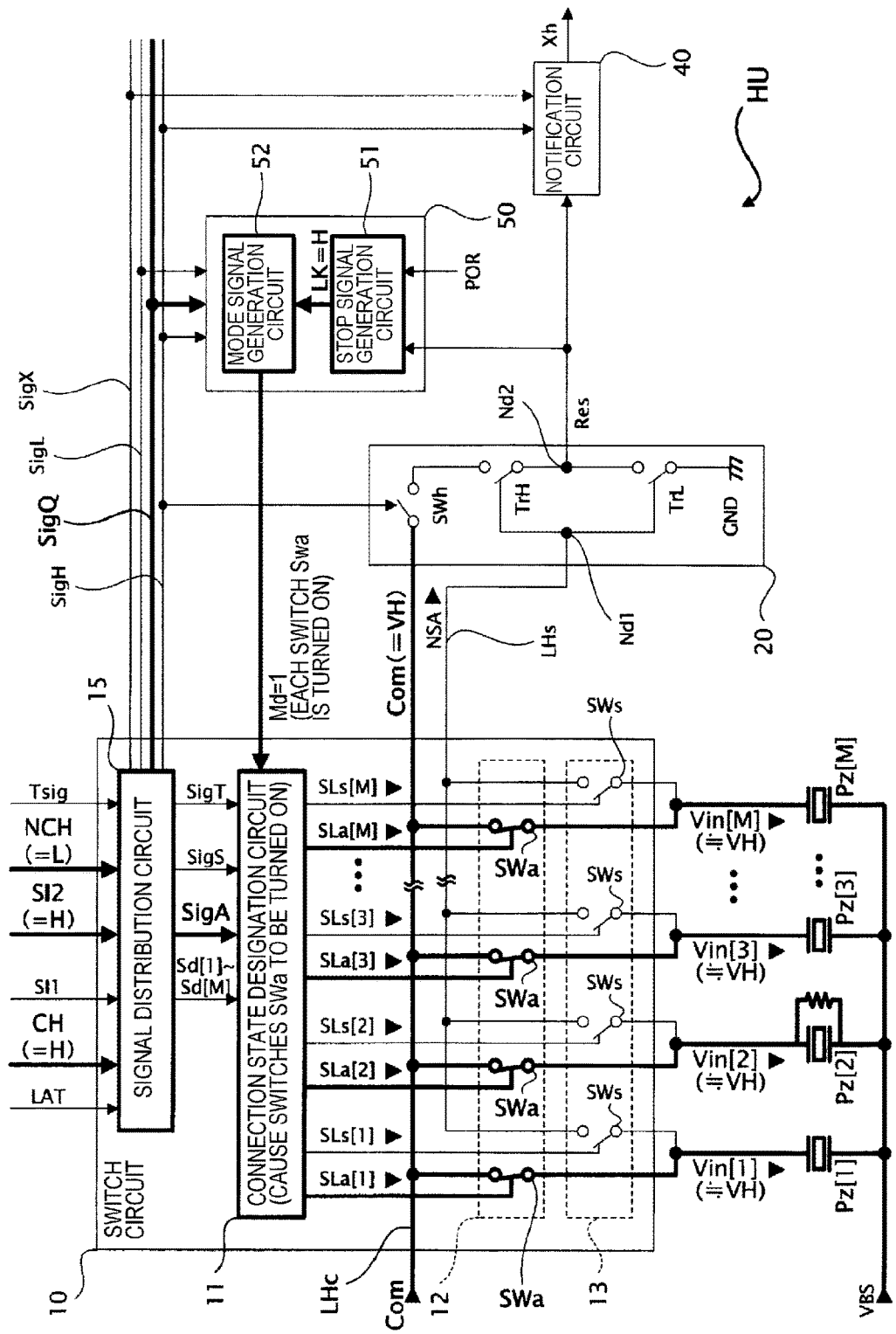
FIG. 11B illustrates a start-up process and a diagnosis process.
Figure 11C:
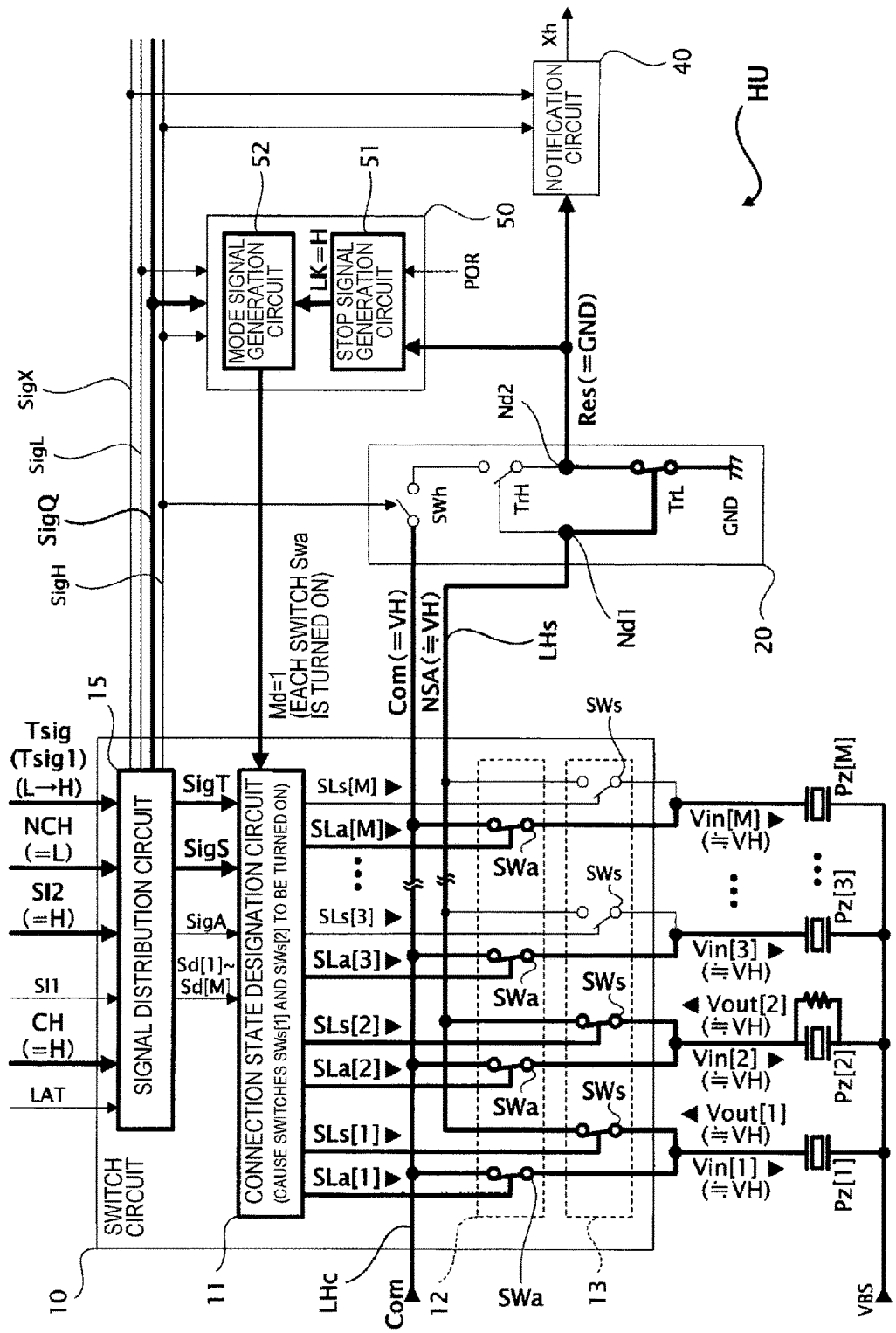
FIG. 11C illustrates a start-up process and a diagnosis process.
Figure 11D:
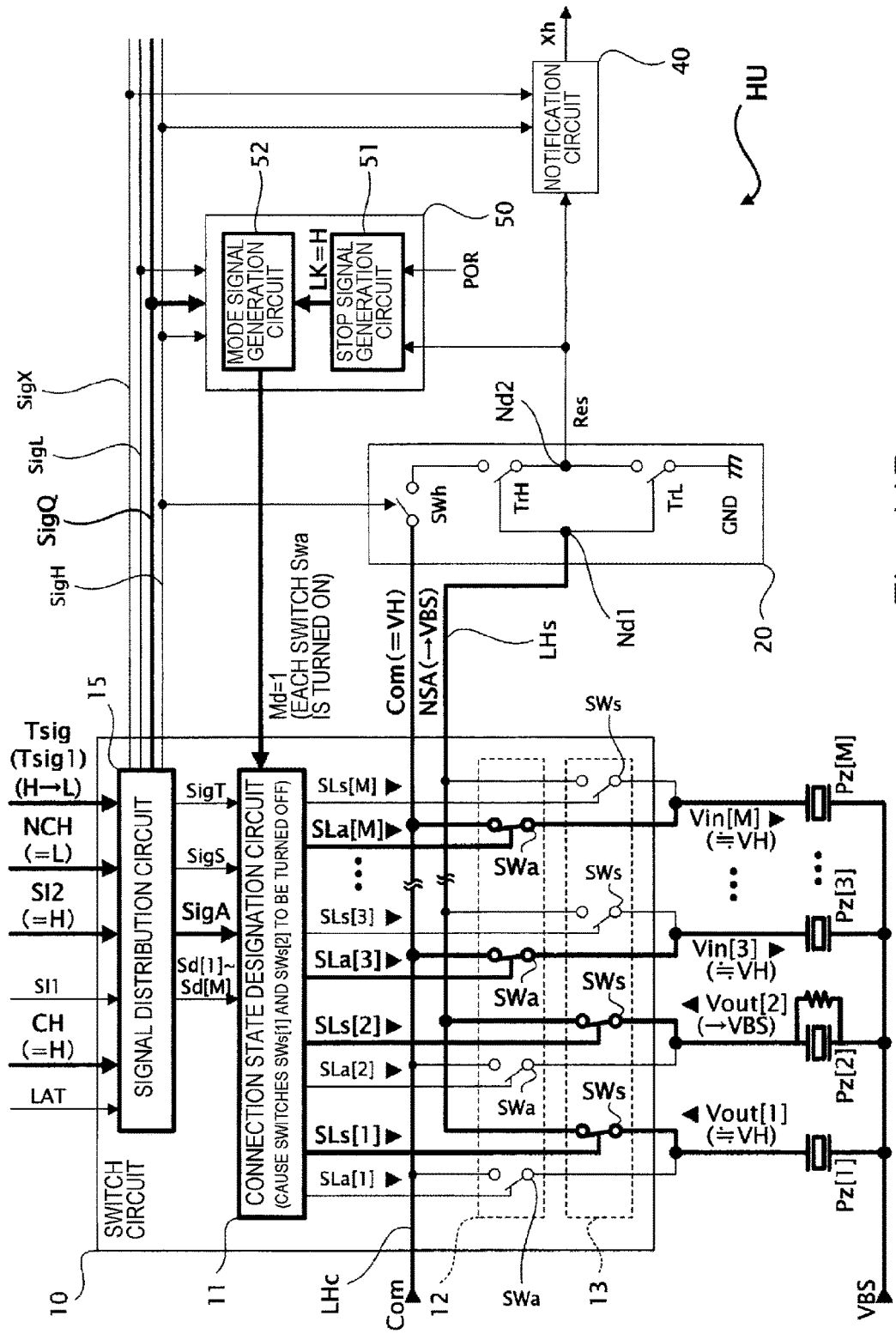
FIG. 11D illustrates a start-up process and a diagnosis process.
Figure 11E:
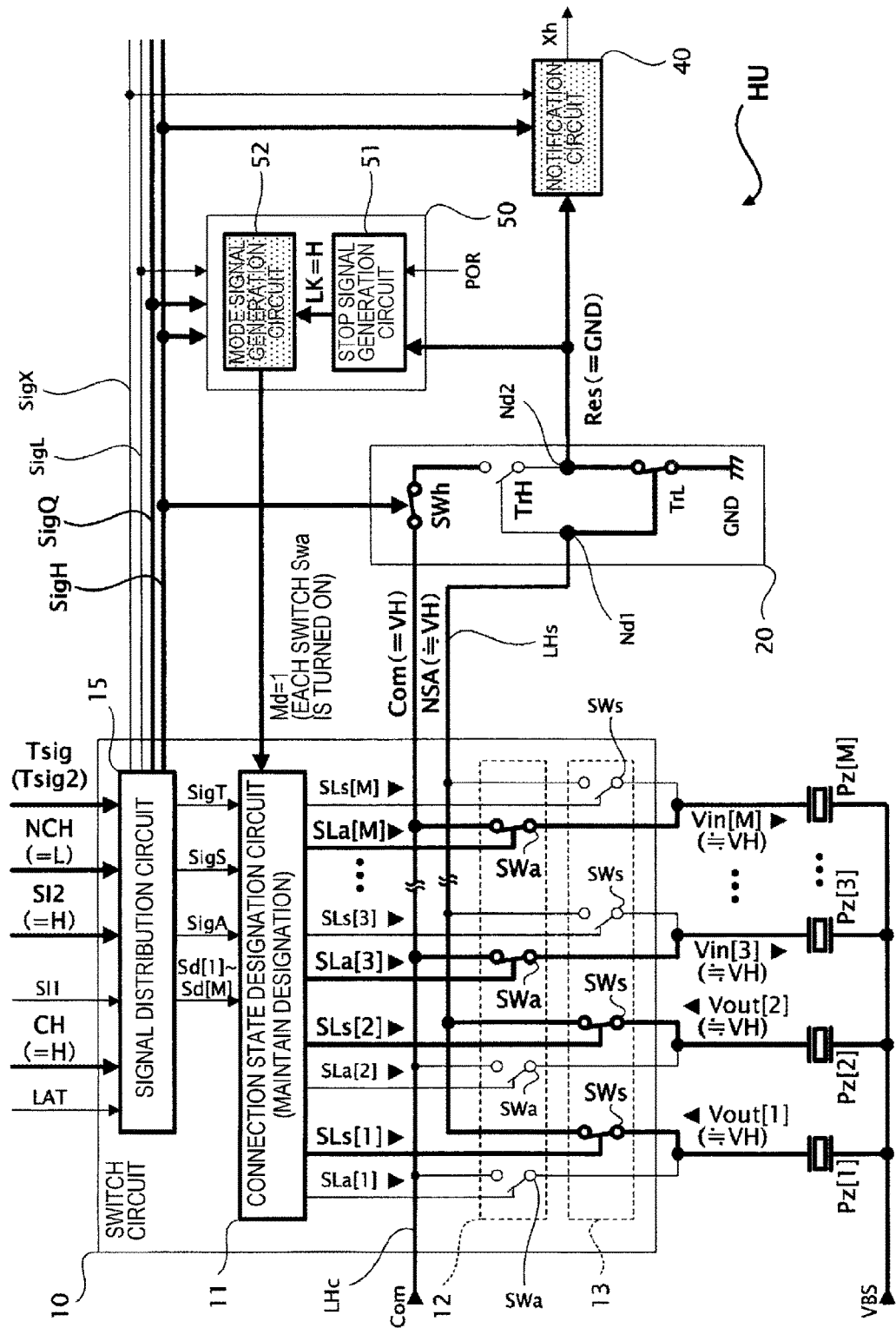
FIG. 11E illustrates a start-up process and a diagnosis process.

For example, when the potential of the node Nd1 is almost identical to the potential VII, the transistor TrH is turned OFF, and the transistor TrL is turned ON irrespective of the ON/OFF state of the switch SWh (see FIGS. 11C and 11E, for example). In this case, the determination result signal Res is set to the ground potential GND that represents that the determination result of the determination process is affirmative. Specifically, when the potential difference between the potential VII and the potential of the node Nd1 is equal to or smaller than a predetermined potential difference, the determination result signal Res is set to the ground potential GND.

Figure 11F:
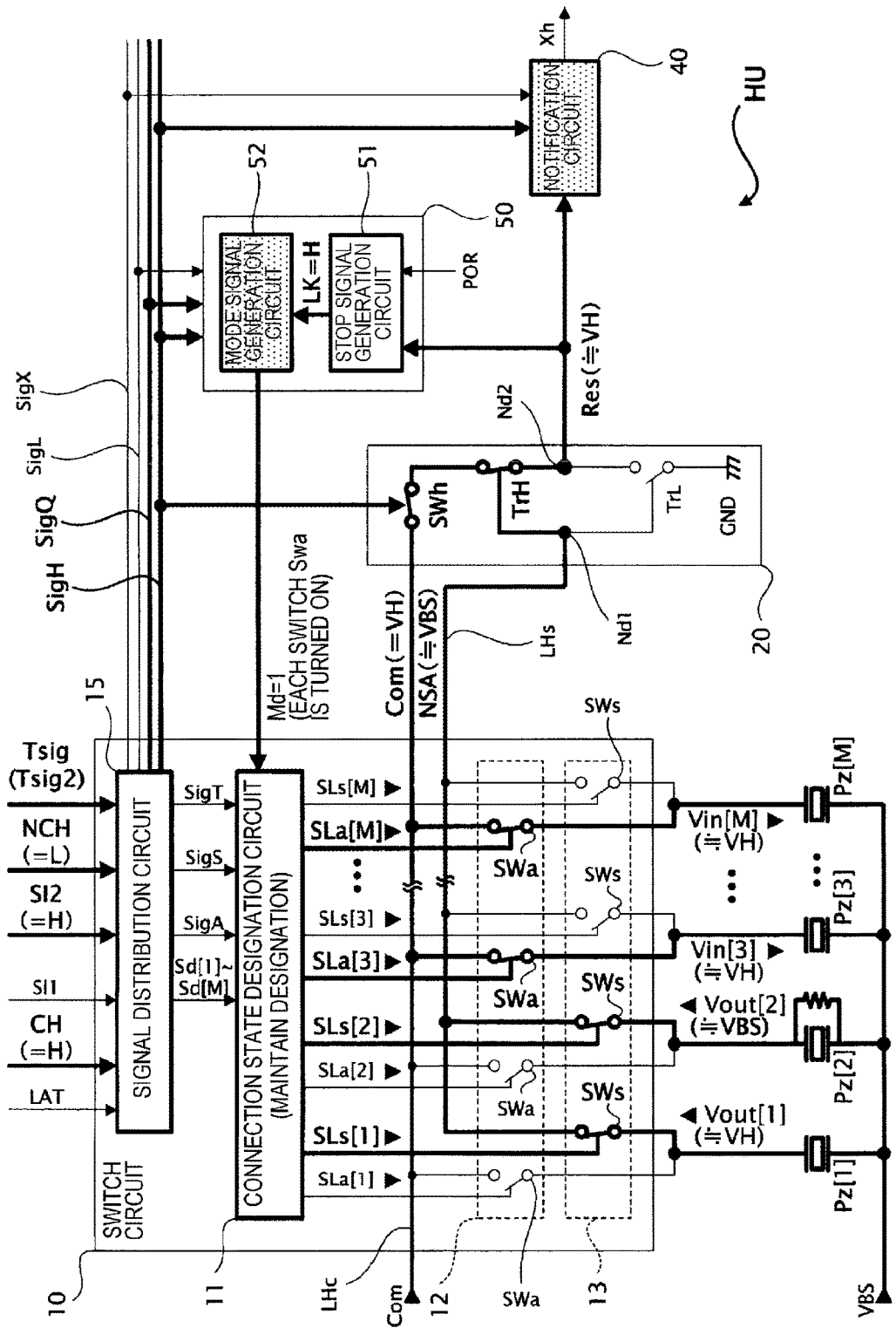
FIG. 11F illustrates a start-up process and a diagnosis process.

For example, when the potential of the node Nd1 is closer to the ground potential GND than the potential VII (e.g., potential VBS), the switch SWh is turned ON, and the potential of the drive signal Com is the potential VII, the transistor TrH is turned ON, and the transistor TrL is turned OFF (see FIG. 11F). In this case, the determination result signal Res is set to the potential VII that represents that the determination result of the determination process is negative. In the first embodiment, the potential difference between the potential VBS and the ground potential GND is smaller than the potential difference between the potential VII and the ground potential GND. In the first embodiment, the ground potential GND is an example of the first reference potential, and the internal line LHg that is set to the first reference potential is an example of the first power supply line. The potential VBS is an example of the second reference potential, and the power supply line LHb that is set to the second reference potential is an example of the second power supply line.

For example, when the potential of the node Nd1 is an intermediate potential between the ground potential GND and the potential VII, the transistors TrH and TrL are turned OFF (see FIG. 11A).

Although an example in which the determination circuit 20 determines whether or not the potential difference between the potential of the drive signal Com and the potential of the detection signal NSA is equal to or smaller than a predetermined potential difference, has been described above, the invention is not limited to such a configuration. For example, the determination circuit 20 may determine whether or not a value that represents the ratio of the potential difference between the potential of the drive signal Com and the potential of the detection signal NSA, to the potential difference between the potential of the drive signal Com and the potential VBS, is equal to or smaller than a predetermined value. For example, the determination circuit 20 may determine whether or not the potential of the detection signal NSA and the potential of the drive signal Com are close to each other.

Although an example in which the determination circuit 20 outputs the determination result signal Res that is set to the potential VII of the drive signal Com or the ground potential GND (i.e., the potential of the internal line LHg) through the ON/OFF control of the transistors TrH and TrL, has been described above, the invention is not limited to such a configuration. It suffices that the determination circuit 20 be able to output the determination result signal Res that is set to a value that represents that the determination result of the determination process is affirmative, or a value that represents that the determination result of the determination process is negative. For example, the determination result signal Res that is output from the determination circuit 20 may be a signal that is set to the high level when the determination result of the determination process is affirmative, and is set to the low level when the determination result of the determination process is negative.

The notification circuit 40 notifies the control section 6 of the determination result of the determination process using the notification signal Xh when the determination result of the determination process is negative. The notification circuit 40 notifies the control section 6 of the detection result of the overheating detection circuit using the notification signal Xh when the temperature detected by the overheating detection circuit has exceeded a predetermined temperature.

The operation designation circuit 50 includes a stop signal generation circuit 51 that outputs the stop signal LK corresponding to a power-on reset signal (POR signal) or the determination result signal Res, and a mode signal generation circuit 52 that generates the operation mode designation signal Md corresponding to the permission signal SigQ and the stop signal LK.

The stop signal LK is a signal that requests the mode signal generation circuit 52 to stop driving the ejecting sections D[1] to D[M]. The POR signal is a signal that initializes the state of the head unit HU when power has been supplied to the head unit HU, and the head unit HU has started operation. The operation mode designation signal Md is a signal that designates the operation mode of the switch circuit 10 (see above).

In the first embodiment, the switch circuit 10 is set to at least a supply stop mode in which all of the switches SWa[1] to SWa[M] are turned OFF to stop the supply of the drive signal Com to the ejecting sections D[1] to D[M], a supply mode in which all of the switches SWa[1] to SWa[M] are turned ON to supply the drive signal Com to the ejecting sections D[1] to D[M] as long as the individual designation signal Sd does not instruct to stop the supply of the drive signal Com to the ejecting section D, and a normal mode in which each of the switches SWa[1] to SWa[M] is turned ON or OFF corresponding to the designation using the print signal SI. An example in which the operation mode designation signal Md is set to a value "0" that designates the supply stop mode as the operation mode of the switch circuit 10, a value "1" that designates the supply mode as the operation mode of the switch circuit 10, and a value "2" that designates the normal mode as the operation mode of the switch circuit 10, is described below for convenience of explanation.

As described above, the operation designation circuit 50, the connection state designation circuit 11, and the connection state switch circuit 12 generate the operation mode designation signal Md corresponding to the determination result signal Res, and generate the connection state designation signals SLa[1] to SLa[M] corresponding to the operation mode designation signal Md to ON/OFF-control the switches SWa[1] to SWa[M]. When the result of the determination process performed by the determination circuit 20 is negative, the operation designation circuit 50, the connection state designation circuit 11, and the connection state switch circuit 12 cause the switches SWa[1] to SWa[M] to be turned OFF to stop the supply of the drive signal Com to the piezoelectric elements PZ[1] to PZ[M] (i.e., stop driving the ejecting section D, and limit the ejection of an ink from the ejecting section D). Specifically, the operation designation circuit 50, the connection state designation circuit 11, and the connection state switch circuit 12 function as an ejection limit circuit 5 that stops the supply of the drive signal Com to the piezoelectric element PZ when the result of the determination process performed by the determination circuit 20 is negative to limit the ejection of an ink from the ejecting section D.

Note that the process that limits the ejection of an ink from the ejecting section D when the result of the determination process performed by the determination circuit 20 is negative may be referred to as "ejection limit process".

5. Operation of Head Unit During Start-Up Process and Diagnosis Process

An outline of the operation of the head unit HU during the start-up process and the diagnosis process is described below with reference to FIGS. 10A to 11J.

FIGS. 10A and 10B are timing charts illustrating the operation of the head unit HU when power has been supplied to the inkjet printer 1, and the start-up process and the diagnosis process are performed. FIGS. 11A to 11J illustrate the operation of the head unit HU during each period illustrated in FIGS. 10A and 10B.

As described above, the inkjet printer 1 according to the first embodiment is configured so that the start-up process and the diagnosis process are performed after power has been supplied to the inkjet printer 1, and the printing process can be performed when a result that the ejecting section D has a predetermined ejection capability has been obtained by the diagnosis process (i.e., when the determination result of the determination process is affirmative). The inkjet printer 1 according to the first embodiment is configured so that the printing process cannot be performed (i.e., the execution of the printing process is prohibited) when a result (an example of "predetermined result") that the ejecting section D does not have a predetermined ejection capability has been obtained by the diagnosis process (i.e., when the determination result of the determination process is negative).

As illustrated in FIGS. 10A and 10B, a period from a time t-0 to a time t-10 in which the start-up process is performed is referred to as "start-up period TP", a period from the time t-10 to a time t-40 in which the diagnosis process is performed is referred to as "diagnosis period TQ", and a period after the time t-40 at which the diagnosis process ends is referred to as "normal operation period TR". A period from the time t-10 to a time t-20 which is included in the diagnosis period TQ and in which the determination preparation process is performed is referred to as "determination preparation period T1", a period from the time t-20 to a time t-30 which is included in the diagnosis period TQ and in which the determination process is performed is referred to as "determination period T2", and a period from the time t-30 to the time t-40 which is included in the diagnosis period TQ and in which the determination result handling process is performed is referred to as "determination result handling period T3".

In FIGS. 10A and 10B, the suffix "-p" is attached to the reference sign that represents each signal or element that is used on the assumption that the determination result of the determination process is affirmative, and the suffix "-f" is attached to the reference sign that represents each signal or element that is used on the assumption that the determination result of the determination process is negative, for convenience of explanation.

5.1. Outline of Signals

An outline of the signals that are supplied to the head unit HU from the control section 6, and an outline of the signals that are generated by the head unit HU during the start-up process and the diagnosis process are described below with reference to FIGS. 10A to 10C.

As illustrated in FIG. 10A, the head unit HU sets the POR signal to the high level during part of the start-up period TP.

As illustrated in FIG. 10A, the control section 6 outputs the individual designation signals Sd[1] to Sd[M] as the print signal SI in synchronization with the clock signal CL during the start-up period TP after the POR signal has been set to the low level. More specifically, the control section 6 outputs the individual designation signals Sd[1] to Sd[M1] as the print signal SI1, and outputs the individual designation signals Sd[M1+1] to Sd[M] as the print signal SI2. Note that the control section 6 sets the print signal SI1 to the low level during a period other than the period in which the control section 6 outputs the individual designation signal Sd. The control section 6 sets the print signal SI2 to the low level during a period (start-up period TP) other than the period in which the control section 6 outputs the individual designation signal Sd, sets the print signal SI2 to the high level during the diagnosis period TQ, and sets the print signal SI2 to the low level at the time t-40 at which the diagnosis period TQ ends. The control section 6 sets the change signal CH to the low level during the start-up period TP, sets the change signal CH to the high level during the diagnosis period TQ, and sets the change signal CH to the low level at the time t-40 at which the diagnosis period TQ ends. The control section 6 sets the N-charge signal NCH to the high level during the start-up period TP, sets the N-charge signal NCH to the low level during the diagnosis period TQ, and sets the N-charge signal NCH to the high level at the time t-40 at which the diagnosis period TQ ends.

Specifically, the control section 6 defines the diagnosis period TQ by setting the print signal SI2, the change signal CH, and the N-charge signal NCH to the high level, the high level, and the low level, respectively. Note that the control section 6 need not necessarily define the diagnosis period TQ using three signals. It suffices that the control section 6 define the diagnosis period TQ using at least two signals. For example, the control section 6 may define the diagnosis period TQ by setting the print signal SI2 and the N-charge signal NCH to the high level and the low level, respectively.

As illustrated in FIG. 10A, the control section 6 defines the times t-11, t-12, t-20, t-30, t-31, t-32, t-33, and t-34 by changing the signal level of the diagnosis control signal Tsig. More specifically, the control section 6 sets the diagnosis control signal Tsig to the high level during a period from the time t-11 to the time t-12, a period (determination period T2) from the time t-20 to the time t-30, a period from the time t-31 to the time t-32, and a period from the time t-33 to the time t-34, and sets the diagnosis control signal Tsig to the low level during the remaining period of the diagnosis period TQ. Note that the range of the diagnosis control signal Tsig that corresponds to the waveform in which the diagnosis control signal Tsig is set to the high level at the time t-11 and set to the low level at the time t-12 is referred to as "control waveform signal Tsig1", the range of the diagnosis control signal Tsig that corresponds to the waveform in which the diagnosis control signal Tsig is set to the high level at the time t-20 and set to the low level at the time t-30 is referred to as "control waveform signal Tsig2", the range of the diagnosis control signal Tsig that corresponds to the waveform in which the diagnosis control signal Tsig is set to the high level at the time t-31 and set to the low level at the time t-32 is referred to as "control waveform signal Tsig3", and the range of the diagnosis control signal Tsig that corresponds to the waveform in which the diagnosis control signal Tsig is set to the high level at the time t-33 and set to the low level at the time t-34 is referred to as "control waveform signal Tsig4".

As illustrated in FIG. 10A, the signal distribution circuit 15 according to the first embodiment sets the permission signal SigQ to the high level when the print signal SI2 is set to the high level, the change signal CH is set to the high level, and the N-charge signal NCH is set to the low level, and sets the permission signal SigQ to the low level in a case other than the case where the print signal SI2 is set to the high level, the change signal CH is set to the high level, and the N-charge signal NCH is set to the low level. Specifically, the permission signal SigQ according to the first embodiment is set to the high level only during the diagnosis period TQ in which the diagnosis process is performed, and is set to the low level during the start-up period TP and the normal operation period TR in which the diagnosis process is not performed. Note that the permission signal SigQ illustrated in FIG. 10A is merely an example. The permission signal SigQ may have an arbitrary waveform as long as the permission signal SigQ can notify the start and the end of the diagnosis period TQ. As illustrated in FIG. 10C, the permission signal SigQ may be a signal that includes a pulse PlsQ1 that corresponds to the start timing of the diagnosis period TQ at which the signal is set to the high level, and a pulse PlsQ2 that corresponds to the end timing of the diagnosis period TQ at which the signal is set to the high level, for example.

The signal distribution circuit 15 according to the first embodiment sets a pulse PlsLK (at which the signal is set to the high level) to the designation signal SigL at the start timing of the control waveform signal Tsig4. Specifically, the designation signal SigL according to the first embodiment includes the pulse PlsLK at the time t-33 (at which the signal is set to the high level). Note that the designation signal SigL illustrated in FIG. 10A is merely an example. The designation signal SigL may have an arbitrary waveform as long as the designation signal SigL can notify the start timing of the control waveform signal Tsig4. For example, the designation signal SigL may have a waveform in which the designation signal SigL is set to the high level at a time that precedes the time t-33, and is set to the low level at the time t-33, as illustrated in FIG. 10C.

As illustrated in FIG. 10A, the stop signal generation circuit 51 sets the stop signal LK to the high level at a timing at which the POR signal is set to the high level. Note that the stop signal LK requests the mode signal generation circuit 52 to stop driving the ejecting sections D[1] to D[M] when the stop signal LK is set to the high level.

The stop signal generation circuit 51 sets the stop signal LK to the high level from the rising edge of the POR signal to the time t-33 notified by the designation signal SigL, and then sets the stop signal LK to the signal level that corresponds to the determination result of the determination process. More specifically, the stop signal generation circuit 51 according to the first embodiment sets the stop signal LK to the low level at a timing at which the pulse PlsLK of the designation signal SigL is set to the high level when the determination result of the determination process is affirmative, and maintains the stop signal LK at the high level when the determination result of the determination process is negative, as illustrated in FIG. 10A.

The mode signal generation circuit 52 sets the operation mode designation signal Md to the value "0" that designates the supply stop mode during the start-up period TP, sets the operation mode designation signal Md to the value "1" that designates the supply mode during the diagnosis period TQ, and sets the operation mode designation signal Md to the value that corresponds to the determination result of the determination process (i.e., the value "2" that designates the normal mode when the determination result of the determination process is affirmative, or the value "0" that designates the supply stop mode when the determination result of the determination process is negative) during the normal operation period TR.

More specifically, as illustrated in FIG. 10A, the mode signal generation circuit 52 according to the first embodiment sets the operation mode designation signal Md to the value "1" that designates the supply mode when the permission signal SigQ is set to the high level, sets the operation mode designation signal Md to the value "0" that designates the supply stop mode when the permission signal SigQ is set to the low level, and the stop signal LK is set to the high level, and sets the operation mode designation signal Md to the value "2" that designates the normal mode when the permission signal SigQ is set to the low level, and the stop signal LK is set to the low level.

As illustrated in FIG. 10A, the signal distribution circuit 15 sets a pulse PlsT1 (at which the signal is set to the high level) to the determination signal SigT at the start timing of the control waveform signal Tsig1. Specifically, the determination signal SigT includes the pulse PlsT1 at the time t-11 (at which the signal is set to the high level).

When the pulse PlsT1 as the determination signal SigT has been supplied to the connection state designation circuit 11, the connection state designation circuit 11 determines to ON/OFF-control the switches SWa and SWs based on the individual designation signals Sd[1] to Sd[M], and set the diagnosis target ejecting section D-O[m] designated by the individual designation signals Sd[1] to Sd[M] to be the diagnosis target.

Note that the pulse PlsT1 illustrated in FIG. 10A is merely an example. For example, the determination signal SigT may have a waveform in which the determination signal SigT is set to the high level at an arbitrary timing during a period from the time t-10 to the time t-11, as illustrated in FIG. 10C.

As illustrated in FIG. 10A, the signal distribution circuit 15 sets a pulse PlsA1 (at which the signal is set to the high level) to the designation signal SigA at a timing at which the print signal SI2 is set to the high level, the change signal CH is set to the high level, and the N-charge signal NCH is set to the low level, sets a pulse PlsA2 (at which the signal is set to the high level) to the designation signal SigA at the end timing of the control waveform signal Tsig1, sets a pulse PlsA3 (at which the signal is set to the high level) to the designation signal SigA at the start timing of the control waveform signal Tsig3, and sets a pulse PlsA4 (at which the signal is set to the high level) to the designation signal SigA at a timing at which the print signal SI2 is set to the low level, the change signal CH is set to the low level, and the N-charge signal NCH is set to the high level. Specifically, the designation signal SigA includes the pulse PlsA1 at the time t-10 (at which the signal is set to the high level), includes the pulse PlsA2 at the time t-12 (at which the signal is set to the high level), includes the pulse PlsA3 at the time t-31 (at which the signal is set to the high level), and includes the pulse PlsA4 at the time t-40 (at which the signal is set to the high level). The designation signal SigA defines a control period TA1 from the time t-10 to the time t-12, a control period TA2 from the time t-12 to the time t-31, and a control period TA3 from the time t-31 to the time t-40, using the pulses PlsA1 to PlsA4. Note that each control period TA (TA1 to TA3) is a period in which each switch SWa is maintained with regard to the connection state (e.g., ON or OFF state).

Note that the designation signal SigA illustrated in FIG. 10A is merely an example. The designation signal SigA may be an arbitrary signal as long as the designation signal SigA can define the control periods TA1 to TA3. For example, the designation signal SigA may be a signal that is set to the high level during the control period TA1, set to the low level during the control period TA2, and set to the high level during the control period TA3 to define the control periods TA1 to TA3, as illustrated in FIG. 10C.

The connection state designation circuit 11 generates the connection state designation signals SLa[1] to SLa[M] that ON/OFF-control the switches SWa[1] to SWa[M] based on at least one signal among (at least part of) the operation mode designation signal Md, the individual designation signals Sd[1] to Sd[M], the designation signal SigA, and the determination signal SigT.

As illustrated in FIG. 10A, the connection state designation circuit 11 sets the connection state designation signals SLa[1] to SLa[M] to the low level so that the switches SWa[1] to SWa[M] are turned OFF when the operation mode designation signal Md is set to the value "0" that designates the supply stop mode.

When the operation mode designation signal Md is set to the value "2" that designates the normal mode, the connection state designation circuit 11 sets the connection state designation signals SLa[1] to SLa[M] to the signal levels that respectively correspond to the individual designation signals Sd[1] to Sd[M] so that the switches SWa[1] to SWa[M] are turned ON or OFF corresponding to the individual designation signals Sd[1] to Sd[M]. Note that the relationship between the individual designation signal Sd[m] and the connection state designation signal SLa[m] during the printing process is described later.

The connection state designation circuit 11 sets the connection state designation signals SLa[1] to SLa[M] to the high level so that the switches SWa[1] to SWa[M] are turned ON during the control period TA1 and the control period TA3 (included in the diagnosis period TQ) in which the operation mode designation signal Md is set to the value "1" that designates the supply mode.

The connection state designation circuit 11 sets the connection state designation signals SLa[1] to SLa[M] to the signal levels that respectively correspond to the individual designation signals Sd[1] to Sd[M] so that the switches SWa[1] to SWa[M] are turned ON or OFF corresponding to the individual designation signals Sd[1] to Sd[M] that are supplied to the connection state designation circuit 11 at a timing at which the pulse PlsT1 occurs during the control period TA2 (included in the diagnosis period TQ) in which the operation mode designation signal Md is set to the value "1" that designates the supply mode. More specifically, the connection state designation circuit 11 sets the connection state designation signal SLa[m] to the low level so that the switch SWa[m] (SWa-O[m]) is turned OFF during the control period TA2 when the individual designation signal Sd[m] designates the ejecting section D[m] as the diagnosis target. The connection state designation circuit 11 sets the connection state designation signal SLa[m] to the high level so that the switch SWa[m] is turned ON during the control period TA2 when the individual designation signal Sd[m] does not designate the ejecting section D[m] as the diagnosis target. Specifically, the connection state designation circuit 11 sets the signal level of the connection state designation signal SLa[m] so that only the switch SWa-O[m] is turned OFF, and the remaining switches SWa are turned ON during the control period TA2.

Note that the invention is not limited to such a configuration. For example, the connection state designation circuit 11 may cause all of the switches SWa[1] to SWa[M] to be turned OFF during the control period TA2.

As illustrated in FIG. 10A, the signal distribution circuit 15 sets a pulse PlsS1 (at which the signal is set to the high level) to the determination signal SigS at the start timing of the control waveform signal Tsig1, and sets a pulse PlsS2 (at which the signal is set to the high level) to the designation signal SigS at the end timing of the control waveform signal Tsig3. Specifically, the designation signal SigS includes the pulse PlsS1 at the time t-11 (at which the signal is set to the high level), and includes the pulse PlsS2 at the time t-32 (at which the signal is set to the high level). The designation signal SigS defines the control period TS from the time t-11 to the time t-32 using the pulses PlsS1 and PlsS2. Note that the control period TS is a period in which the connection state of each switch SWs is maintained (e.g., ON or OFF state).

Note that the designation signal SigS illustrated in FIG. 10A is merely an example. The designation signal SigS may be an arbitrary signal as long as the designation signal SigS can define the control period TS. For example, the designation signal SigS may be a signal that is set to the high level during the control period TS, and set to the low level during a period other than the control period TS, as illustrated in FIG. 10C.

The connection state designation circuit 11 generates the connection state designation signals SLs[1] to SLs[M] that ON/OFF-control the switches SWs[1] to SWs[M] based on at least one signal among (at least part of) the individual designation signals Sd[1] to Sd[M], the designation signal SigS, and the determination signal SigT.

As illustrated in FIG. 10A, the connection state designation circuit 11 sets the connection state designation signals SLs[1] to SLs[M] to the low level so that the switches SWs[1] to SWs[M] are turned OFF during a period other than the control period TS.

The connection state designation circuit 11 sets the connection state designation signals SLs[1] to SLs[M] to the signal levels that respectively correspond to the individual designation signals Sd[1] to Sd[M] so that the switches SWs[1] to SWs[M] are turned ON or OFF corresponding to the individual designation signals Sd[1] to Sd[M] that are supplied to the connection state designation circuit 11 at a timing at which the pulse PlsT1 occurs during the control period TS that starts at the rising edge of the pulse PlsS1. More specifically, the connection state designation circuit 11 sets the connection state designation signal SLs[m] to the high level so that the switch SWs[m] (SWs-O[m]) is turned ON during the control period TS when the individual designation signal Sd[m] designates the ejecting section D[m] as the diagnosis target. The connection state designation circuit 11 sets the connection state designation signal SLs[m] to the low level so that the switch SWs[m] is turned OFF during the control period TS when the individual designation signal Sd[m] does not designate the ejecting section D[m] as the diagnosis target. Specifically, the connection state designation circuit 11 sets the signal level of the connection state designation signal SLs[m] so that only the switch SWs-O[m] is turned ON during the control period TS.

As illustrated in FIG. 10B, the signal distribution circuit 15 sets the designation signal SigH to the low level until the control waveform signal Tsig2 starts (is supplied) after power has been supplied to the inkjet printer 1, sets the designation signal SigH to the high level at the start timing of the control waveform signal Tsig2, and sets the designation signal SigH to the low level at the end timing of the control waveform signal Tsig2. Specifically, the designation signal SigH is set to the high level during the determination period T2 from the time t-20 to the time t-30, and is set to the low level during a period other than the determination period T2. Therefore, the switch SWh of the determination circuit 20 is turned ON during the determination period T2 in which the designation signal SigH is set to the high level, and is turned OFF during a period other than the determination period T2.

Note that the notification circuit 40 and the stop signal generation circuit 51 hold the potential of the determination result signal Res output from the determination circuit 20 at a predetermined timing within the determination period T2. Specifically, the notification circuit 40 and the stop signal generation circuit 51 hold the potential of the determination result signal Res output from the determination circuit 20 at a predetermined timing within the determination period T2. In the first embodiment, the predetermined timing is the latest timing (i.e., time t-30) within the period in which the control waveform signal Tsig2 is set to the high level. Note that the configuration is not limited thereto. It suffices that the predetermined timing at which the notification circuit 40 and the stop signal generation circuit 51 hold the potential of the determination result signal Res be included in a period from the time t-20 to the time t-30. Although an example in which the notification circuit 40 and the stop signal generation circuit 51 hold the potential of the determination result signal Res at a predetermined timing within the determination period T2 has been described above, the configuration is not limited thereto. It suffices that the notification circuit 40 and the stop signal generation circuit 51 hold a value or a potential that represents the determination result of the determination process. For example, the notification circuit 40 and the stop signal generation circuit 51 may hold a logic state that corresponds to the potential of the determination result signal Res at a predetermined timing within the determination period T2. For example, the notification circuit 40 and the stop signal generation circuit 51 may hold a value that represents that the determination result of the determination process is affirmative when the determination result signal Res represents that the determination result of the determination process is affirmative, and hold a value that represents that the determination result of the determination process is negative when the determination result signal Res represents that the determination result of the determination process is negative. Note that the signal level of the determination result signal Res output from the determination circuit 20 is described later.

The signal distribution circuit 15 sets the designation signal SigX to the high level during a period from the time t-32 to the time t-34. As illustrated in FIG. 10B, the signal distribution circuit 15 according to the first embodiment sets the designation signal SigX to the low level until the control waveform signal Tsig3 ends (is set to the low level) after power has been supplied to the inkjet printer 1, sets the designation signal SigX to the high level at the end timing of the control waveform signal Tsig3, and sets the designation signal SigX to the low level at the end timing of the control waveform signal Tsig4. Note that the designation signal SigX illustrated in FIG. 10B is merely an example. The designation signal SigX may have an arbitrary waveform as long as the designation signal SigX can notify the end timing of the control waveform signal Tsig3 and the end timing of the control waveform signal Tsig4. As illustrated in FIG. 10C, the designation signal SigX may be a signal that includes a pulse PlsX1 that is set to the high level at the end timing of the control waveform signal Tsig3, and a pulse PlsX2 that is set to the high level at the end timing of the control waveform signal Tsig4, for example.

The notification circuit 40 sets the notification signal Xh to the signal level that corresponds to the determination result during a period from the time t-32 to the time t-34, and sets the notification signal Xh to the high level during a period other than the period from the time t-32 to the time t-34 as long as the temperature detected by the overheating detection circuit has not exceeded a predetermined temperature.

As illustrated in FIG. 10B, the notification circuit 40 according to the first embodiment sets the notification signal Xh to the high level at a timing at which the POR signal is set to the high level. The notification circuit 40 sets the notification signal Xh to the low level at a timing at which the designation signal SigX is set to the high level when the determination result of the determination process is negative, and sets the notification signal Xh to the high level at a timing at which the designation signal SigX is set to the low level. The notification circuit 40 sets the notification signal Xh to the low level when the temperature detected by the overheating detection circuit has exceeded a predetermined temperature. The notification circuit 40 maintains the notification signal Xh at the high level when the determination result of the determination process is affirmative as long as the temperature detected by the overheating detection circuit has not exceeded a predetermined temperature.

Note that the notification signal Xh illustrated in FIG. 10B is merely an example. The notification signal Xh may have an arbitrary waveform as long as the notification signal Xh is a signal of which the potential during a period from the time t-32 to the time t-34 is set to differ from the potential during a period other than the period from the time t-32 to the time t-34 when the determination result of the determination process is negative. As illustrated in FIG. 10C, the notification signal Xh may be a signal that is set to the high level during a period from the time t-32 to the time t-34 when the determination result of the determination process is negative, and is set to the low level during a period other than the period from the time t-32 to the time t-34, for example.

As illustrated in FIG. 10B, the control section 6 sets the drive signal Com to the potential VII from a potential V0 that is lower than the potential VII at the time t-10 at which the diagnosis period TQ starts. The control section 6 maintains the drive signal Com at the potential VII during the diagnosis period TQ, and sets the drive signal Com to the potential V0 at the time t-40 at which the diagnosis period TQ ends.

Note that the waveform of the drive signal Com illustrated in FIG. 10B is merely an example. It suffices that the drive signal Com have a waveform that is set to a constant potential that differs from the potential VBS at least during a period from a timing that precedes the time t-11 to a timing that follows the time t-30. In this case, it suffices that the potential of the drive signal Com be a potential that ensures that the determination process is effectively performed by the determination circuit 20. For example, it suffices that the potential of the drive signal Com be a potential that is determined so that at least the potential difference between the potential of the drive signal Com and the potential VBS is larger than a predetermined potential difference.

The signal level of the detection signal NSA that is input to the determination circuit 20 is described later.

5.2. Operation of Head Unit

An outline of the operation of the head unit HU is described below with reference to FIGS. 11A to 11J. In FIGS. 11A to 11J, the elements and the signals that are particularly important in each period are highlighted using a bold line or the like.

FIG. 11A illustrates the operation of the head unit HU during the start-up period TP (i.e., a period from the time t-0 to the time t-10). When power has been supplied to the inkjet printer 1 at the time t-0, the inkjet printer 1 performs the start-up process in the start-up period TP. When the inkjet printer 1 has started the start-up process, the inkjet printer 1 supplies power to the head unit HU.

As illustrated in FIG. 11A, when the POR signal has been set to the high level during the start-up process, the stop signal generation circuit 51 sets the stop signal LK to the high level. The permission signal SigQ is set to the low level during the start-up period TP. Therefore, the mode signal generation circuit 52 sets the operation mode designation signal Md to the value "0" that designates the supply stop mode. The connection state designation circuit 11 sets the connection state designation signals SLa[1] to SLa[M] to the low level during the start-up process so that the switches SWa[1] to SWa[M] are turned OFF. The connection state designation circuit 11 sets the connection state designation signals SLs[1] to SLs[M] to the low level during the start-up process so that the switches SWs[1] to SWs[M] are turned OFF.

The signal distribution circuit 15 supplies the individual designation signals Sd[1] to Sd[M] included in the print signals SI1 and SI2 supplied from the control section 6 to the connection state designation circuit 11 in synchronization with the clock signal CL during the start-up process. Note that FIGS. 11A to 11J illustrate an example in which the ejecting sections D[1] and D[2] are designated as the diagnosis target ejecting section D-O (i.e., the diagnosis target of the diagnosis process).

FIG. 11B illustrates the operation of the head unit HU during a period from the time t-10 to the time t-11 within the determination preparation period T1 (in which the determination preparation process is performed) included in the diagnosis period TQ in which the diagnosis process is performed.

The control section 6 sets the print signal SI2 to the high level, sets the change signal CH to the high level, and sets the N-charge signal NCH to the low level at the time t-10 at which the determination preparation process starts. Therefore, the signal distribution circuit 15 sets the permission signal SigQ to the high level at the time t-10, and sets the pulse PlsA1 to the designation signal SigA to start the control period TA1.

When the permission signal SigQ has been set to the high level, the mode signal generation circuit 52 sets the operation mode designation signal Md to the value "1" that designates the supply mode. Therefore, the connection state designation circuit 11 sets the connection state designation signals SLa[1] to SLa[M] to the high level so that the switches SWa[1] to SWa[M] are turned ON, and the upper electrode 302 of each of the piezoelectric elements PZ[1] to PZ[M] is electrically connected to the internal line LHc.

The control section 6 sets the drive signal Com to the potential VII during the diagnosis period TQ. Therefore, the upper electrode 302 of each of the piezoelectric elements PZ[1] to PZ[M] is set to the potential VII. Note that the drive signal Com that is supplied to the piezoelectric element PZ[m] may be hereinafter referred to as "supply drive signal Vin[m]".

The connection state designation circuit 11 sets the connection state designation signals SLs[1] to SLs[M] to the low level during a period in which the control period TS has not started so that the switches SWs[1] to SWs[M] are turned OFF.

FIG. 11C illustrates the operation of the head unit HU during a period from the time t-11 to the time t-12 (in which the control waveform signal Tsig1 is supplied) within the determination preparation period T1 in which the determination preparation process is performed.

The control section 6 sets the control waveform signal Tsig1 to the high level at the time t-11. Therefore, the signal distribution circuit 15 sets the pulse PlsT1 to the determination signal SigT (i.e., determines the diagnosis target ejecting section D-O designated by the individual designation signals Sd[1] to Sd[M] to be the diagnosis target) at the time t-11, and sets the pulse PlsS1 to the designation signal SigS at the time t-11 to start the control period TS. The connection state designation circuit 11 sets the connection state designation signals SLs[1] and SLs[2] to the high level at the time t-11 so that the switches SWs[1] and SWs[2] that correspond to the ejecting sections D[1] and D[2] determined to be the diagnosis target ejecting section D-O are turned ON, and sets the connection state designation signals SLs[3] to SLs[M] to the low level so that the switches SWs[3] to SWs[M] that correspond to the ejecting sections D[3] to D[M] that have not been determined to be the diagnosis target ejecting section D-O are maintained in the OFF state. The upper electrode 302 of each of the piezoelectric elements PZ[1] and PZ[2] is thus electrically connected to the internal line LHs. Therefore, the detection signal NSA supplied to the internal line LHs is set to a potential almost equal to the potential of the drive signal Com (i.e., a potential almost equal to the potential VII). Note that the detection signal NSA detected from the piezoelectric element PZ[m] is referred to as "individual detection signal Vout[m]".

A period from the time t-11 to the time t-12 within the determination preparation period T1 may be referred to as "preparation period", and the control waveform signal Tsig1 that defines the preparation period may be referred to as "preparation signal".

FIG. 11D illustrates the operation of the head unit HU during a period from the time t-12 to the time t-20 within the determination preparation period T1 in which the determination preparation process is performed.

The control section 6 sets the control waveform signal Tsig1 to the low level at the time t-12. Therefore, the signal distribution circuit 15 sets the pulse PlsA2 to the designation signal SigA at the time t-12 to start the control period TA2. The connection state designation circuit 11 sets the connection state designation signals SLa[1] and SLa[2] to the low level at the time t-12 so that the switches SWa[1] and SWa[2] that correspond to the ejecting sections D[1] and D[2] determined to be the diagnosis target ejecting section D-O are turned OFF, and maintains the connection state designation signals SLa[3] to SLa[M] at the high level so that the switches SWa[3] to SWa[M] that correspond to the ejecting sections D[3] to D[M] that have not been determined to be the diagnosis target ejecting section D-O are maintained in the ON state. The upper electrode 302 of each of the piezoelectric elements PZ[1] and PZ[2] is thus electrically disconnected from the internal line LHs.

When the piezoelectric element PZ[m] has a predetermined electrical storage capability, the piezoelectric element PZ[m] functions as a storage capacitor. Therefore, the upper electrode 302 of the piezoelectric element PZ[m] is maintained at a potential almost equal to the potential VII of the drive signal Com supplied through the internal line LHc even after the upper electrode 302 of the piezoelectric element PZ[m] has been electrically disconnected from the internal line LHs. In the example illustrated in FIG. 11D, when both the piezoelectric elements PZ[1] and PZ[2] have a predetermined electrical storage capability, the upper electrode 302 of each of the piezoelectric elements PZ[1] and PZ[2] is maintained at a potential almost equal to the potential VII of the drive signal Com. In this case, the detection signal NSA that is output to the internal line LHs is also set to a potential almost equal to the potential VII.

However, when a leakage path through which current having a magnitude equal to or larger than a specific magnitude flows is present between the upper electrode 302 and the lower electrode 301 of the piezoelectric element PZ[m] (e.g., when the upper electrode 302 and the lower electrode 301 of the piezoelectric element PZ[m] are short-circuited) (see the piezoelectric element PZ[2] illustrated in FIG. 11D), the piezoelectric element PZ[m] does not have a predetermined electrical storage capability, and does not function as a storage capacitor. When the piezoelectric element PZ[m] of the ejecting section D[m] designated as the diagnosis target ejecting section D-O does not have a predetermined electrical storage capability, the potential of the upper electrode 302 of the piezoelectric element PZ[m] (that has been set to the potential VII at the time t-12) changes from the potential VII so as to approach the potential VBS that is the potential of the power supply line LHb after the time t-12. In this case, the detection signal NSA that is output to the internal line LHs also changes from the potential VII so as to approach the potential VBS after the time t-12.

FIGS. 11E and 11F illustrate the operation of the head unit HU during the determination period T2 (i.e., a period from the time t-20 to the time t-30) in which the control waveform signal Tsig2 is supplied, and the determination process is performed. FIG. 11E illustrates the operation of the head unit HU when the determination result of the determination process is affirmative, and FIG. 11F illustrates the operation of the head unit HU when the determination result of the determination process is negative.

The control section 6 sets the control waveform signal Tsig2 to the high level at the time t-20, and sets the control waveform signal Tsig2 to the low level at the time t-30. Therefore, the signal distribution circuit 15 sets the designation signal SigH to the high level at the time t-20, and sets the designation signal SigH to the low level at the time t-30. The switch SWh of the determination circuit 20 is thus turned ON at the time t-20, and turned OFF at the time t-30. The notification circuit 40 and the stop signal generation circuit 51 hold the potential of the determination result signal Res output from the determination circuit 20 at the time t-30.

Note that the notification circuit 40 and the stop signal generation circuit 51 hold the potential of the determination result signal Res during a period in which the switch SWh is turned ON. Therefore, the switch SWh is preferably turned OFF after the notification circuit 40 and the stop signal generation circuit 51 have held the potential of the determination result signal Res at the time t-30. In FIG. 10B, the timing at which the notification circuit 40 and the stop signal generation circuit 51 hold the potential of the determination result signal Res and the timing at which the switch SWh is turned OFF are not distinguished for convenience of illustration.

The determination result signal Res that is output from the determination circuit 20 has a potential that corresponds to the potential of the detection signal NSA that is supplied to the node Nd1.

As illustrated in FIG. 11E, when all of the ejecting sections D designated as the diagnosis target ejecting section D-O include the piezoelectric element PZ that has a predetermined electrical storage capability, the potential of the detection signal NSA at the time t-30 is almost equal to the potential VII that is the potential of the drive signal Com. In this case, the transistor TrL is turned ON, and the transistor TrH is turned OFF. Therefore, the determination result signal Res is set to the ground potential GND at the time t-30. When the determination result signal Res is set to the ground potential GND, the determination result of the determination process is affirmative (i.e., a result that the ejecting section D has a predetermined ejection capability has been obtained by the diagnosis process).

As illustrated in FIG. 11F, when an ejecting section D among the ejecting sections D designated as the diagnosis target ejecting section D-O includes the piezoelectric element PZ that does not have a predetermined electrical storage capability, the potential of the detection signal NSA at the time t-30 differs from the potential of the drive signal Com (e.g., a potential almost equal to the potential VBS). In this case, the transistor TrH is turned ON, and the transistor TrL is turned OFF. Therefore, the determination result signal Res is set to the potential VII at the time t-30. When the determination result signal Res is set to the potential VII, the determination result of the determination process is negative (i.e., a result (predetermined result) that the ejecting section D does not have a predetermined ejection capability has been obtained by the diagnosis process).

The notification circuit 40 and the stop signal generation circuit 51 hold the ground potential GND as the potential of the determination result signal Res when all of the diagnosis target ejecting sections D-O include the piezoelectric element PZ that has a predetermined electrical storage capability (FIG. 11E), and hold the potential VII as the potential of the determination result signal Res when at least one of the diagnosis target ejecting sections D-O includes the piezoelectric element PZ that does not have a predetermined electrical storage capability (FIG. 11F).

In other words, the potential of the determination result signal Res that is held by the notification circuit 40 and the stop signal generation circuit 51 is the ground potential GND when the determination result of the determination process is affirmative (i.e., the piezoelectric element PZ has a predetermined electrical storage capability), and is the potential VII when the determination result of the determination process is negative (i.e., the piezoelectric element PZ does not have a predetermined electrical storage capability).

As described above, the head unit HU performs the determination process that determines whether or not the diagnosis target ejecting section D-O has a predetermined ejection capability, and generates the determination result signal Res that represents the determination result during a period in which the control waveform signal Tsig2 is supplied from the control section 6. Specifically, the control waveform signal Tsig2 is an example of the instruction signal that instructs the head unit HU to perform the determination process.

Figure 11G:
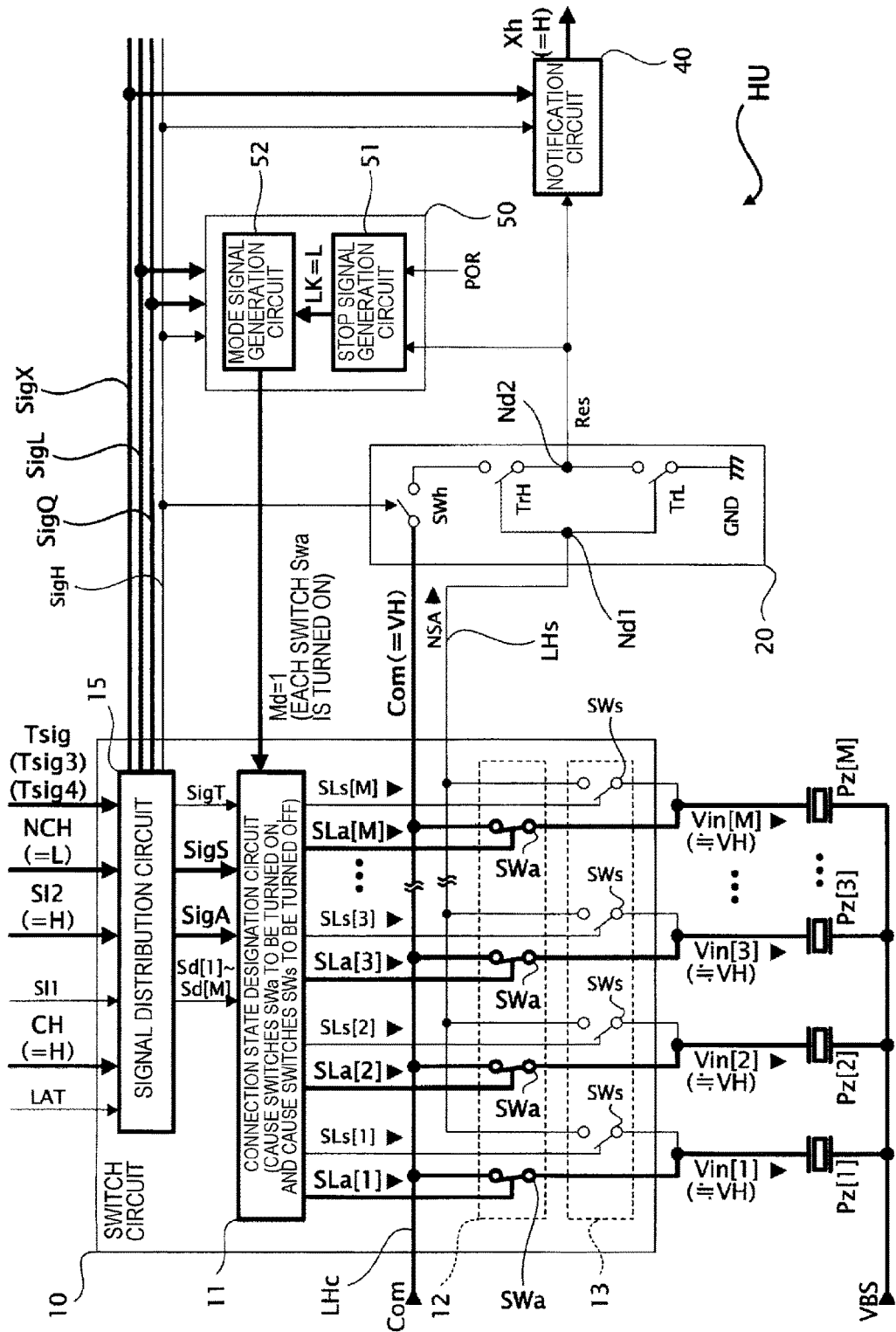
FIG. 11G illustrates a start-up process and a diagnosis process.
Figure 11H:
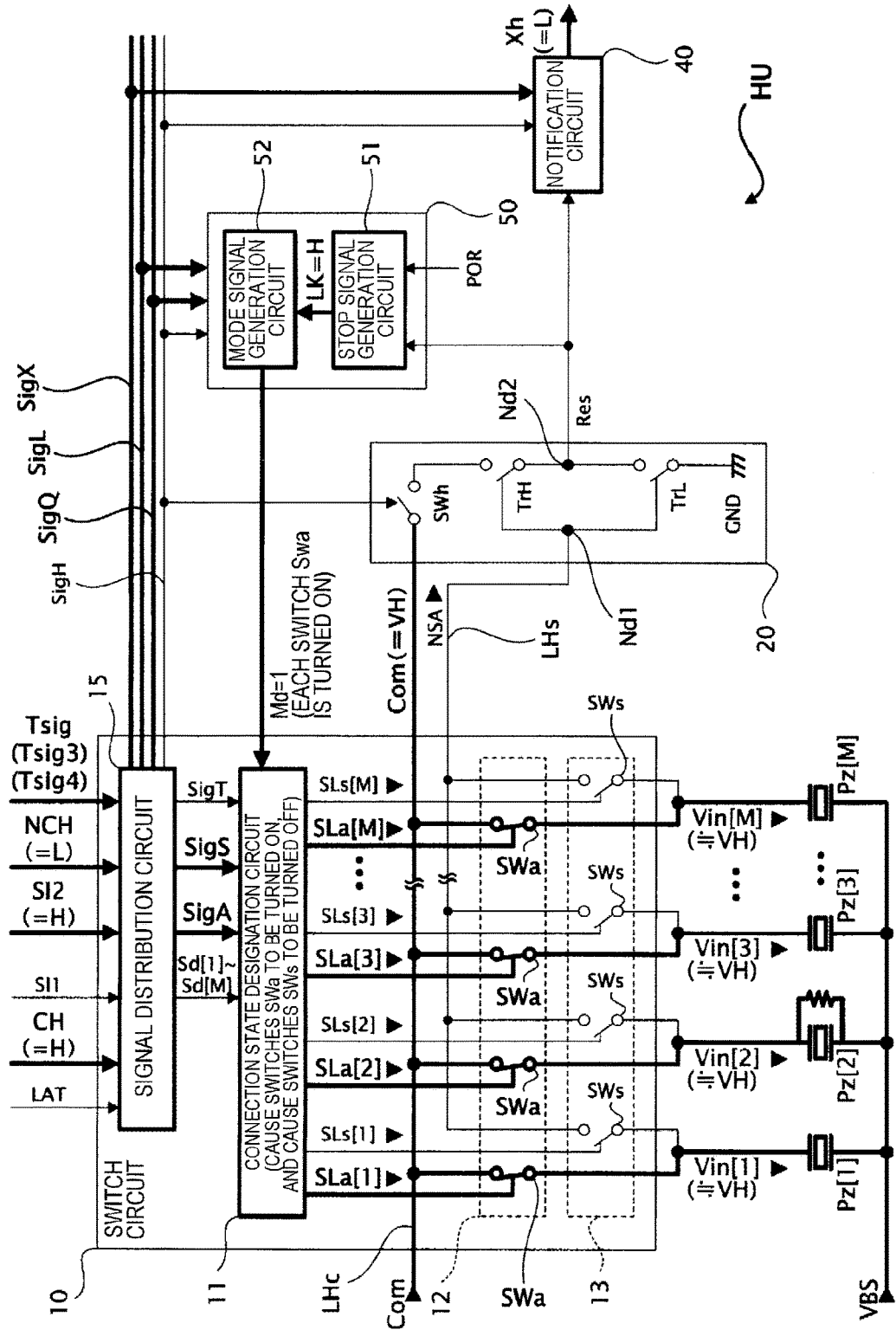
FIG. 11H illustrates a start-up process and a diagnosis process.

FIGS. 11G and 11E1 illustrate the operation of the head unit HU during the determination result handling period T3 (i.e., a period from the time t-30 to the time t-40) in which the determination result handling process is performed. FIG. 11G illustrates the operation of the head unit HU when the determination result of the determination process is affirmative, and FIG. 11H illustrates the operation of the head unit HU when the determination result of the determination process is negative.

The control section 6 sets the control waveform signal Tsig3 to the high level at the time t-31. Therefore, the signal distribution circuit 15 sets the pulse PlsA3 to the designation signal SigA at the time t-31 to start the control period TA3. The connection state designation circuit 11 sets the connection state designation signals SLa[1] to SLa[M] to the high level at the time t-31 so that the switches SWa[1] to SWa[M] are turned ON.

The control section 6 sets the control waveform signal Tsig3 to the low level at the time t-32. Therefore, the signal distribution circuit 15 sets the pulse PlsS2 to the designation signal SigS at the time t-32 to terminate the control period TS. The connection state designation circuit 11 sets the connection state designation signals SLs[1] to SLs[M] to the low level at the time t-32 so that the switches SWs[1] to SWs[M] are turned OFF. The signal distribution circuit 15 sets the designation signal SigX to the high level at the time t-32. The notification circuit 40 sets the notification signal Xh to the signal level that corresponds to the determination result of the determination process at the time t-32. More specifically, the notification circuit 40 maintains the notification signal Xh at the high level when the determination result of the determination process is affirmative (see FIG. 11G), and sets the notification signal Xh to the low level when the determination result of the determination process is negative (see FIG. 11H).

The control section 6 sets the control waveform signal Tsig4 to the high level at the time t-33. Therefore, the signal distribution circuit 15 sets the pulse PlsLK to the designation signal SigL at the time t-33. The stop signal generation circuit 51 sets the stop signal LK to the signal level that corresponds to the determination result of the determination process at the time t-33. More specifically, the stop signal generation circuit 51 sets the stop signal LK to the low level when the determination result of the determination process is affirmative (see FIG. 11G), and maintains the stop signal LK at the high level when the determination result of the determination process is negative (see FIG. 11H).

The control section 6 sets the control waveform signal Tsig4 to the low level at the time t-34. Therefore, the signal distribution circuit 15 sets the designation signal SigX to the low level at the time t-34. The notification circuit 40 sets the notification signal Xh to the high level at the time t-34.

Figure 11I:
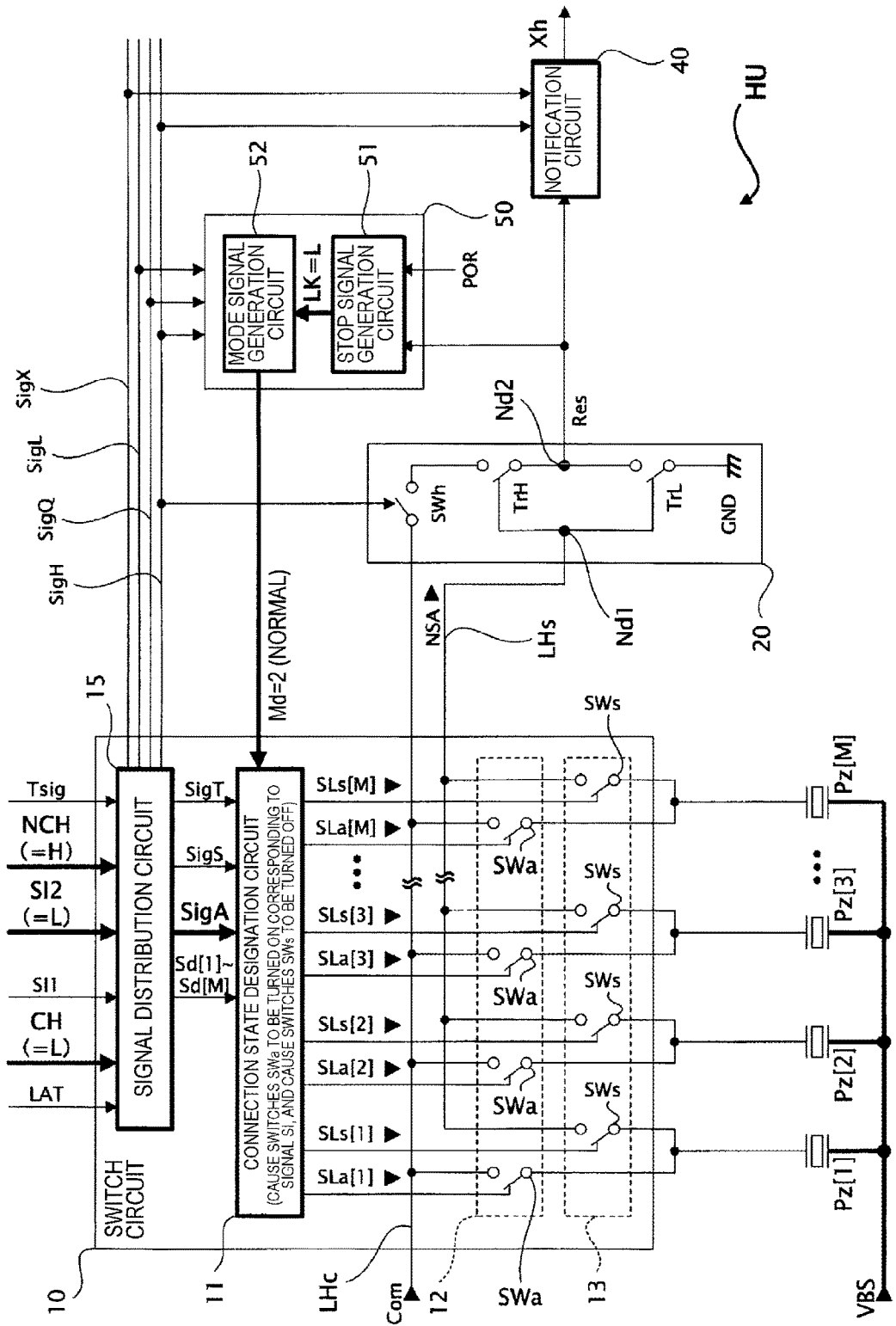
FIG. 11I illustrates a start-up process and a diagnosis process.
Figure 11J:
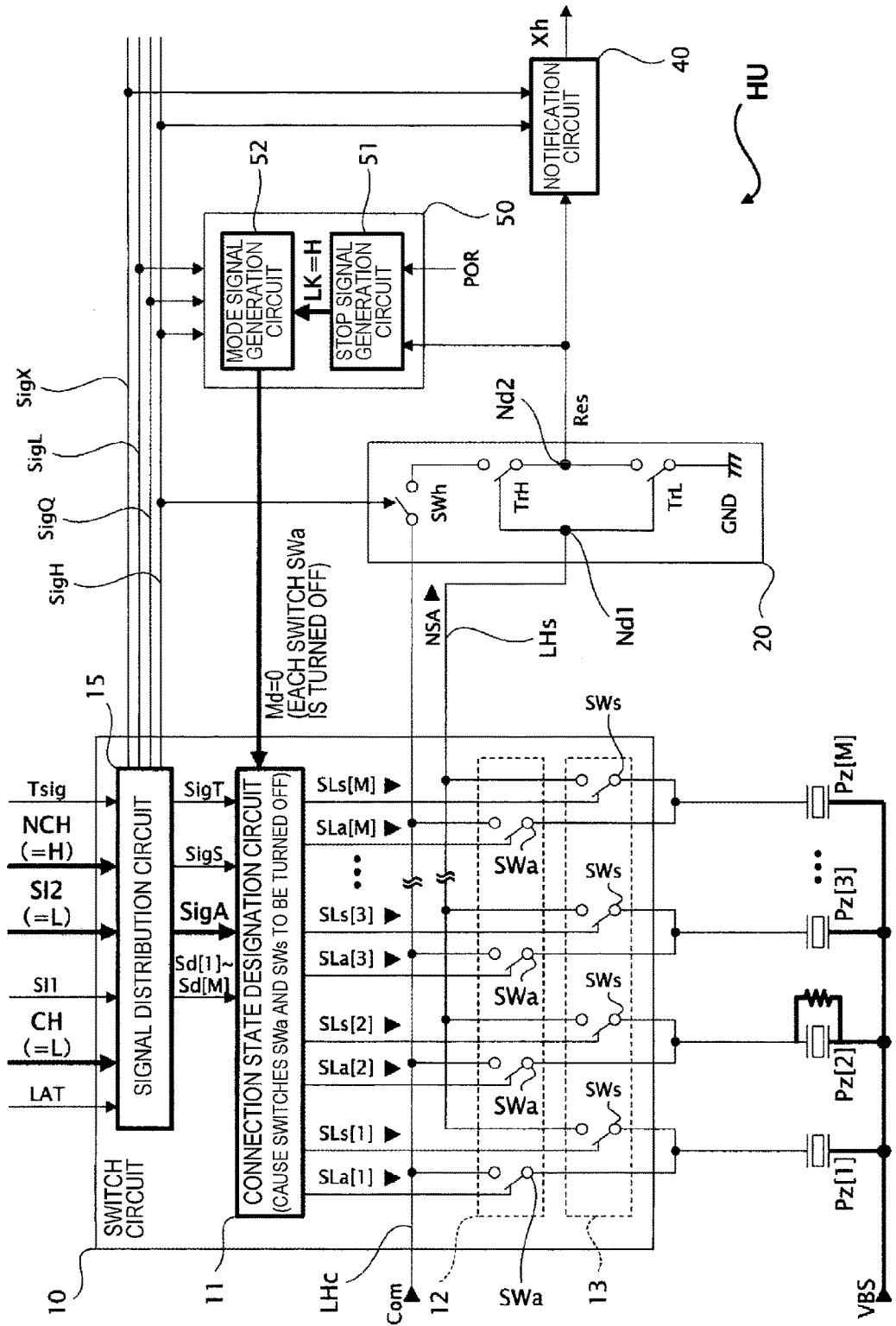
FIG. 11J illustrates a start-up process and a diagnosis process.

FIGS. 11I and 11J illustrate the operation of the head unit HU when the normal operation period TR in which the printing process and the like are performed starts after completion of the diagnosis process. FIG. 11I illustrates the operation of the head unit HU when the determination result of the determination process is affirmative, and FIG. 11J illustrates the operation of the head unit HU when the determination result of the determination process is negative.

The control section 6 sets the print signal SI2 to the low level, sets the change signal CH to the low level, and sets the N-charge signal NCH to the high level at the time t-40 at which the diagnosis process ends. Therefore, the signal distribution circuit 15 sets the permission signal SigQ to the low level at the time t-40, and sets the pulse PlsA4 to the designation signal SigA to terminate the control period TA3.

The mode signal generation circuit 52 sets the operation mode designation signal Md to the value "2" that designates the normal mode during the normal operation period TR when the determination result of the determination process is affirmative, and the stop signal LK is set to the low level (see FIG. 11I), and sets the operation mode designation signal Md to the value "0" that designates the supply stop mode during the normal operation period TR when the determination result of the determination process is negative, and the stop signal LK is set to the high level (see FIG. 11J). When the operation mode designation signal Md is set to the value "2" that designates the normal mode (see FIG. 11I), the connection state designation circuit 11 sets the signal level of the connection state designation signals SLa[1] to SLa[M] so that the switches SWa[1] to SWa[M] are turned ON or OFF corresponding to the individual designation signals Sd[1] to Sd[M] supplied to the connection state designation circuit 11. When the operation mode designation signal Md is set to the value "0" that designates the supply stop mode (see FIG. 11J), the connection state designation circuit 11 sets the connection state designation signals SLa[1] to SLa[M] to the low level so that the switches SWa[1] to SWa[M] are turned OFF (maintained in the OFF state).

Note that the connection state designation circuit 11 sets the connection state designation signals SLs[1] to SLs[M] to the low level during the normal operation period TR regardless of the determination result of the determination process so that the switches SWs[1] to SWs[M] are turned OFF.

The head unit HU according to the first embodiment performs the determination process that determines whether or not the ejecting section D has a predetermined ejection capability, and the ejection limit process that stops driving the ejecting section D when the result of the determination process is negative to limit the ejection of an ink from the ejecting section D as described above with reference to FIGS. 11A to 11J.

6. Operation of Head Unit During Printing Process

An outline of the operation of the head unit HU during the printing process is described below with reference to FIG. 12.

Figure 12:
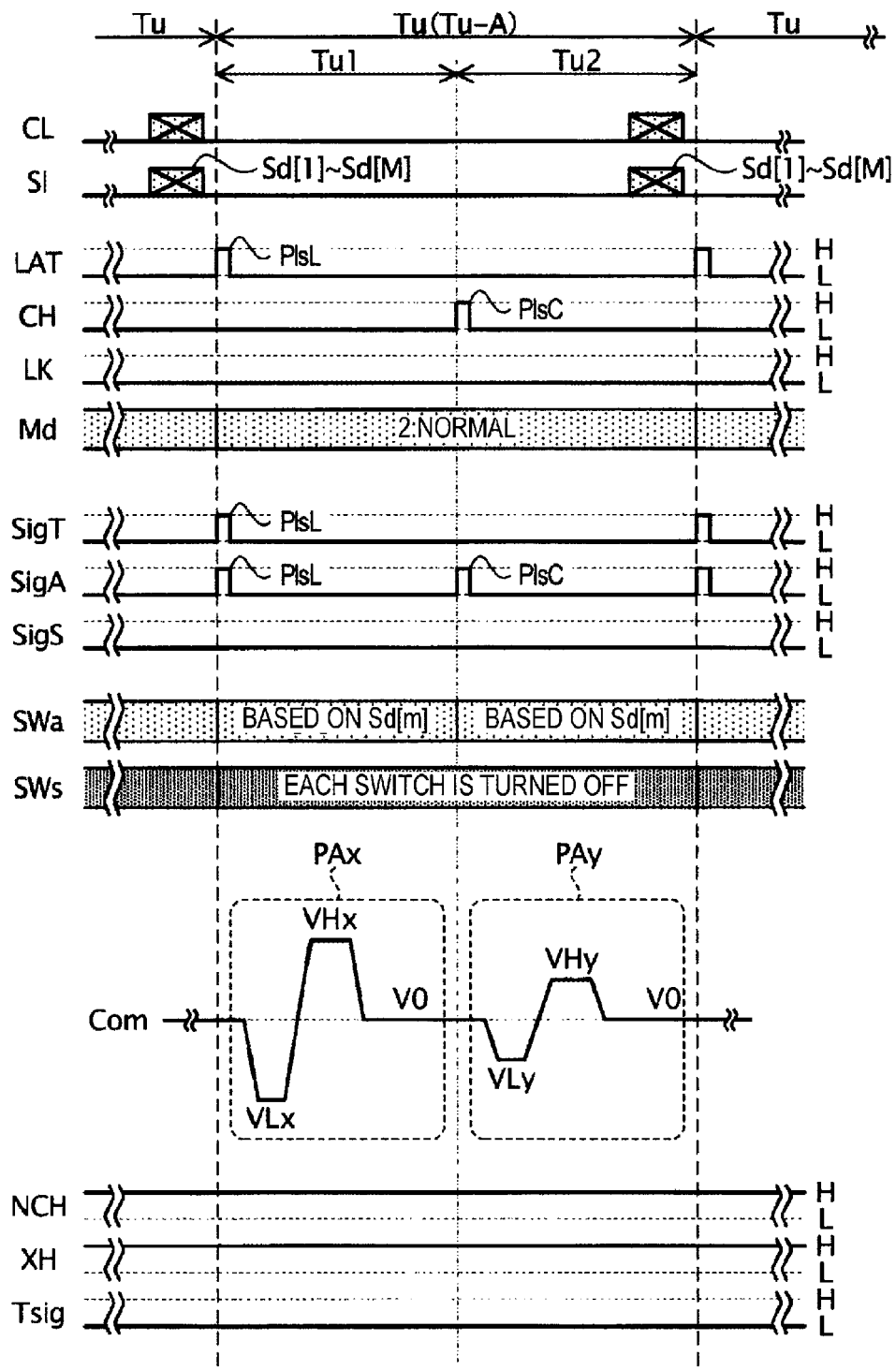
FIG. 12 is a timing chart illustrating a printing process.

FIG. 12 is a timing chart illustrating the operation of the head unit HU when the printing process is performed.

As illustrated in FIG. 12, the printing process is performed in a unit period Tu that is provided within the normal operation period TR. Note that the unit period Tu is a period in which each ejecting section D ejects an ink that forms one dot during the printing process. The inkjet printer 1 normally repeats the printing process over a plurality of unit periods Tu so that each ejecting section D ejects an ink a plurality of times to form the image represented by the print data Img. Note that the inkjet printer 1 may perform a process (e.g., a process that discharges the ink from the ejecting section D in order to maintain the ejecting section D) other than the printing process in the unit period Tu. Therefore, the unit period Tu in which the printing process is performed may be referred to as "unit print period Tu-A".

As illustrated in FIG. 12, in the first embodiment, the unit period Tu is a period from the rising edge of a pulse PlsL that is provided to the latch signal LAT during the normal operation period TR to the rising edge of the next pulse PlsL. In the first embodiment, the unit print period Tu-A (i.e., unit period Tu) is divided into print control periods Tu1 and Tu2 by a pulse PlsC that is provided to the change signal CH.

As illustrated in FIG. 12, the control section 6 generates the individual designation signals Sd[1] to Sd[M] that designate the drive mode of the ejecting sections D[1] to D[M] in each unit period Tu during the printing process in order to form dots that correspond to the image represented by the print data Img. The control section 6 supplies the print signals SI1 and SI2 that include the individual designation signals Sd[1] to Sd[M] to the signal distribution circuit 15 in synchronization with the clock signal CL prior to the start of each unit period Tu. The signal distribution circuit 15 generates the determination signal SigT provided with the pulse PlsL based on the latch signal LAT, and generates the designation signal SigA provided with the pulse PlsL and the pulse PlsC based on the latch signal LAT and the change signal CH during the printing process. The signal distribution circuit 15 supplies the individual designation signals Sd[1] to Sd[M], the determination signal SigT, and the designation signal SigA to the connection state designation circuit 11.

As described above, the stop signal generation circuit 51 sets the stop signal LK to the low level when the printing process can be performed during the normal operation period TR. The mode signal generation circuit 52 supplies the operation mode designation signal Md that is set to the value "2" that designates the normal mode to the connection state designation circuit 11 when the printing process can be performed during the normal operation period TR. Therefore, the connection state designation circuit 11 outputs the connection state designation signals SLa[1] to SLa[M] that are set to a signal level that ensures that the switches SWa[1] to SWa[M] are ON/OFF-controlled corresponding to the designation by the individual designation signals Sd[1] to Sd[M] during the printing process.

Note that the individual designation signal Sd[m] according to the first embodiment designates one drive mode among a drive mode in which the ejecting section D[m] ejects an ink in such a volume (large volume) that the ink forms a large dot (hereinafter may be referred to as "formation of a large dot" or the like), a drive mode in which the ejecting section D[m] ejects an ink in such a volume (medium volume) that the ink forms a medium dot (hereinafter may be referred to as "formation of a medium dot" or the like), a drive mode in which the ejecting section D[m] ejects an ink in such a volume (small volume) that the ink forms a small dot (hereinafter may be referred to as "formation of a small dot" or the like), and a drive mode in which the ejecting section D[m] does not eject an ink, with respect to each ejecting section D[m] during the printing process corresponding to each unit period Tu (unit print period Tu-A).

As illustrated in FIG. 12, the control section 6 outputs the drive signal Com that has a waveform PAX in the print control period Tu1 and has a waveform PAY in the print control period Tu2 during the printing process. In the first embodiment, the waveform PAX is designed so that the potential difference between the highest potential VHX and the lowest potential VLX of the waveform PAX is larger than the potential difference between the highest potential VII of the drive signal Com during the diagnosis process and the potential V0. The waveform PAY is designed so that the potential difference between the highest potential VHY and the lowest potential VLY of the waveform PAY is smaller than the potential difference between the highest potential VHX and the lowest potential VLX of the waveform PAX. More specifically, the waveform PAX is designed so that the ejecting section D[m] ejects a medium volume of ink when the ejecting section D[m] is driven using the drive signal Com that has the waveform PAX. The waveform PAY is designed so that the ejecting section D[m] ejects a small volume of ink when the ejecting section D[m] is driven using the drive signal Com that has the waveform PAY.

When the individual designation signal Sd[m] designates formation of a large dot (i.e., instructs the ejecting section D[m] to form a large dot), the connection state designation circuit 11 sets the connection state designation signal SLa[m] to the high level during the print control period Tut, and also sets the connection state designation signal SLa[m] to the high level during the print control period Tu2. In this case, the ejecting section D[m] is driven by the drive signal Com that has the waveform PAX during the print control period Tu1 to eject a medium volume of ink, and is driven by the drive signal Com that has the waveform PAY during the print control period Tu2 to eject a small volume of ink. The ejecting section D[m] thus ejects a large volume of ink in total during the unit period Tu, and a large dot is formed on the recording paper P.

When the individual designation signal Sd[m] designates formation of a medium dot (i.e., instructs the ejecting section D[m] to form a medium dot), the connection state designation circuit 11 sets the connection state designation signal SLa[m] to the high level during the print control period Tu1, and sets the connection state designation signal SLa[m] to the low level during the print control period Tu2. In this case, the ejecting section D[m] is driven by the drive signal Com that has the waveform PAX during the print control period Tu1 to eject a medium volume of ink, and does not eject an ink during the print control period Tu2 since the drive signal Com is not supplied. The ejecting section D[m] thus ejects a medium volume of ink during the unit period Tu, and a medium dot is formed on the recording paper P.

When the individual designation signal Sd[m] designates formation of a small dot (i.e., instructs the ejecting section D[m] to form a small dot), the connection state designation circuit 11 sets the connection state designation signal SLa[m] to the low level during the print control period Tu1, and sets the connection state designation signal SLa[m] to the high level during the print control period Tu2. In this case, the ejecting section D[m] is driven by the drive signal Com that has the waveform PAY during the unit period Tu to eject a small volume of ink, and a small dot is formed on the recording paper P.

When the individual designation signal Sd[m] instructs the ejecting section D[m] not to eject an ink, the connection state designation circuit 11 sets the connection state designation signal SLa[m] to the low level during the print control period Tu1, and also sets the connection state designation signal SLa[m] to the low level during the print control period Tu2. Therefore, the ejecting section D[m] does not eject an ink during the unit period Tu, and a dot is not formed on the recording paper P.

As illustrated in FIG. 12, the connection state designation circuit 11 sets the connection state designation signals SLs[1] to SLs[M] to the low level so that the switches SWs[1] to SWs[M] are turned OFF when the printing process is performed during the normal operation period TR. The notification circuit 40 sets the notification signal Xh to the high level when the printing process is performed during the normal operation period TR as long as the temperature detected by the overheating detection circuit has not exceeded a predetermined temperature.

As illustrated in FIG. 12, the control section 6 sets the N-charge signal NCH to the high level, and sets the diagnosis control signal Tsig to the low level when the printing process is performed during the normal operation period TR.

Note that the control section 6 may set the N-charge signal NCH to the low level during a period within the normal operation period TR in which the printing process is not performed. In this case, the signal distribution circuit 15 outputs the connection state designation signals SLa[1] to SLa[M] that cause all of the switches SWa[1] to SWa[M] to be turned ON to the connection state designation circuit 11. Specifically, the control section 6 sets the N-charge signal NCH to the low level when driving all of the ejecting sections D[1] to D[M] so as to eject an ink during the maintenance of the inkjet printer 1, for example.

When the control section 6 supplies the drive signal Com that has the waveform PAX or the waveform PAY to the upper electrode 302 of the ejecting section D[m] during the printing process, the potential of the lower electrode 301 changes corresponding to a change in the potential of the upper electrode 302. Specifically, when the printing process is performed, the line LC and the terminal ZN (e.g., line LC1-5 and terminal ZN1-5) through which the drive signal Com is supplied increase in potential change width as compared with the line LC and the terminal ZN (e.g., line LC1-4 and terminal ZN1-4) through which the potential VBS is supplied, and the line LC and the terminal ZN (e.g., line LC1-4 and terminal ZN1-4) through which the potential VBS is supplied increase in potential change width as compared with the line LC and the terminal ZN (e.g., line LC1-3 and terminal ZN1-3) through which the ground potential GND is supplied.

The inkjet printer 1 according to the first embodiment thus performs the printing process that forms the image represented by the print data Img on the recording paper P by forming a large dot, a medium dot, and a small dot.

7. Connection State Designation Circuit

The configuration and the operation of the connection state designation circuit 11 are described below with reference to FIGS. 13 to 14C.

Figure 13:
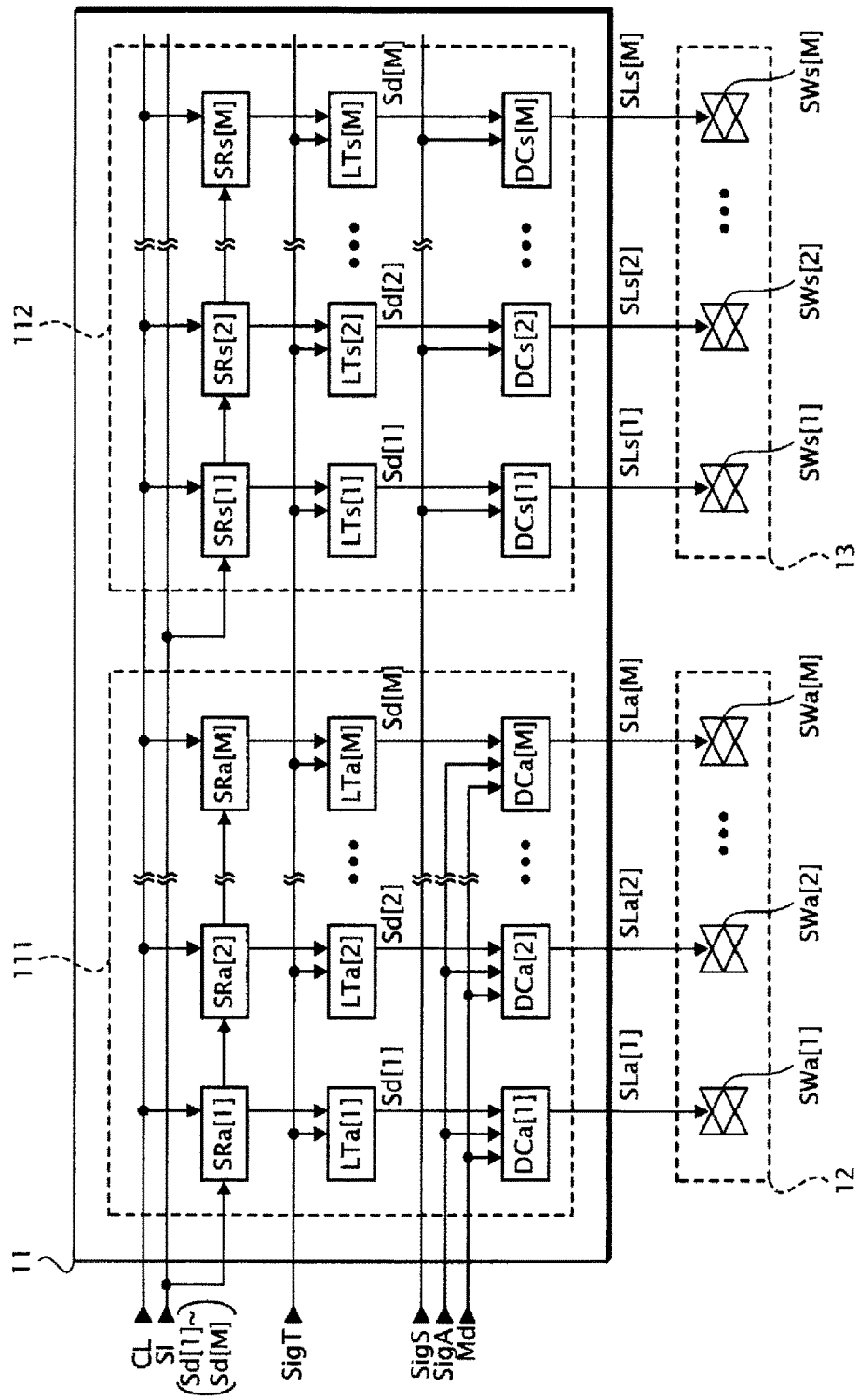
FIG. 13 is a block diagram illustrating the configuration of the connection state designation circuit 11.

FIG. 13 illustrates the configuration of the connection state designation circuit 11 according to the first embodiment. As illustrated in FIG. 13, the connection state designation circuit 11 includes a designation signal generation circuit 111 that generates the connection state designation signals SLa[1] to SLa[M] that are supplied to the switches SWa[1] to SWa[M], and a designation signal generation circuit 112 that generates the connection state designation signals SLs[1] to SLs[M] that are supplied to the switches SWs[1] to SWs[M].

As illustrated in FIG. 13, the designation signal generation circuit 111 includes transfer circuits SRa[1] to SRa[M], latch circuits LTa[1] to LTa[M], and decoders DCa[1] to DCa[M] that correspond to the switches SWa[1] to SWa[M] on a one-to-one basis.

The individual designation signal Sd[m] is supplied to the transfer circuit SRa[m]. Note that FIG. 13 illustrates an example in which the individual designation signals Sd[1] to Sd[M] are supplied serially, and the individual designation signal Sd[m] that corresponds to the mth stage is sequentially transferred from the transfer circuit SRa[1] to the transfer circuit SRa[m] in synchronization with the clock signal CL.

The latch circuit LTa[m] latches the individual designation signal Sd[m] supplied to the transfer circuit SRa[m] at a timing at which the determination signal SigT is set to the high level. More specifically, the latch circuit LTa[m] latches the individual designation signal Sd[m] during the printing process at a timing at which the pulse PlsL of the determination signal SigT is set to the high level, and latches the individual designation signal Sd[m] during the diagnosis process at a timing at which the pulse PlsT1 of the determination signal SigT is set to the high level.

The decoder DCa[m] generates the connection state designation signal SLa[m] based on the individual designation signal Sd[m], the designation signal SigA, and the operation mode designation signal Md.

FIGS. 14A and 14B illustrate the generation of the connection state designation signal SLa[m] by the decoder DCa[m]. The decoder DCa[m] decodes the individual designation signal Sd[m] according to FIGS. 14A and 14B to generate the connection state designation signal SLa[m].

As illustrated in FIG. 14A, when the operation mode designation signal Md is set to "1" (i.e., when the head unit HU performs the diagnosis process in the diagnosis period TQ), the individual designation signal Sd[m] that is supplied to the head unit HU during the start-up period TP that precedes the diagnosis period TQ represents a value (1, 1) that designates the ejecting section D[m] as the diagnosis target, or a value (0, 0) that does not designate the ejecting section D[m] as the diagnosis target.

When the individual designation signal Sd[m] represents the value (1, 1), the decoder DCa[m] outputs the connection state designation signal SLa[m] that is set to the high level during the control periods TA1 and TA3, and is set to the low level during the control period TA2 (see FIG. 14A). In this case, the switch SWa[m] (SWa-O[m]) is turned ON during the control periods TA1 and TA3, and is turned OFF during the control period TA2 (as described above with reference to FIG. 10A, for example).

When the individual designation signal Sd[m] represents the value (0, 0), the decoder DCa[m] sets the signal level of the connection state designation signal SLa[m] so that the connection state designation signal SLa[m] is set to the high level during the control periods TA1 to TA3 (see FIG. 14A). In this case, the switch SWa[m] (SWa-O[m]) is turned ON during the control periods TA1 to TA3 (as described above with reference to FIG. 10A, for example).

As illustrated in FIG. 14B, when the operation mode designation signal Md is set to "2" (i.e., when the inkjet printer 1 performs the printing process during the normal operation period TR), the individual designation signal Sd[m] that is supplied to the head unit HU prior to the start of the unit period Tu represents a value (1, 1) that designates formation of a large dot, a value (1, 0) that designates formation of a medium dot, a value (0, 1) that designates formation of a small dot, or a value (0, 0) that designates formation of no dot.

When the individual designation signal Sd[m] represents the value (1, 1) (see FIG. 14B), the decoder DCa[m] sets the signal level of the connection state designation signal SLa[m] so that the connection state designation signal SLa[m] is set to the high level during the print control periods Tu1 and Tu2. In this case, the switch SWa[m] is turned ON during the print control periods Tu1 and Tu2. Therefore, the ejecting section D[m] is driven by the waveform PAX and the waveform PAY, and ejects a large volume of ink during the unit period Tu.

When the individual designation signal Sd[m] represents the value (1, 0) (see FIG. 14B), the decoder DCa[m] sets the signal level of the connection state designation signal SLa[m] so that the connection state designation signal SLa[m] is set to the high level during the print control period Tu1, and is set to the low level during the print control period Tu2. In this case, the switch SWa[m] is turned ON during the print control period Tu1, and is turned OFF during the print control period Tu2. Therefore, the ejecting section D[m] is driven by the waveform PAX, and ejects a medium volume of ink during the unit period Tu.

When the individual designation signal Sd[m] represents the value (0, 1) (see FIG. 14B), the decoder DCa[m] sets the signal level of the connection state designation signal SLa[m] so that the connection state designation signal SLa[m] is set to the low level during the print control period Tu1, and is set to the high level during the print control period Tu2. In this case, the switch SWa[m] is turned OFF during the print control period Tu1, and is turned ON during the print control period Tu2. Therefore, the ejecting section D[m] is driven by the waveform PAY, and ejects a small volume of ink during the unit period Tu.

When the individual designation signal Sd[m] represents the value (0, 0) (see FIG. 14B), the decoder DCa[m] sets the signal level of the connection state designation signal SLa[m] so that the connection state designation signal SLa[m] is set to the low level during the print control periods Tu1 and Tu2. In this case, the switch SWa[m] is turned OFF during the print control periods Tu1 and Tu2. Therefore, the ejecting section D[m] does not eject an ink during the unit period Tu.

As illustrated in FIG. 13, the designation signal generation circuit 112 includes transfer circuits SRs[1] to SRs[M], latch circuits LTs[1] to LTs[M], and decoders DCs[1] to DCs[M] that correspond to the switches SWs[1] to SWs[M] on a one-to-one basis.

The individual designation signal Sd[m] is supplied to the transfer circuit SRs[m]. Note that FIG. 13 illustrates an example in which the individual designation signals Sd[1] to Sd[M] are supplied serially. The latch circuit LTs[m] latches the individual designation signal Sd[m] held by the transfer circuit SRs[m] at a timing at which the pulse PlsT1 of the determination signal SigT is set to the high level during the diagnosis process.

The decoder DCs[m] generates the connection state designation signal SLs[m] based on the individual designation signal Sd[m] and the designation signal SigS.

FIG. 14C illustrates the generation of the connection state designation signal SLs[m] by the decoder DCs[m]. The decoder DCs[m] decodes the individual designation signal Sd[m] according to FIG. 14C to generate the connection state designation signal SLs[m].

As illustrated in FIG. 14C, when the operation mode designation signal Md is set to "1" (i.e., when the head unit HU performs the diagnosis process in the diagnosis period TQ), the individual designation signal Sd[m] that is supplied to the head unit HU during the start-up period TP that precedes the diagnosis period TQ represents a value (1, 1) that designates the ejecting section D[m] as the diagnosis target, or a value (0, 0) that does not designate the ejecting section D[m] as the diagnosis target.

When the individual designation signal Sd[m] represents the value (1, 1) (see FIG. 14C), the decoder DCs[m] sets the signal level of the connection state designation signal SLs[m] so that the connection state designation signal SLs[m] is set to the high level during the control period TS, and is set to the low level during a period other than the control period TS. In this case, the switch SWs[m] (SWs-O[m]) is turned ON during the control period TS, and is turned OFF during a period other than the control period TS.

When the individual designation signal Sd[m] represents the value (0, 0) (see FIG. 14C), the decoder DCs[m] sets the signal level of the connection state designation signal SLs[m] so that the connection state designation signal SLs[m] is set to the low level during the control period TS and a period other than the control period TS. In this case, the switch SWs[m] is turned OFF during the control period TS and a period other than the control period TS.

8. Conclusion

As described above, the head unit HU according to the first embodiment includes the determination circuit 20 that performs the determination process that determines whether or not the ejecting section D has a predetermined ejection capability, and the ejection limit circuit 5 that performs the ejection limit process that stops driving the ejecting section D when the determination result of the determination process is negative to limit the ejection of an ink from the ejecting section D.

The determination circuit 20 performs the determination process during the determination period T2 that is defined by the control waveform signal Tsig2 (see above). The determination circuit 20 performs the determination process that generates the determination result signal Res based on the detection signal NSA supplied from the ejecting section D included in the head unit HU, and supplies the generated determination result signal Res to the notification circuit 40 and the operation designation circuit 50 included in the head unit HU. Specifically, the determination process is performed by (within) the head unit HU in a self-contained manner.

The ejection limit circuit 5 performs the ejection limit process during the determination result handling period T3 that is defined by the print signal SI2, the change signal CH, the N-charge signal NCH, and the diagnosis control signal Tsig. Note that the print signal SI2, the change signal CH, and the N-charge signal NCH may be referred to as "print signal SI2 and the like". The ejection limit circuit 5 performs the ejection limit process that generates the connection state designation signals SLa[1] to SLa[M] based on the determination result signal Res to cause the switches SWa[1] to SWa[M] to be turned OFF. More specifically, the ejection limit circuit 5 performs the ejection limit process that sets the potential of the stop signal LK based on the determination result signal Res supplied from the determination circuit 20 included in the head unit HU, sets the value of the operation mode designation signal Md based on the stop signal LK, and generates the connection state designation signals SLa[1] to SLa[M] based on the operation mode designation signal Md to cause the switches SWa[1] to SWa[M] to be turned OFF. Specifically, the ejection limit process is performed by (within) the head unit HU in a self-contained manner.

As described above, the head unit HU according to the first embodiment performs the determination process and the ejection limit process within the head unit HU in a self-contained manner. Therefore, it is possible to reduce the possibility that noise is mixed into the signals that are generated by the determination process and the ejection limit process as compared with the case where at least one (part) of the determination process and the ejection limit process is performed outside the head unit HU. Specifically, it is possible to reduce the possibility that noise is mixed into the signals (e.g., detection signal NSA, determination result signal Res, stop signal LK, operation mode designation signal Md, and connection state designation signals SLa[1] to SLa[M]) that are generated or used by the determination process and the ejection limit process as compared with the case where at least one (part) of the determination circuit 20 and the ejection limit circuit 5 is provided outside the head unit HU (e.g., substrate 600).

Therefore, it is possible to implement the determination process (determination) with higher accuracy, and more reliably limit the driving of the ejecting section D that does not have a predetermined ejection capability as compared with the case where at least one (part) of the determination circuit 20 and the ejection limit circuit 5 is provided outside the head unit HU. This makes it possible to more reliably prevent a situation in which a low-quality image is printed due to the ejecting section D that does not have a predetermined ejection capability, and more reliably prevent a decrease in safety that occurs when the piezoelectric element PZ that does not have a predetermined electrical storage capability is driven.

According to the first embodiment, the signals (e.g., print signal SI) that are supplied to the head unit HU from the control section 6, and the signals (e.g., designation signal SigA) that are generated by the head unit HU, do not change in potential during a period within the determination period T2 in which the control waveform signal Tsig2 is set to the high level. Therefore, it is possible to reduce the possibility that noise due to a change in potential of other signals is mixed into the detection signal NSA that is the determination target of the determination process, and the determination result signal Res that represents the determination result of the determination process, as compared with the case where the signals change in potential during a period in which the control waveform signal Tsig2 is set to the high level. This makes it possible to improve the accuracy of the determination process (i.e., the accuracy of determination).

According to the first embodiment, the potential of the signals supplied to the head unit HU from the control section 6 other than the diagnosis control signal Tsig that controls the diagnosis process (hereinafter referred to as "the signals other than the diagnosis control signal Tsig") is maintained approximately constant during the diagnosis period TQ (i.e., a period from the time t-11 to the time t-40 in a strict sense).

Therefore, it is possible to reduce the occurrence of noise due to a change in potential of the signals other than the diagnosis control signal Tsig during the diagnosis period TQ. Specifically, it is possible to reduce noise that is superimposed on the diagnosis control signal Tsig, and reduce noise that is superimposed on the signals that are generated during the diagnosis process and the like as compared with the case where the signals other than the diagnosis control signal Tsig change in potential during the diagnosis period TQ. This makes it possible to reduce the possibility that malfunction occurs during the diagnosis process, improve the accuracy of the determination process (i.e., the accuracy of determination), and reliably stop the ejecting section D during the ejection limit process.

According to the first embodiment, the print signal SI is set to the low level during a period (other than a period in which the individual designation signals Sd[1] to Sd[M] are supplied), the change signal CH is set to the low level (during a period other than a period in which the pulse PlsC is supplied), and the N-charge signal NCH is set to the high level during the normal operation period TR in which the printing process is performed. The print signal SI2 is set to the high level, the change signal CH is set to the high level, and the N-charge signal NCH is set to the low level during the diagnosis period TQ in which the diagnosis process is performed. Specifically, the signal level of the print signal SI2, the signal level of the change signal CH, and the signal level of the N-charge signal NCH during the normal operation period TR respectively have an inverse relationship with the signal level of the print signal SI2, the signal level of the change signal CH, and the signal level of the N-charge signal NCH during the diagnosis period TQ. Therefore, it is considered that a situation in which the signal level of the print signal SI2, the signal level of the change signal CH, and the signal level of the N-charge signal NCH are reversed at the same time normally does not occur during the normal operation period TR even if noise is mixed into the print signal SI2, the change signal CH, and the N-charge signal NCH.

This makes it possible to reliably prevent a situation in which the diagnosis process starts due to malfunction at a timing at which the diagnosis process should not be performed (e.g., a timing at which the printing process is being performed).

Note that the print signal SI2 is an example of the first designation signal that defines the diagnosis period TQ, and designates the drive mode of the ejecting section D[m] during the printing process using the individual designation signal Sd[m]. The change signal CH is an example of the second designation signal that defines the diagnosis period TQ, and defines the print control periods Tu1 and Tu2 during the printing process. The N-charge signal NCH is an example of the third designation signal that defines the diagnosis period TQ, and instructs to cause all of the switches SWa[1] to SWa[M] to be turned ON during the normal operation period TR.

According to the first embodiment, the control section 6 designates the diagnosis target ejecting section D-O that is the target of the diagnosis process using the individual designation signal Sd. Therefore, the control section 6 according to the first embodiment can set the value of the individual designation signal Sd, and designate the diagnosis target ejecting section D-O so that the diagnosis is performed in the mode required for the diagnosis process, for example.

For example, the control section 6 may generate the individual designation signal Sd that designates all of the 4M ejecting sections D of the head module HM as the diagnosis target ejecting section D-O in response to the first start-up of the inkjet printer 1 since it is preferable to diagnose all of the ejecting sections D with respect to the ejection capability, and may generate the individual designation signal Sd that designates some of the 4M ejecting sections D as the diagnosis target ejecting section D-O in response to the second or subsequent start-up since it may be unnecessary to diagnose all of the ejecting sections D.

According to the first embodiment, it is thus possible to implement the diagnosis process in the mode required for the diagnosis process (e.g., a mode that corresponds to the usage state of the inkjet printer 1).

Note that the inkjet printer 1 may be configured so that the user of the inkjet printer 1 can designate a request with regard to the diagnosis process, or the value of the individual designation signal Sd for designating the diagnosis target ejecting section D-O, by operating an operation section that is not illustrated in the drawings. In this case, it is possible to implement the diagnosis process in the mode that corresponds to the user's needs.

According to the first embodiment, the control section 6 defines the times t-11, t-12, t-20, t-30, t-31, t-32, t-33, and t-34 using the diagnosis control signal Tsig. Specifically, the control section 6 according to the first embodiment can set the length of a period in which the control waveform signal Tsig1 is set to the high level, and the determination period T2 in which the control waveform signal Tsig2 is set to the high level, by adjusting the waveform of the diagnosis control signal Tsig.

The length of each period can be adjusted in various ways by adjusting the waveform of the diagnosis control signal Tsig.

For example, the control section 6 may set the length of a period in which the control waveform signal Tsig1 is set to the high level corresponding to the number of ejecting sections D designated as the diagnosis target ejecting section D-O. In this case, it is possible to adjust the time in which the drive signal Com is supplied to the diagnosis target ejecting section D-O corresponding to the number of ejecting sections D designated as the diagnosis target ejecting section D-O. This makes it possible to accurately set the potential VII of the drive signal Com with respect to the upper electrode 302 of the piezoelectric element PZ of the diagnosis target ejecting section D-O, and accurately implement determination in the determination process.

For example, the control section 6 may set the length of either or both of the determination period T2 and the period from the time t-12 to the time t-30 corresponding to the number of ejecting sections D designated as the diagnosis target ejecting section D-O. In this case, it is possible to provide a time required for a change in the potential of the internal line LHs due to a leakage current that occurs in the piezoelectric element PZ having a leakage path to become obvious even when the number of ejecting sections D designated as the diagnosis target ejecting section D-O is large. Therefore, it is possible to accurately reflect the potential of the individual detection signal Vout detected from the diagnosis target ejecting section D-O that does not have a predetermined ejection capability in the detection signal NSA during the diagnosis process even when the number of ejecting sections D designated as the diagnosis target ejecting section D-O is large. This makes it possible to accurately determine the presence or absence of an ejecting section D that does not have a predetermined ejection capability.

For example, the control section 6 may set at least one of the length of a period in which the control waveform signal Tsig1 is set to the high level, and the length of the determination period T2, corresponding to the determination accuracy required for the determination process. In this case, the accuracy of determination can be improved by increasing either or both of the length of a period in which the control waveform signal Tsig1 is set to the high level, and the length of the determination period T2.

For example, the control section 6 may set at least one of the length of a period in which the control waveform signal Tsig1 is set to the high level, and the length of the determination period T2, corresponding to a request from the user of the inkjet printer According to the first embodiment, it is thus possible to implement the diagnosis process with the accuracy required for the determination in the mode that corresponds to the user's needs and the like by adjusting the waveform of the diagnosis control signal Tsig corresponding to the accuracy required for the determination, the user's needs, and the like.

According to the first embodiment, the control section 6 outputs various signals such as the diagnosis control signal Tsig, the print signal SI, and the change signal CH through the terminal ZN of the connector CN, and supplies the various signals to the head unit HU through the terminal ZC of the cable CB and the line LC of the cable CB. However, when contact failure has occurred between the terminal ZN of the connector CN and the terminal ZC of the cable CB, noise may be mixed into the signal output from the terminal ZN, and the signal output from the terminal ZN may not be supplied to the head unit HU. In particular, it is likely that contact failure occurs between the connector CN and the cable CB when the relative positional relationship between at least part of the cable CB and the connector CN changes (e.g., a serial printer in which the carriage 100 reciprocates).

It is normally likely that contact failure between the connector CN and the cable CB occurs at the terminal ZN provided at a position near the end Eg of the connector CN as compared with the terminal ZN provided in the center area of the connector CN.

It is likely that foreign matter (e.g., dust in air and ink) adhere to the terminal ZN provided at a position near the end Eg of the connector CN as compared with the terminal ZN provided in the center area of the connector CN. When foreign matter has adhered to the terminal ZN, noise may be mixed into the signal output from the terminal ZN, and the signal output from the terminal ZN may not be supplied to the head unit HU.

It is likely that a low-quality image is formed when the printing process is performed in a state in which contact failure has occurred between the connector CN and the cable CB, or foreign matter has adhered to the terminal ZN of the connector CN. When a signal is transmitted through an area in which contact failure has occurred, or an area to which foreign matter has adhered, the leakage of the signal and the like may occur, whereby the inkjet printer 1 may break down, or the safety of the inkjet printer 1 may deteriorate.

The inkjet printer 1 according to the first embodiment performs the printing process only when the diagnosis process has been completed, and the result of the determination process performed during the diagnosis process is affirmative. The diagnosis process is controlled using the diagnosis control signal Tsig. Therefore, the diagnosis process is not completed, and the printing process is not performed when the supply of the diagnosis control signal Tsig to the head unit HU has failed since contact failure has occurred between the connector CN and the cable CB, or foreign matter has adhered to the connector CN.

The control section 6 according to the first embodiment outputs the diagnosis control signal Tsig through the terminal ZN1-2 of the connector CN1. Only the terminal ZN1-1 that is set to the ground potential GND is provided between the terminal ZN1-2 (among the terminals ZN1-1 to ZN4-14 of the connector CN1) and the end Eg1. Specifically, the terminal ZN 1-2 through which the diagnosis control signal Tsig is output is provided at a position near the end of the terminal arrangement area AR as compared with the terminals ZN1-5 and ZN1-7 through which the drive signal Com is output, the terminal ZN1-11 through which the clock signal CL is output, and the like. The first embodiment thus increases the possibility that the supply of the diagnosis control signal Tsig to the head unit HU fails when contact failure has occurred between the connector CN1 and the cable CB1, or foreign matter has adhered to the terminal ZN of the connector CN1, as compared with the possibility that the supply of the signal (e.g., drive signal Com and clock signal CL) necessary for the printing process fails.

Therefore, it is possible to increase the possibility that the diagnosis process (that must be completed before the printing process is performed) is not completed when contact failure has occurred between the connector CN and the cable CB, or foreign matter has adhered to the connector CN, and it is likely that a low-quality image is formed by the printing process, and increase the possibility that the execution of the printing process is limited.

According to the first embodiment, the connector CN1 has a configuration in which the terminal ZN1-3 that is set to the ground potential GND is provided between the terminal ZN1-2 through which the diagnosis control signal Tsig is output, and the terminal ZN1-5 through which the drive signal Com is output, and the terminal ZN1-4 that is set to the potential VBS is provided between the terminal ZN1-3 and the terminal ZN1-5. When the printing process is performed, the terminal ZN1-4 is smaller in potential change width than the terminal ZN1-5, and the terminal ZN1-3 is smaller in potential change width than the terminal ZN1-4 (see above). Therefore, the terminal ZN1-3 and the terminal ZN1-4 function as a shield that prevents a situation in which noise that has occurred due to a change in the potential of the drive signal Com that is output through the terminal ZN1-5 is propagated to the terminal ZN1-2. Specifically, a situation in which noise that has occurred due to the drive signal Com is superimposed on the diagnosis control signal Tsig is reduced or suppressed by the terminal ZN1-3 and the terminal ZN1-4. This makes it possible to prevent a situation in which the determination process is performed due to malfunction at a timing at which the determination process should not be performed (e.g., a timing at which the printing process is being performed).

Note that the terminal ZN1-2 through which the diagnosis control signal Tsig that includes the control waveform signal Tsig2 (i.e., instruction signal) is output is an example of the first terminal, the terminal ZN1-5 through which the drive signal Com is output is an example of the second terminal, the terminal ZN1-3 that is provided between the terminal ZN1-2 and the terminal ZN1-5 and is set to the ground potential GND is an example of the third terminal, the terminal ZN1-4 that is provided between the terminal ZN1-3 and the terminal ZN1-5, is set to the potential VBS, and is electrically connected to the power supply line LHb is an example of the fourth terminal, and the terminal ZN1-1 that is provided between the terminal ZN1-2 and the end Eg1 is an example of the fifth terminal.

According to the first embodiment, the cable CB1 has a configuration in which the line LC1-3 that is set to the ground potential GND is provided between the line LC1-2 to which the diagnosis control signal Tsig is supplied, and the line LC1-5 to which the drive signal Com is supplied, and the line LC1-4 that is set to the potential VBS is provided between the line LC1-3 and the line LC1-5. Therefore, the line LC1-3 and the line LC1-4 function as a shield that prevents a situation in which noise that has occurred due to a change in the potential of the drive signal Com that is supplied to the line LC1-5 is propagated to the line LC1-2, and reduce noise that is superimposed on the diagnosis control signal Tsig. This makes it possible to prevent a situation in which the determination process is performed due to malfunction at a timing at which the determination process should not be performed (e.g., a timing at which the printing process is being performed).

Note that the line LC1-2 that transmits the diagnosis control signal Tsig that includes the control waveform signal Tsig2 is an example of the first connection line, the line LC1-5 to which the drive signal Com is output is an example of the second connection line, the line LC1-3 that is provided between the line LC1-2 and the line LC1-5 and is set to the ground potential GND is an example of the third connection line, the line LC1-4 that is provided between the line LC1-3 and the line LC1-5, is set to the potential VBS, and is electrically connected to the power supply line LHb is an example of the fourth connection line, and the line LC1-1 that is provided on the side of the line LC1-2 opposite to the line LC1-3 is an example of the fifth connection line.

B. Second Embodiment

A second embodiment of the invention is described below. Note that the same elements as those described above in connection with the first embodiment as to the effect and the function are indicated by the same reference signs as those used in connection with the first embodiment, and detailed description thereof is appropriately omitted.

An inkjet printer 1a according to the second embodiment differs from the inkjet printer 1 according to the first embodiment in that the inkjet printer 1a according to the second embodiment can check the ejection state of an ink from the ejecting section D (hereinafter referred to as "ejection state check"). The inkjet printer 1a according to the second embodiment can perform the start-up process, the diagnosis process, and the printing process in the same manner as the inkjet printer 1 according to the first embodiment.

Note that the ejection state check determines the presence or absence of a factor that inhibits the ejecting section D from ejecting an ink in the mode designated by the drive signal Com (e.g., the presence or absence of an increase in the viscosity of the ink with which the cavity 320 of the ejecting section D is filled, and the presence or absence of seepage of the ink out of the nozzle N of the ejecting section D).

Figure 15:
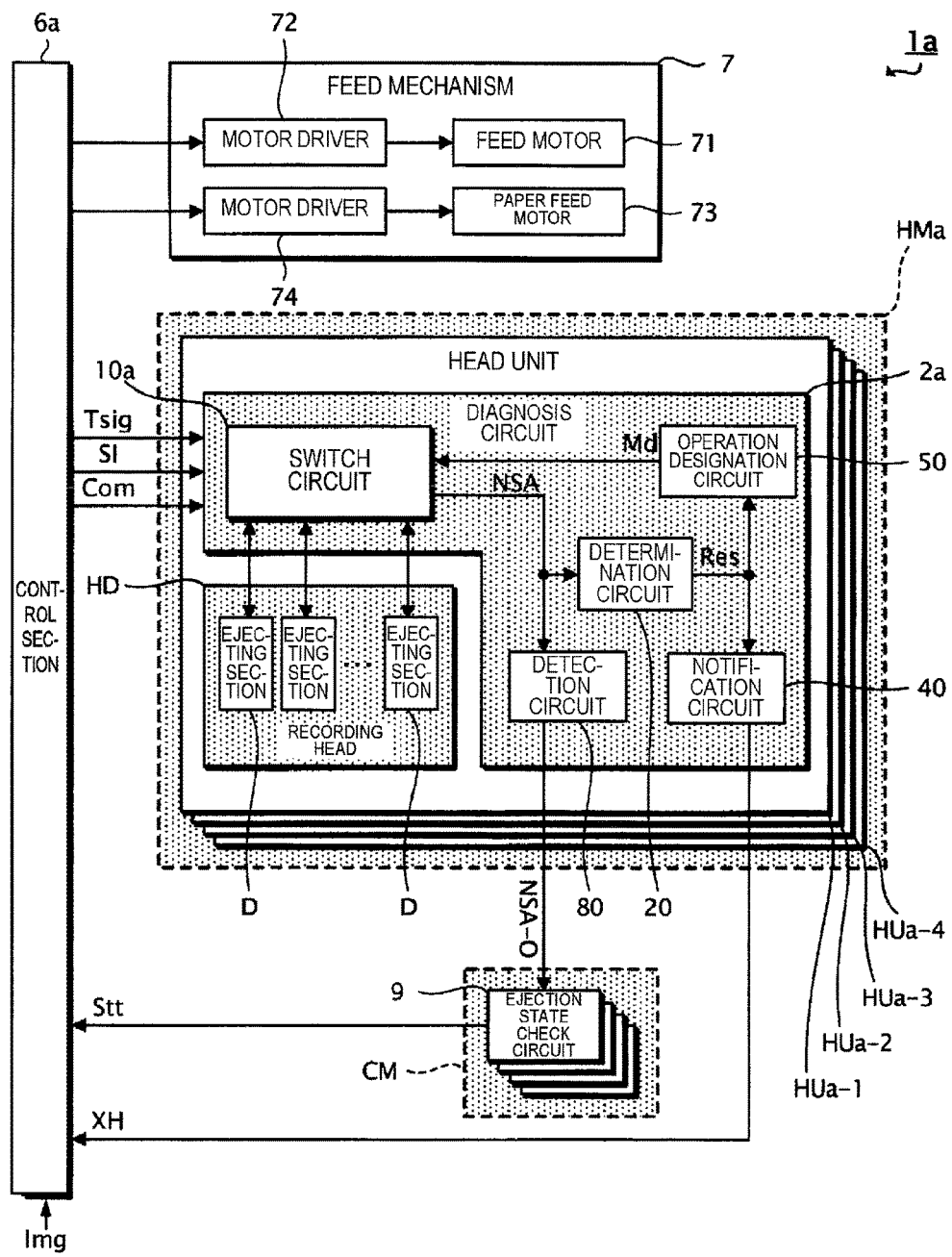
FIG. 15 is a block diagram illustrating the configuration of the inkjet printer 1a according to the second embodiment.

FIG. 15 illustrates an example of the configuration of the inkjet printer 1a according to the second embodiment. As illustrated in FIG. 15, the inkjet printer 1a is configured in the same manner as the inkjet printer 1 according to the first embodiment, except that the inkjet printer 1a includes a head module HMa that includes four head units HUa (HUa-1 to HUa-4) instead of the head module HM that includes four head units HU, and includes a check module CM that includes four ejection state check circuits 9 that are provided to correspond to the four head units HUa on a one-to-one basis.

The head unit HUa is configured in the same manner as the head unit HU according to the first embodiment, except that the head unit HUa includes a switch circuit 10a instead of the switch circuit 10, and includes a detection circuit 80. Note that part of the head unit HUa excluding the recording head HD (i.e., switch circuit 10a, determination circuit 20, notification circuit 40, operation designation circuit 50, and detection circuit 80) is referred to as "diagnosis circuit 2a". Note that the head unit HUa may not include the notification circuit 40, and the diagnosis circuit 2a may not include the notification circuit 40.

The detection circuit 80 generates an amplified detection signal NSA-O by amplifying the detection signal NSA. The detection circuit 80 includes a high-pass filter that cuts the direct-current component of the detection signal NSA, an operational amplifier that amplifies the detection signal NSA, and a low-pass filter that attenuates the high-frequency component of the detection signal NSA, for example.

The ejection state check circuit 9 performs the ejection state check process based on the amplified detection signal NSA-O output from the detection circuit 80 of the head unit HU that corresponds to the ejection state check circuit 9, and outputs a check result signal Stt that represents the result of the ejection state check process. Note that the inkjet printer 1a must perform a process that selects the ejecting section D that is subjected to the ejection state check process (hereinafter referred to as "check target ejecting section D-K"), a process that drives the check target ejecting section D-K using the drive signal Com, a process that detects the detection signal NSA from the check target ejecting section D-K, a process that generates the amplified detection signal NSA-O based on the detection signal NSA, and the like before the ejection state check circuit 9 performs the ejection state check (as described in detail later). A process that includes the ejection state check and each process that prepares for the ejection state check is hereinafter referred to as "ejection state check process".

In the second embodiment, the check module CM that includes four ejection state check circuits 9 is provided within the housing 200 separately from the control section 6 at a position outside the carriage 100 to which the head module HM is provided.

Note that each ejection state check circuit 9 may be provided on the substrate 600 as part of the control section 6, or may be provided on a substrate on which the diagnosis circuit 2a is provided as part of the head unit HUa.

The control section 6 according to the second embodiment generates the print signal SI that includes a check execution signal SP in addition to the individual designation signal Sd. Note that the check execution signal SP is a signal that represents that the inkjet printer 1a performs the ejection state check process. For example, the check execution signal SP is set to "1" when the inkjet printer 1a performs the ejection state check process during the normal operation period TR, and is set to "0" when the inkjet printer 1a performs the printing process during the normal operation period TR.

Figure 16:
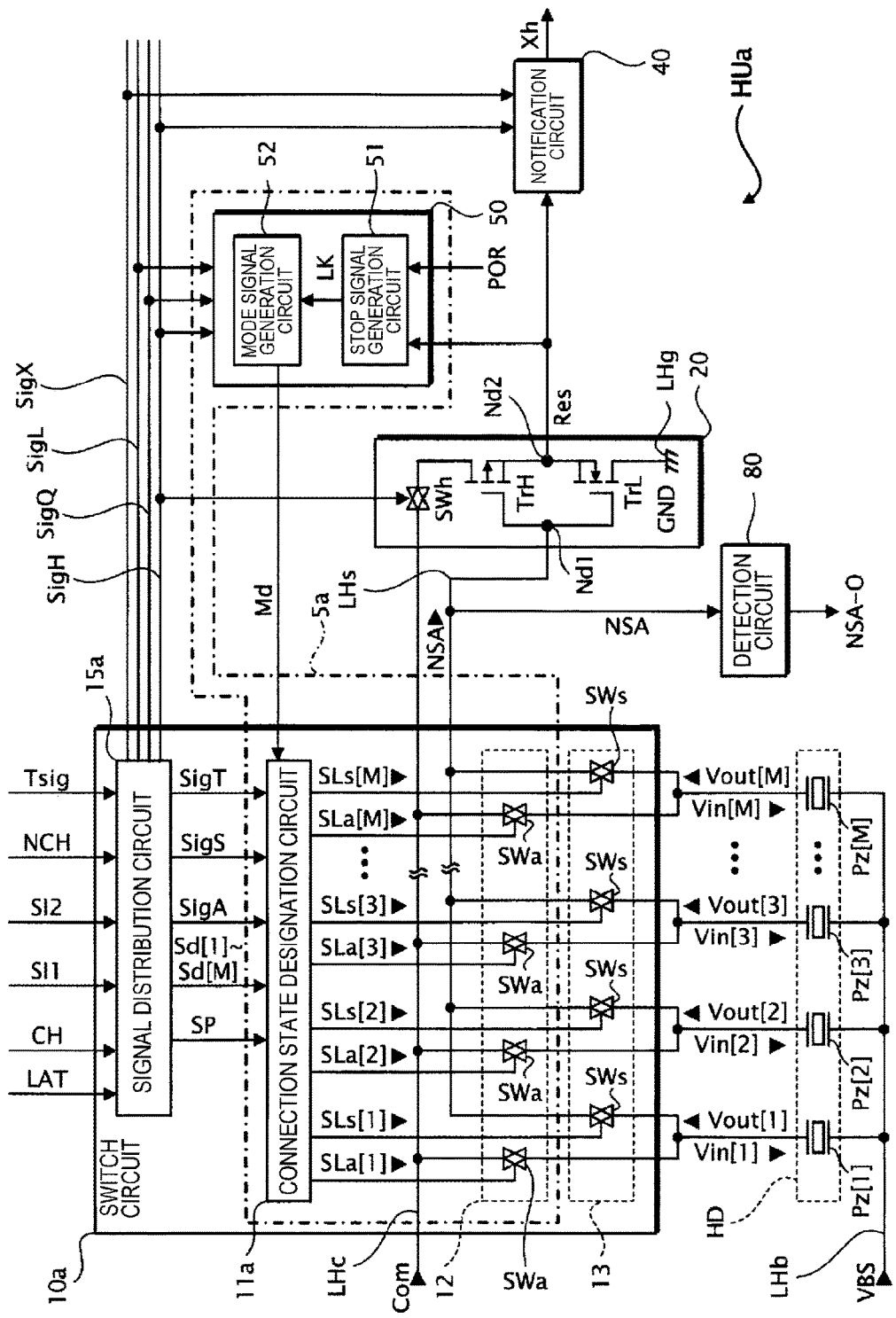
FIG. 16 is a block diagram illustrating the configuration of the head unit HUa.

FIG. 16 is a block diagram illustrating an example of the configuration of the head unit HUa.

As illustrated in FIG. 16, the switch circuit 10a included in the head unit HUa is configured in the same manner as the switch circuit 10 according to the first embodiment, except that the switch circuit 10a includes a connection state designation circuit 11a instead of the connection state designation circuit 11, and includes a signal distribution circuit 15a instead of the signal distribution circuit 15.

Note that the operation designation circuit 50, the connection state designation circuit 11a, and the connection state switch circuit 12 function as an ejection limit circuit 5a that stops the supply of the drive signal Com to the piezoelectric element PZ when the result of the determination process performed by the determination circuit 20 is negative to limit the ejection of an ink from the ejecting section D.

The signal distribution circuit 15a supplies the designation signal SigA, the designation signal SigS, the determination signal SigT, the individual designation signals Sd[1] to Sd[M], and the check execution signal SP included in the print signal SI1 or SI2 to the connection state designation circuit 11a.

The connection state designation circuit 11a generates the connection state designation signals SLa[1] to SLa[M] and the connection state designation signals SLs[1] to SLs[M] based on the operation mode designation signal Md supplied from the mode signal generation circuit 52, and the designation signal SigA, the designation signal SigS, the determination signal SigT, the individual designation signals Sd[1] to Sd[M], and the check execution signal SP supplied from the signal distribution circuit 15a.

The operation of the inkjet printer 1a is described below with reference to FIGS. 17 to 21.

Note that the inkjet printer 1a performs the start-up process, the diagnosis process, and the printing process in the same manner as described above with reference to FIGS. 10A, 10B and 12, except that the check execution signal SP is included in the print signal SI. The operation of the inkjet printer 1a during the ejection state check process is mainly described below.

Figure 17:
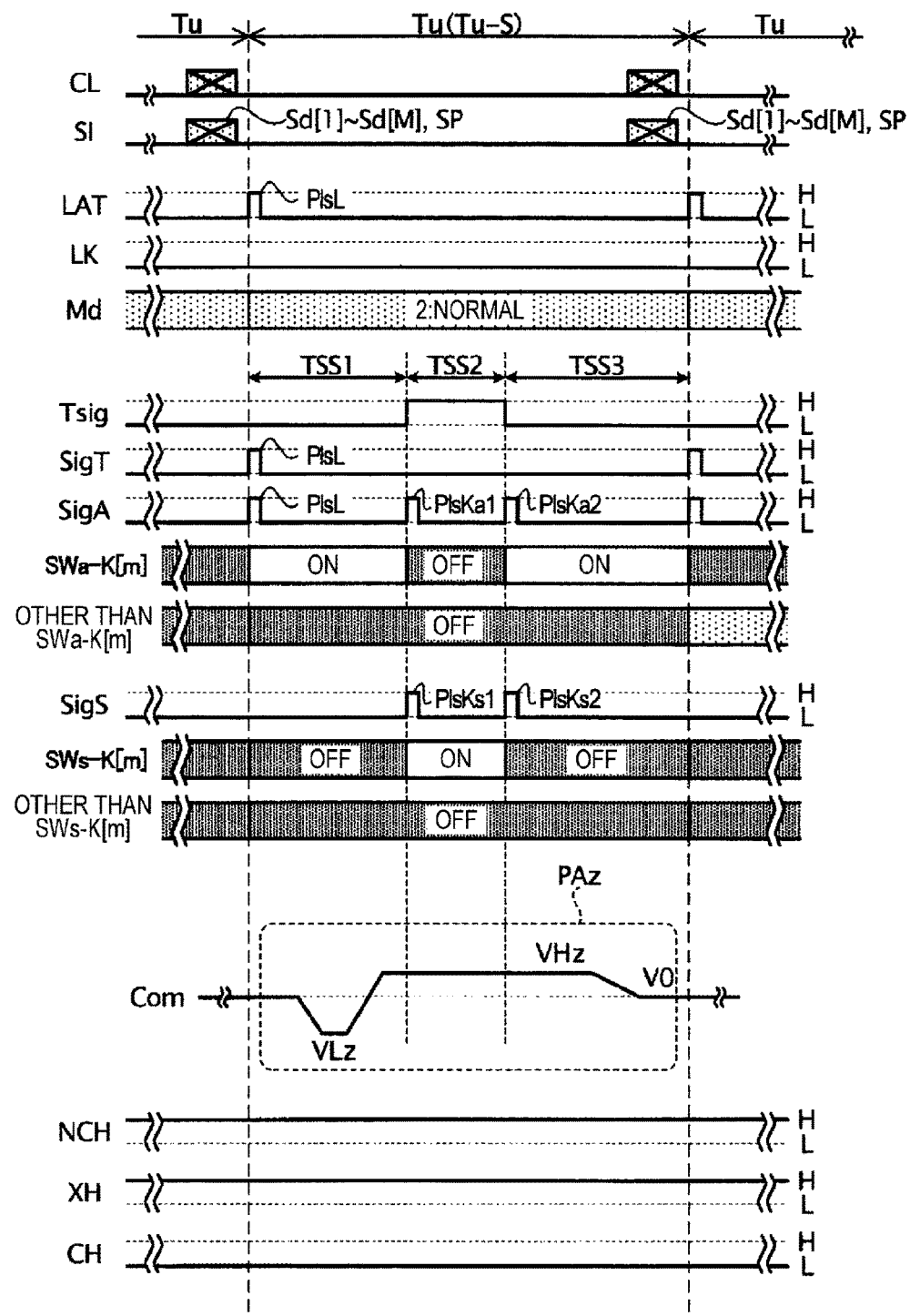
FIG. 17 is a timing chart illustrating an ejection state check process.

FIG. 17 is a timing chart illustrating the operation of the head unit HUa when the ejection state check process is performed.

As illustrated in FIG. 17, the ejection state check process is performed in a unit period Tu that is provided within the normal operation period TR. Note that the inkjet printer 1a according to the second embodiment performs the ejection state check process in the unit period Tu that differs from the unit print period Tu-A in which the printing process is performed (i.e., a check in a period other than the print period). The unit period Tu in which the ejection state check process is performed may be hereinafter referred to as "unit check period Tu-S".

As illustrated in FIG. 17, the control section 6 outputs the check execution signal SP and the individual designation signals Sd[1] to Sd[M] as the print signals SI1 and SI2 in synchronization with the clock signal CL prior to the start of the unit check period Tu-S.

In this case, the control section 6 designates the check target ejecting section D-K that is subjected to the ejection state check in the unit check period Tu-S using the individual designation signals Sd[1] to Sd[M]. As described above, it is noted that the head unit HUa and the ejection state check circuit 9 are provided on a one-to-one basis. Therefore, one check target ejecting section D-K is designated from each head unit HUa corresponding to each unit check period Tu-S.

The control section 6 sets the check execution signal SP that is output prior to the start of the unit check period Tu-S to the value "1" that represents that the next unit period Tu is the unit check period Tu-S.

As illustrated in FIG. 17, the control section 6 outputs the diagnosis control signal Tsig during the unit check period Tu-S, the diagnosis control signal Tsig being set to the low level during a control period TSS1, set to the high level during a control period TSS2, and set to the low level during a control period TSS3. The control section 6 thus divides the unit check period Tu-S into the control period TSS1, the control period TSS2, and the control period TSS3.

The signal distribution circuit 15 sets a pulse PlsL, a pulse PlsKa1, and a pulse PlsKa2 to the designation signal SigA, and sets a pulse PlsKs1 and a pulse PlsKs2 to the designation signal SigS during the unit check period Tu-S. The pulses PlsKa1 and PlsKs1 have a waveform that is set to the high level when the control period TSS2 starts, and the pulses PlsKa2 and PlsKs2 have a waveform that is set to the high level when the control period TSS3 starts.

The latch signal LAT, the stop signal LK, the operation mode designation signal Md, the determination signal SigT, the N-charge signal NCH, and the notification signal Xh are set during the unit check period Tu-S so as to have the same waveform or signal level as that during the unit print period Tu-A. The change signal CH is set to the low level during the unit check period Tu-S.

As illustrated in FIG. 17, the control section 6 outputs the drive signal Com that has a waveform PAZ during the unit check period Tu-S. In the second embodiment, the waveform PAZ is designed so that the potential difference between the highest potential VHZ and the lowest potential VLZ of the waveform PAZ is larger than the potential difference between the highest potential VHY and the lowest potential VLY of the waveform PAY, and the ejecting section D is driven so as not to eject an ink when the drive signal Com that has the waveform PAZ has been supplied. Note that the waveform PAZ may be a waveform that drives the ejecting section D so that the ejecting section D ejects an ink.

Figure 18:
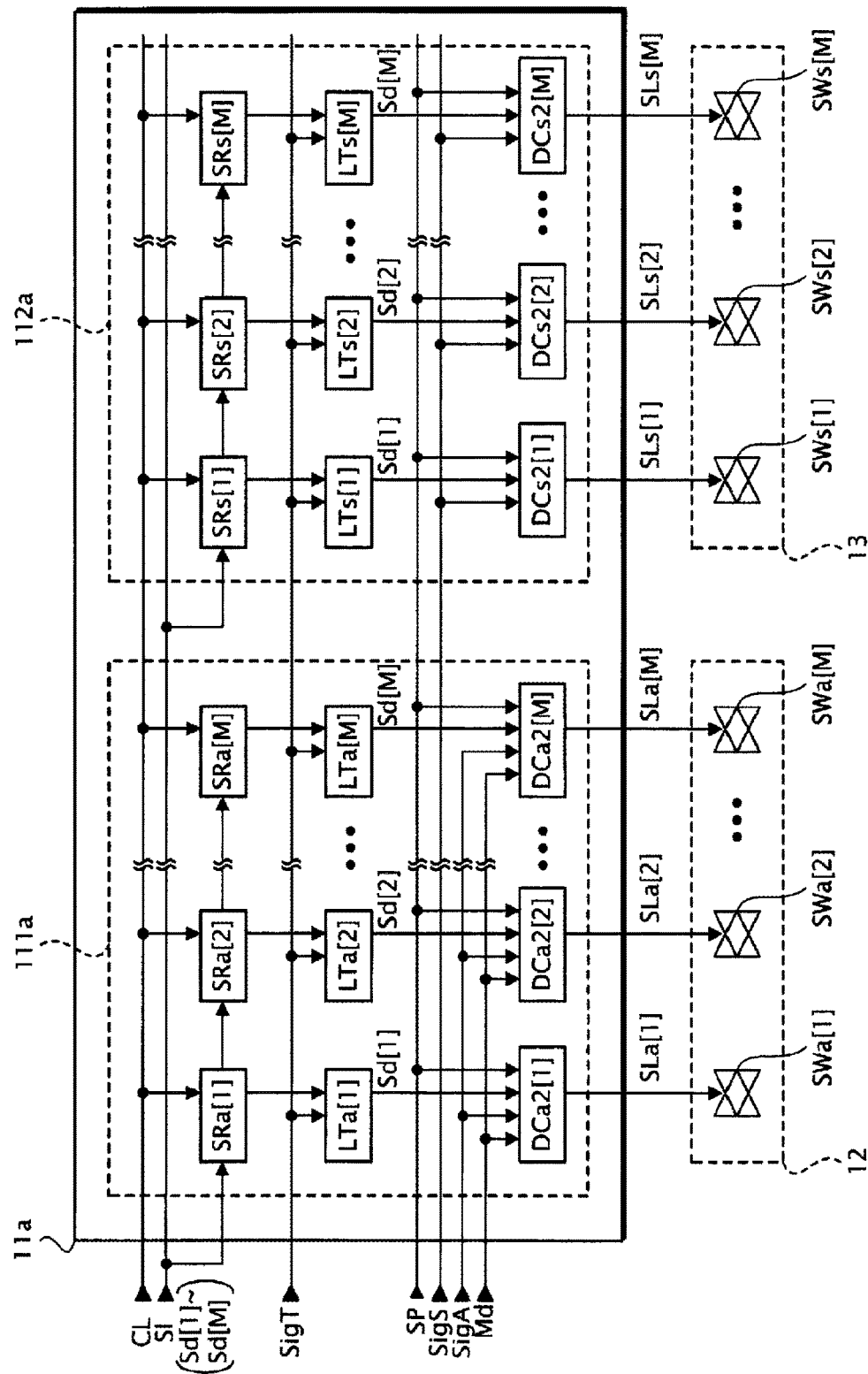

FIG. 18 illustrates the configuration of the connection state designation circuit 11a according to the second embodiment. The connection state designation circuit 11a includes a designation signal generation circuit 111a and a designation signal generation circuit 112a.

The designation signal generation circuit 111a is configured in the same manner as the designation signal generation circuit 111, except that the designation signal generation circuit 111a includes decoders DCa2[1] to DCa2[M] instead of the decoders DCa[1] to DCa[M]. The designation signal generation circuit 112a is configured in the same manner as the designation signal generation circuit 113, except that the designation signal generation circuit 112a includes decoders DCs2[1] to DCs2[M] instead of the decoders DCs[1] to DCs[M].

The decoder DCa2[m] generates the connection state designation signal SLa[m] based on the individual designation signal Sd[m], the designation signal SigA, the operation mode designation signal Md, and the check execution signal SP. The decoder DCs2[m] generates the connection state designation signal SLs[m] based on the individual designation signal Sd[m], the designation signal SigS, and the check execution signal SP.

FIG. 19A illustrates the generation of the connection state designation signal SLa[m] by the decoder DCa2[m].

As illustrated in FIG. 19A, when the operation mode designation signal Md is set to "2", and the check execution signal SP is set to "0" (i.e., when the printing process is performed), the operation of the decoder DCa2[m] is the same as that of the decoder DCa[m] according to the first embodiment during the printing process, as illustrated in FIG. 14B.

As illustrated in FIG. 19A, when the operation mode designation signal Md is set to "2", and the check execution signal SP is set to "1" (i.e., when the ejection state check process is performed), the individual designation signal Sd[m] represents a value (1, 1) that designates the ejecting section D[m] as the check target ejecting section D-K, or a value (0, 0) that does not designate the ejecting section D[m] as the check target ejecting section D-K.

When the individual designation signal Sd[m] represents the value (1, 1) that designates the ejecting section D[m] as the check target ejecting section D-K, the decoder DCa2[m] outputs the connection state designation signal SLa[m] that is set to the high level during the control periods TSS1 and TSS3, and is set to the low level during the control period TSS2. In this case, as illustrated in FIG. 17, the switch SWa (SWa-K[m]) that corresponds to the ejecting section D[m] designated as the check target ejecting section D-K[m] is turned ON during the control periods TSS1 and TSS3, and is turned OFF during the control period TSS2.

When the individual designation signal Sd[m] represents the value (0, 0) that does not designate the ejecting section D[m] as the check target ejecting section D-K, the decoder DCa2[m] outputs the connection state designation signal SLa[m] that is set to the low level during the control periods TSS1 to TSS3. In this case, as illustrated in FIG. 17, the switches SWa other than the switch SWa-K[m] are turned OFF during the control periods TSS1 to TSS3.

When the operation mode designation signal Md is set to "1" (i.e., when the diagnosis process is performed), the operation of the decoder DCa2[m] is the same as that of the decoder DCa[m] according to the first embodiment during the diagnosis process (see FIG. 14A) regardless of the value of the individual designation signal Sd.

FIG. 19B illustrates the generation of the connection state designation signal SLs[m] by the decoder DCs2[m].

As illustrated in FIG. 19B, when the operation mode designation signal Md is set to "2", and the check execution signal SP is set to "0" (i.e., when the printing process is performed), the decoder DCs2[m] outputs the connection state designation signal SLs[m] that is set to the low level during the print control periods Tu1 and Tu2 in the same manner as the decoder DCa[m] according to the first embodiment.

As illustrated in FIG. 19B, when the operation mode designation signal Md is set to "2", the check execution signal SP is set to "1" (i.e., when the ejection state check process is performed), and the individual designation signal Sd[m] represents the value (1, 1) that designates the ejecting section D[m] as the check target ejecting section D-K, the decoder DCs2[m] outputs the connection state designation signal SLs[m] that is set to the high level during the control period TSS2, and is set to the low level during the control periods TSS1 and TSS3. In this case, as illustrated in FIG. 17, the switch SWs (SWs-K[m]) that corresponds to the ejecting section D[m] designated as the check target ejecting section D-K is turned ON during the control period TSS2, and is turned OFF during the control periods TSS1 and TSS3.

When the individual designation signal Sd[m] represents the value (0, 0) that does not designate the ejecting section D[m] as the check target ejecting section D-K, the decoder DCs2[m] outputs the connection state designation signal SLs[m] that is set to the low level during the control periods TSS1 to TSS3. In this case, the switches SWs other than the switch SWs-K[m] are turned OFF during the control periods TSS1 to TSS3.

When the operation mode designation signal Md is set to "1" (i.e., when the diagnosis process is performed), the operation of the decoder DCs2[m] is the same as that of the decoder DCs[m] according to the first embodiment during the diagnosis process (see FIG. 14C) regardless of the value of the individual designation signal Sd.

As illustrated in FIG. 17, the drive signal Com is supplied to the ejecting section D[m] (check target ejecting section D-K[m]) designated as the check target ejecting section D-K during the control period TSS1. The potential of the drive signal Com changes from the lowest potential VLZ to the highest potential VHZ during the control period TSS1. Therefore, the piezoelectric element PZ[m] of the check target ejecting section D-K[m] is displaced corresponding to a change in the potential of the drive signal Com during the control period TSS1, and the check target ejecting section D-K[m] produces vibrations. The vibrations produced by the check target ejecting section D-K[m] remain during the control period TSS2. The potential of the upper electrode 302 of the check target ejecting section D-K[m (i.e., potential of the individual detection signal Vout[m]) changes during the control period TSS2 corresponding to the vibrations (hereinafter referred to as "residual vibrations") that remain in the check target ejecting section D-K[m].

As described above, the connection state designation circuit 11s outputs the connection state designation signal SLs[m] that causes the switch SWs-K[m] to be turned ON during the control period TSS2. Therefore, the detection circuit 80 detects the individual detection signal Vout[m] that changes the potential corresponding to the residual vibrations of the check target ejecting section D-K[m] as the detection signal NSA during the control period TSS2.

Residual vibrations produced by the ejecting section D have a natural resonance frequency that is determined by the shape of the nozzle N, the weight of the ink with which the cavity 320 is filled, the viscosity of the ink with which the cavity 320 is filled, and the like.

The frequency of the residual vibrations normally increases when air bubbles have been formed within the cavity 320 as compared with the case where air bubbles are not formed within the cavity 320. The frequency of the residual vibrations decreases when foreign matter (e.g., paper powder) adheres to an area around the nozzle N as compared with the case where foreign matter does not adhere to an area around the nozzle N. The frequency of the residual vibrations decreases when the viscosity of the ink with which the cavity 320 is filled has increased as compared with the case where the viscosity of the ink with which the cavity 320 is filled has not increased. The frequency of the residual vibrations decreases when the viscosity of the ink with which the cavity 320 is filled has increased as compared with the case where foreign matter (e.g., paper powder) adheres to an area around the nozzle N. The frequency of the residual vibrations decreases when the cavity 320 is not filled with an ink, or when the piezoelectric element PZ cannot be sufficiently displaced.

Specifically, the abnormal ejection state of the ejecting section D may occur when the piezoelectric element PZ does not have a predetermined electrical storage capability, when air bubbles have been formed within the cavity 320, when the viscosity of the ink with which the cavity 320 is filled has increased, where foreign matter adheres to an area around the nozzle N, when the cavity 320 is not filled with an ink, and the like.

In the second embodiment, the ejection state check is performed based on the waveform (e.g., frequency or amplitude) of residual vibrations produced by the ejecting section D in order to find an abnormal ejection state that cannot be detected by the diagnosis process, and prevent deterioration in print quality during the printing process. Since the waveform of the amplified detection signal NSA-O is determined based on the detection signal NSA, the ejection state check circuit 9 checks the ejection state of the check target ejecting section D-K based on the amplified detection signal NSA-O.

More specifically, the ejection state check circuit 9 generates cycle information Info-T that represents the time length NTc of one cycle of the amplified detection signal NSA-O, and amplitude information Info-S that represents whether or not the amplified detection signal NSA-O has a predetermined amplitude. The ejection state check circuit 9 checks the ejection state of the check target ejecting section D-K based on the cycle information Info-T and the amplitude information Info-S, and generates the check result signal Stt that represents the result of the check.

Figure 20:
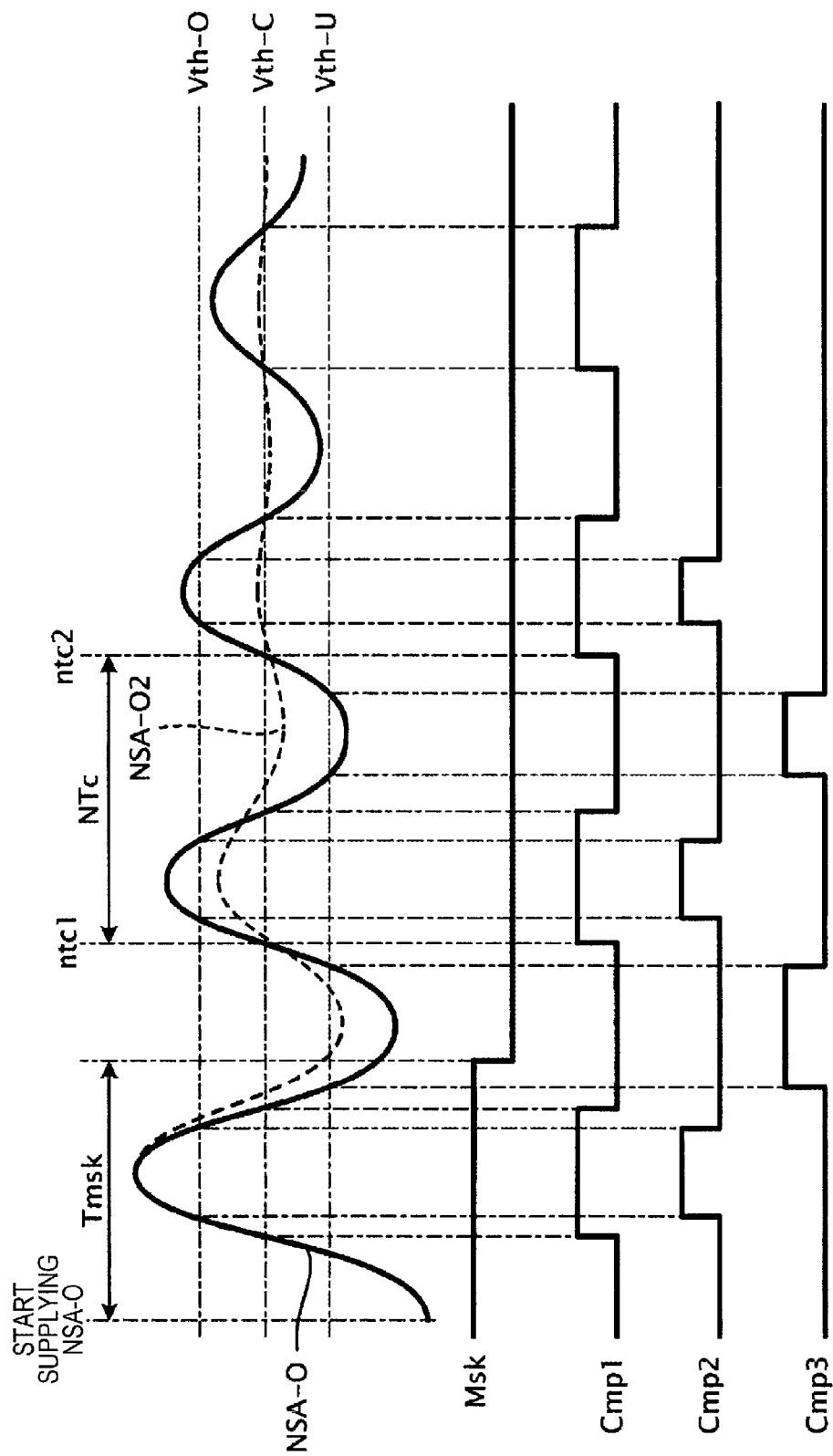
FIG. 20 illustrates generation of cycle information Info-T during an ejection state check process.

FIG. 20 is a timing chart illustrating an example of the operation of the ejection state check circuit 9 that generates the cycle information Info-T and the amplitude information Info-S.

As illustrated in FIG. 20, the ejection state check circuit 9 compares the amplified detection signal NSA-O with a threshold potential Vth-C that is a potential that corresponds to the amplitude center level of the amplified detection signal NSA-O, a threshold potential Vth-O that is higher than the threshold potential Vth-C, and a threshold potential Vth-U that is lower than the threshold potential Vth-C. The ejection state check circuit 9 generates a comparison signal Cmp1 that is set to the high level when the potential of the amplified detection signal NSA-O is equal to or higher than the threshold potential Vth-C, a comparison signal Cmp2 that is set to the high level when the potential of the amplified detection signal NSA-O is equal to or higher than the threshold potential Vth-O, and a comparison signal Cmp3 that is set to the high level when the potential of the amplified detection signal NSA-O is lower than the threshold potential Vth-U.

The ejection state check circuit 9 counts the clock signal CL during a period from a time ntc1 at which the comparison signal Cmp1 is set to the high level for the first time after a mask signal Msk has been set to the low level, to a time ntc2 at which the comparison signal Cmp1 is set to the high level for the second time, and outputs the cycle information Info-T that represents the resulting count value. Note that the mask signal Msk is a signal that is set to the high level for a period Tmsk from the start time of the control period TSS2 at which the supply of the amplified detection signal NSA-O from the detection circuit 80 starts.

It is considered that the abnormal ejection state has occurred in the check target ejecting section D-K (e.g., the cavity 320 is not filled with an ink) when the amplitude of the amplified detection signal NSA-O is small (see the broken line NSA-02 illustrated in FIG. 20). Therefore, the ejection state check circuit 9 sets the value of the amplitude information Info-S to "1" when the potential of the amplified detection signal NSA-O becomes equal to or higher than the threshold potential Vth-O, and becomes lower than the threshold potential Vth-U during a period from the time ntc1 to the time ntc2 (i.e., when the comparison signal Cmp2 is set to the high level, and the comparison signal Cmp3 is also set to the high level during a period from the time ntc1 to the time ntc2), and sets the value of the amplitude information Info-S to "0" when such a state does not occur.

FIG. 21 illustrates the generation of the check result signal Stt by the ejection state check circuit 9.

As illustrated in FIG. 21, the ejection state check circuit 9 checks the ejection state of the check target ejecting section D-K by comparing the time length NTc represented by the cycle information Info-T with some or all of the threshold values Tth1, Tth2, and Tth3, and generates the check result signal Stt that represents the result of the check.

The threshold value Tth1 represents the boundary between the time length of one cycle of residual vibrations when the ejection state of the check target ejecting section D-K is normal, and the time length of one cycle of residual vibrations when air bubbles have been formed within the cavity 320. The threshold value Tth2 represents the boundary between the time length of one cycle of residual vibrations when the ejection state of the check target ejecting section D-K is normal, and the time length of one cycle of residual vibrations when foreign matter adheres to an area around the nozzle N. The threshold value Tth3 represents the boundary between the time length of one cycle of residual vibrations when the ejection state of the check target ejecting section D-K is normal, and the time length of one cycle of residual vibrations when the viscosity of the ink with which the cavity 320 is filled has increased. Note that the threshold values Tth1 to Tth3 satisfy the relationship "Tth1<Tth2<Tth3".

As illustrated in FIG. 21, it is determined that the ink ejection state of the check target ejecting section D-K is normal when the value of the amplitude information Info-S is "1", and the time length NTc represented by the cycle information Info-T satisfies "Tth1≤NTc≤Tth2". In this case, the ejection state check circuit 9 sets the check result signal Stt to a value "1" that represents that the ejection state of the check target ejecting section D-K is normal.

It is determined that the abnormal ejection state has occurred in the check target ejecting section D-K due to air bubbles when the value of the amplitude information Info-S is "1", and the time length NTc represented by the cycle information Info-T satisfies "NTc<Tth1". In this case, the ejection state check circuit 9 sets the check result signal Stt to a value "2" that represents that the abnormal ejection state has occurred in the check target ejecting section D-K due to air bubbles.

It is determined that the abnormal ejection state has occurred in the check target ejecting section D-K due to adhesion of foreign matter when the value of the amplitude information Info-S is "1", and the time length NTc represented by the cycle information Info-T satisfies "Tth2<NTc≤Tth3". In this case, the ejection state check circuit 9 sets the check result signal Stt to a value "3" that represents that the abnormal ejection state has occurred in the check target ejecting section D-K due to adhesion of foreign matter.

It is determined that the abnormal ejection state has occurred in the check target ejecting section D-K due to an increase in viscosity when the value of the amplitude information Info-S is "1", and the time length NTc represented by the cycle information Info-T satisfies "Tth3<NTc". In this case, the ejection state check circuit 9 sets the check result signal Stt to a value "4" that represents that the abnormal ejection state has occurred in the check target ejecting section D-K due to an increase in viscosity.

It is also determined that the abnormal ejection state has occurred in the check target ejecting section D-K when the value of the amplitude information Info-S is "0". In this case, the ejection state check circuit 9 sets the check result signal Stt to a value "5" that represents that the abnormal ejection state has occurred in the check target ejecting section D-K.

The ejection state check circuit 9 generates the check result signal Stt based on the cycle information Info-T and the amplitude information Info-S as described above.

Although an example in which the check result signal Stt is 5-value information ("1" to "5") has been described above, the check result signal Stt may be binary information that represents whether or not the time length NTc satisfies "Tth1 NTc Tth2". It suffices that the check result signal Stt include information that represents whether or not the ink ejection state of the check target ejecting section D-K is normal.

As described above, the inkjet printer 1a according to the second embodiment can perform the ejection state check process in addition to the diagnosis process. Therefore, the inkjet printer 1a according to the second embodiment can find an abnormal ejection state due to a factor such as formation of air bubbles within the cavity 320, or an increase in the viscosity of the ink with which the cavity 320 is filled, in addition to an abnormal ejection state that occurs when the piezoelectric element PZ does not have a predetermined electrical storage capability, and the ejecting section D does not have a predetermined ejection capability. This makes it possible to increase the possibility that deterioration in print quality during the printing process can be prevented in advance.

C. Modifications

The embodiments described above can be modified in various ways. Examples of specific modifications are described below. Two or more modifications arbitrarily selected from the specific modifications described below may be appropriately combined as long as a contradiction does not occur. The elements described below in connection with the specific modifications that are identical to those described above in connection with the embodiments as to either or both of the effect and the function are indicated by the same reference signs as those used in connection with the embodiments, and detailed description thereof is appropriately omitted.

First Modification

Although the embodiments have been described above taking an example in which the signals other than the drive signal Com that are supplied to the head unit HU (or the head unit HUa) from the control section 6 (hereinafter referred to as "control signals") are distributed to each section of the head unit HU through the signal distribution circuit 15 (or the signal distribution circuit 15a), the invention is not limited thereto. For example, the signals generated within the head unit HU (or the head unit HUa) may have an arbitrary waveform as long as each element of the head unit HU (or the head unit HUa) can operate in the mode illustrated in FIGS. 10A and 10B at the times t-10, t-11, t-12, t-20, t-30, t-31, t-32, t-33, t-34, and t-40 defined by the control signals. For example, the control signals may be supplied directly to each section of the head unit HU instead of being supplied through the signal distribution circuit 15.

Figure 22:
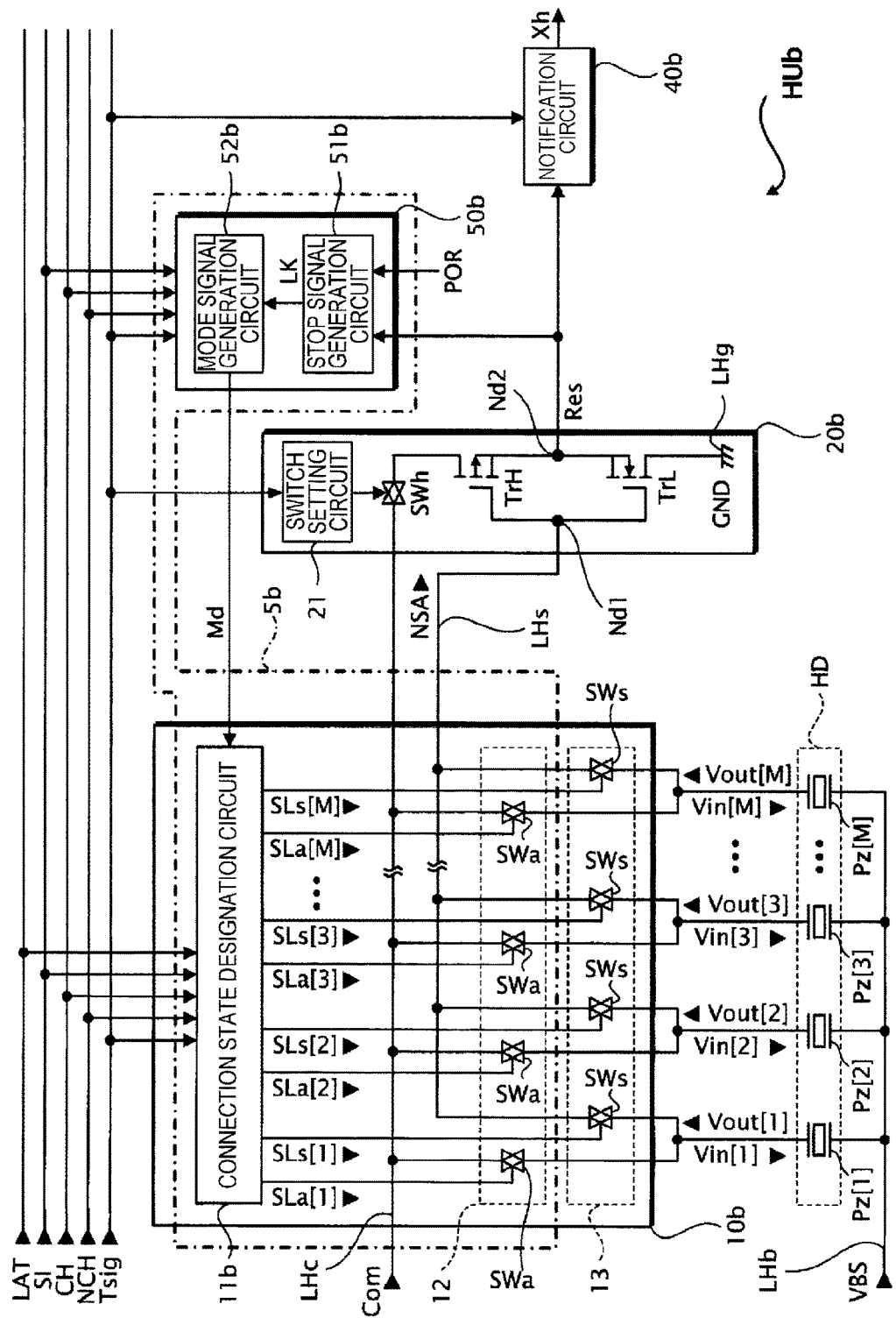
FIG. 22 is a block diagram illustrating the configuration of the head unit Hub according to the first modification.

FIG. 22 is a block diagram illustrating the configuration of a head unit HUb according to the first modification. As illustrated in FIG. 22, the head unit HUb differs from the head unit HU according to the first embodiment illustrated in FIG. 9 in that the head unit HUb includes a switch circuit 10b instead of the switch circuit 10, includes a determination circuit 20b instead of the determination circuit 20, includes a notification circuit 40b instead of the notification circuit 40, and includes an operation designation circuit 50b instead of the operation designation circuit 50.

As illustrated in FIG. 22, the switch circuit 10b differs from the switch circuit 10 according to the first embodiment in that the switch circuit 10b does not include the signal distribution circuit 15, and includes a connection state designation circuit 11b instead of the connection state designation circuit 11.

The connection state designation circuit 11b can generate the connection state designation signals SLa[1] to SLa[M] and the connection state designation signals SLs[1] to SLs[M] based on the diagnosis control signal Tsig, and the individual designation signals Sd[1] to Sd[M] included in the print signal SI, in the diagnosis period TQ in which the print signal SI2 is set to the high level, the change signal CH is set to the high level, and the N-charge signal NCH is set to the low level, to ON/OFF-control the switches SWa[1] to SWa[M] and the switches SWs[1] to SWs[M] in the same manner as the connection state designation circuit 11 illustrated in FIG. 10A.

The determination circuit 20b is configured in the same manner as the determination circuit 20, except that the determination circuit 20b includes a switch setting circuit 21. The switch setting circuit 21 causes the switch SWh to be turned ON during the determination period T2 in which the control waveform signal Tsig2 is supplied as the diagnosis control signal Tsig. The determination circuit 20b thus performs the determination process in the same manner as the determination circuit 20 according to the first embodiment.

The notification circuit 40b can output the notification signal Xh in the same manner as the notification circuit 40 according to the first embodiment based on the determination result signal Res and the diagnosis control signal Tsig.

The operation designation circuit 50b differs from the operation designation circuit 50 in that the operation designation circuit 50b includes a stop signal generation circuit 51b instead of the stop signal generation circuit 51, and includes a mode signal generation circuit 52b instead of the mode signal generation circuit 52. The stop signal generation circuit 51b can output the stop signal LK in the same manner as the stop signal generation circuit 51 according to the first embodiment based on the POR signal, the determination result signal Res, and the diagnosis control signal Tsig. The mode signal generation circuit 52b can output the operation mode designation signal Md in the same manner as the mode signal generation circuit 52 according to the first embodiment based on the stop signal LK, the print signal SI2, the change signal CH, and the N-charge signal NCH.

Note that the connection state designation circuit 11b, the connection state switch circuit 12, and the operation designation circuit 50b function as an ejection limit circuit 5b that stops the supply of the drive signal Com to the piezoelectric element PZ when the result of the determination process performed by the determination circuit 20b is negative to limit the ejection of an ink from the ejecting section D.

The head unit HUb according to the first modification can perform the diagnosis process that includes the determination process and the ejection limit process in the same manner as the head unit HU or HUa.

Second Modification

Although the embodiments and the modifications have been described above taking an example in which the control section 6 includes one substrate 600, the invention is not limited thereto. The control section 6 may include a plurality of substrates.

Figure 23:
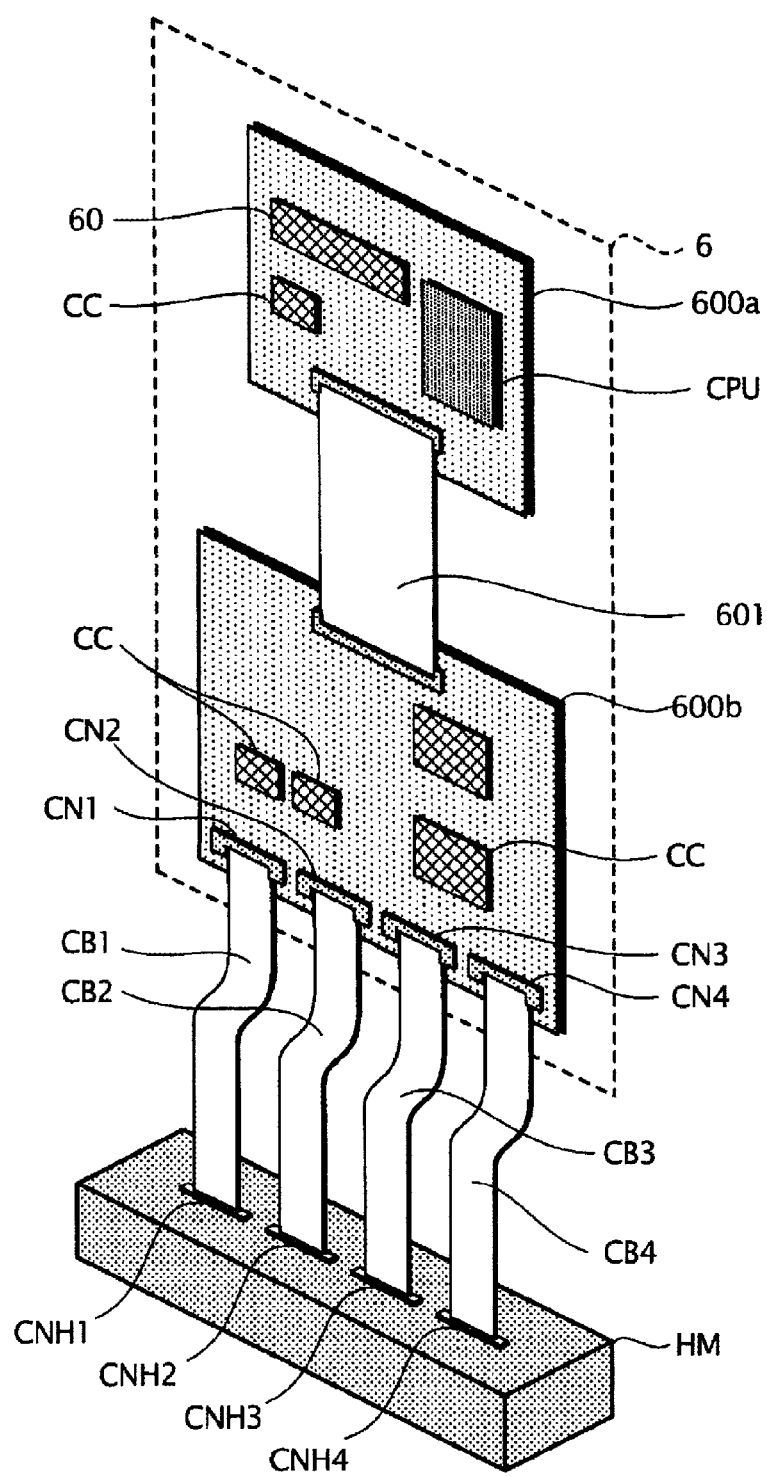
FIG. 23 illustrates the connection between the control section 6 and the head module HM according to the second modification.

As illustrated in FIG. 23, the control section 6 may include a substrate 600a, a substrate 600b, a cable 601 that electrically connects the substrate 600a and the substrate 600b, and a CPU, various circuits CC, and the storage section 60 that is provided to the substrate 600a or the substrate 600b.

Note that the connector CN (CN1 to CN4) provided to the control section 6 is connected to the connector CNH provided to the head module HM through only the cable CB (CB1 to CB4).

Third Modification

Although the embodiments and the modifications have been above described taking an example in which the diagnosis process is performed after the start-up process has ended, but before the printing process is performed, the invention is not limited thereto. The diagnosis process may be performed at an arbitrary timing. For example, the diagnosis process may be performed after the printing process has been performed, or may be performed when the user of the inkjet printer 1 has instructed to perform the diagnosis process using an operation section (not illustrated in the drawings) or the like.

Fourth Modification

Although the embodiments and the modifications have been described above taking an example in which the inkjet printer 1 or 1a includes four head units HU (or four head units HUa or HUb) and four ink cartridges 31 that are provided on a one-to-one basis, the invention is not limited thereto. It suffices that the inkjet printer 1 or 1a include one or more head units HU and one or more ink cartridges 31. In such a case, one ink cartridge 31 may be provided corresponding to a plurality of head units HU, or a plurality of ink cartridges 31 may be provided corresponding to one head unit HU. For example, an ink may be supplied to the ejecting sections D[1] to D[M1] among the M ejecting sections D[1] to D[M] provided to one head unit HU from one ink cartridge 31, and an ink may be supplied to the ejecting sections D[M1+1] to D[M] from another ink cartridge 31.

Fifth Modification

Although the embodiments and the modifications have been described above taking an example in which the cables CB1 to CB4 that connect the control section 6 and the head module HM or HMa include fifty-six lines LC (lines LC1-1 to LC4-14) in total, the invention is not limited thereto. It suffices that the cables CB1 to CB4 include lines LC in a number necessary and sufficient for supplying the drive signal Com and the control signals to the head module HM or HMa.

Note that at least the third connection line or the fourth connection line that is set to the ground potential GND or the potential VBS is necessarily provided between the first connection line to which the diagnosis control signal Tsig is supplied, and the second connection line to which the drive signal Com is supplied. When the third connection line and the fourth connection line are provided between the first connection line and the second connection line, it is preferable that the fourth connection line be provided between the second connection line and the third connection line.

Although the embodiments and the modifications have been described above taking an example in which the control section 6 and the head module HM or HMa are connected through four cables CB1 to CB4, the invention is not limited thereto. It suffices that the control section 6 and the head module HM or HMa be connected through one or more cables CB.

Sixth Modification

Although the embodiments and the modifications have been described above taking an example in which the potential difference between the highest potential VHX and the lowest potential VLX of the drive signal Com when the printing process is performed, is larger than the potential difference between the highest potential VII and the lowest potential V0 of the drive signal Com when the diagnosis process is performed, the invention is not limited thereto. The potential difference between the highest potential and the lowest potential of the drive signal Com when the printing process is performed, may be equal to or smaller than the potential difference between the highest potential and the lowest potential of the drive signal Com when the diagnosis process is performed.

Seventh Modification

Although the embodiments and the modifications have been described above taking an example in which the diagnosis period TQ is defined based on the signal level of the print signal SI2, the invention is not limited thereto. The diagnosis period TQ may be defined based on the signal level of the print signal SI1, or may be defined based on the signal level of the print signal SI1 and the signal level of the print signal SI2.

Eighth Modification

Although the embodiments and the modifications have been described above taking an example in which the inkjet printer 1 or 1a is a serial printer, the invention is not limited thereto. The inkjet printer 1 or 1a may be a line printer in which a plurality of nozzles N are provided to the head module HM so as to cover an area larger than the width of the recording paper P.

The invention claimed is:

1. A head unit control circuit that controls a head unit, and is provided outside the head unit, the head unit including:
    an ejecting section that includes a piezoelectric element, and can eject a liquid corresponding to displacement of the piezoelectric element, the piezoelectric element being displaced corresponding to a change in potential of a drive signal when the drive signal has been supplied to the piezoelectric element;
    a determination circuit that determines whether or not the piezoelectric element has a predetermined electrical storage capability; and
    an ejection limit circuit that stops the supply of the drive signal to the piezoelectric element and limits the ejection of the liquid from the ejecting section when a result of the determination is negative,
    the head unit control circuit comprising:
    a first terminal that outputs an instruction signal that instructs the head unit to execute the determination;
    a second terminal that outputs the drive signal; and a third terminal that is provided between the first terminal and the second terminal, the third terminal being smaller in potential change width than the second terminal when the ejecting section ejects the liquid.

2. The head unit control circuit as defined in claim 1, the drive signal being an analog signal, and the instruction signal being a digital signal having an amplitude smaller than that of the drive signal.

3. The head unit control circuit as defined in claim 1, further comprising:

a terminal that outputs a first designation signal;

a terminal that outputs a second designation signal; and a terminal that outputs a third designation signal, the first designation signal designating whether or not to cause the ejecting section to eject the liquid when a result of the determination is affirmative and the liquid can be ejected from the ejecting section, the second designation signal defining a period in which the liquid is ejected from the ejecting section when a result of the determination is affirmative and the liquid can be ejected from the ejecting section, the third designation signal being set to a low level so that a switch provided between the second terminal and the piezoelectric element is turned ON when a result of the determination is affirmative and the liquid can be ejected from the ejecting section, and the determination circuit executing the determination during a determination period in which the first designation signal is set to a high level, the second designation signal is set to a high level, and the third designation signal is set to the low level.

4. The head unit control circuit as defined in claim 3, the head unit including a plurality of the ejecting sections, and the first designation signal designating one of the plurality of the ejecting sections as a target for the determination during a period until the determination period starts after power supply to the head unit has started.

5. The head unit control circuit as defined in claim 1, the third terminal being set to a ground potential.

6. The head unit control circuit as defined in claim 5, further comprising:

a fourth terminal that is provided between the second terminal and the third terminal, the fourth terminal being smaller in potential change width than the second terminal, and the third terminal being smaller in potential change width than the fourth terminal, when the ejecting section ejects the liquid.

7. The head unit control circuit as defined in claim 6, the piezoelectric element including a first electrode and a second electrode, the drive signal being supplied to the first electrode, and the second electrode being electrically connected to the fourth terminal.

8. The head unit control circuit as defined in claim 1, the first terminal being provided between the third terminal and a fifth terminal, the fifth terminal being set to a potential identical to that of the third terminal.

9. The head unit control circuit as defined in claim 8, comprising:

a terminal arrangement area in which a plurality of terminals including the first terminal, the second terminal, the third terminal, and the fifth terminal are arranged, only the fifth terminal among the plurality of terminals being provided between the first terminal and an end of the terminal arrangement area.

10. A head unit control circuit that controls a head unit, and is provided outside the head unit, the head unit including:

an ejecting section that includes a piezoelectric element, and can eject a liquid corresponding to displacement of the piezoelectric element, the piezoelectric element being displaced corresponding to a change in potential of a drive signal when the drive signal has been supplied to the piezoelectric element; and a diagnosis circuit that diagnoses an electrical storage capability of the piezoelectric element, and stops the supply of the drive signal to the piezoelectric element when a result of the diagnosis is a predetermined result to limit the ejection of the liquid from the ejecting section, the head unit control circuit comprising:

a first terminal that outputs a diagnosis control signal that controls execution of the diagnosis by the head unit;

a second terminal that outputs the drive signal; and a third terminal that is provided between the first terminal and the second terminal, the third terminal being smaller in potential change width than the second terminal when the ejecting section ejects the liquid.

11. The head unit control circuit as defined in claim 10, the drive signal being an analog signal, and the diagnosis control signal being a digital signal having an amplitude smaller than that of the drive signal.

12. The head unit control circuit as defined in claim 10, further comprising:

a terminal that outputs a first designation signal;

a terminal that outputs a second designation signal; and a terminal that outputs a third designation signal, the first designation signal designating whether or not to cause the ejecting section to eject the liquid when the result of the diagnosis differs from the predetermined result, and the liquid can be ejected from the ejecting section, the second designation signal defining a period in which the liquid is ejected from the ejecting section when the result of the diagnosis differs from the predetermined result, and the liquid can be ejected from the ejecting section, the third designation signal being set to a low level so that a switch provided between the second terminal and the piezoelectric element is turned ON when the result of the diagnosis differs from the predetermined result, and the liquid can be ejected from the ejecting section, and the diagnosis circuit executing the diagnosis during a diagnosis period in which the first designation signal is set to a high level, the second designation signal is set to a high level, and the third designation signal is set to the low level, and the diagnosis circuit stopping the supply of the drive signal to the piezoelectric element and limiting the ejection of the liquid from the ejecting section when the result of the diagnosis is the predetermined result and the diagnosis period ends.

13. The head unit control circuit as defined in claim 12, the head unit including a plurality of the ejecting sections, and the first designation signal designating one of the plurality of the ejecting sections for which the diagnosis circuit diagnoses the electrical storage capability of the piezoelectric element during a period until the diagnosis period starts after power supply to the head unit has started.

14. The head unit control circuit as defined in claim 10, the third terminal being set to a ground potential.

15. The head unit control circuit as defined in claim 10, further comprising:
  a fourth terminal that is provided between the second terminal and the third terminal,
  the fourth terminal being smaller in potential change width than the second terminal, and the third terminal being smaller in potential change width than the fourth terminal, when the ejecting section ejects the liquid.

16. The head unit control circuit as defined in claim 10, the piezoelectric element including a first electrode and a second electrode,
  the drive signal being supplied to the first electrode, and
  the second electrode being electrically connected to the fourth terminal.

17. The head unit control circuit as defined in claim 10, the first terminal being provided between the third terminal and a fifth terminal, the fifth terminal being set to a potential identical to that of the third terminal.

18. The head unit control circuit as defined in claim 10, comprising:
  a terminal arrangement area in which a plurality of terminals including the first terminal, the second terminal, the third terminal, and the fifth terminal are arranged,
  only the fifth terminal among the plurality of terminals being provided between the first terminal and an end of the terminal arrangement area.

* * * * *